(12) United States Patent
Ducharme et al.

(10) Patent No.: US 11,559,730 B2
(45) Date of Patent: Jan. 24, 2023

(54) SPORTS EQUIPMENT WITH ALTERABLE CHARACTERISTIC

(71) Applicant: Bauer Hockey Ltd., Blainville (CA)

(72) Inventors: Mathieu Ducharme, Prevost (CA); Mathieu Poitras, St-Jerome (CA); Ivan Labonte, Montreal (CA); Alexis Seguin, Laval (CA); Jean-Francois Corbeil, Prevost (CA); Edouard Rouzier, Montreal (CA); Yannick Paquette, Lasalle (CA)

(73) Assignee: BAUER HOCKEY LLC, Exeter, NH (US)

( * ) Notice: Subject to any disclaimer, the term of this patent is extended or adjusted under 35 U.S.C. 154(b) by 205 days.

(21) Appl. No.: 16/836,784

(22) Filed: Mar. 31, 2020

(65) Prior Publication Data

US 2020/0306602 A1    Oct. 1, 2020

Related U.S. Application Data

(60) Provisional application No. 62/827,420, filed on Apr. 1, 2019.

(51) Int. Cl.

| | | |
|---|---|---|
| A63F 9/24 | (2006.01) |
| A63F 11/00 | (2006.01) |
| G06F 13/00 | (2006.01) |
| G06F 17/00 | (2019.01) |
| A63B 60/46 | (2015.01) |
| A63B 60/42 | (2015.01) |
| A63B 69/00 | (2006.01) |
| A63B 71/12 | (2006.01) |
| A43B 5/16 | (2006.01) |
| A63B 102/24 | (2015.01) |

(52) U.S. Cl.
CPC ............... *A63B 60/46* (2015.10); *A43B 5/16* (2013.01); *A63B 60/42* (2015.10); *A63B 69/0026* (2013.01); *A63B 71/1225* (2013.01); *A63B 2102/24* (2015.10); *A63B 2220/31* (2013.01); *A63B 2220/53* (2013.01); *A63B 2220/58* (2013.01); *A63B 2220/72* (2013.01); *A63B 2220/833* (2013.01); *A63B 2220/836* (2013.01)

(58) Field of Classification Search
USPC .............................. 463/1, 20, 22, 25, 30, 39
See application file for complete search history.

(56) References Cited

U.S. PATENT DOCUMENTS

| | | | |
|---|---|---|---|
| 9,070,269 B2 * | 6/2015 | Evans | G08B 5/36 |
| 9,582,762 B1 * | 2/2017 | Cosic | H04L 12/1831 |
| 9,622,531 B1 * | 4/2017 | Crispino | A42B 3/067 |
| 2002/0123386 A1 | 9/2002 | Perlmutter | |
| 2009/0029754 A1 | 1/2009 | Slocum et al. | |
| 2009/0221388 A1 * | 9/2009 | Giannetti | A63B 69/0002 473/422 |

* cited by examiner

*Primary Examiner* — Adetokunbo O Torimiro

(57) ABSTRACT

Articles of sports equipment, such as striking implements (e.g., sticks) and wearable articles (e.g., skates, helmets) for playing hockey or other activities, in which at least one of the characteristics (e.g., stiffness) of the articles of sports equipment is adaptable and can be altered during use of the sports equipment, such as by comprising an alterable component coupled to a controller, by comprising an alterable component that is autonomously alterable, and/or by an alterable component that can be altered in response to a command of a remote device.

40 Claims, 60 Drawing Sheets

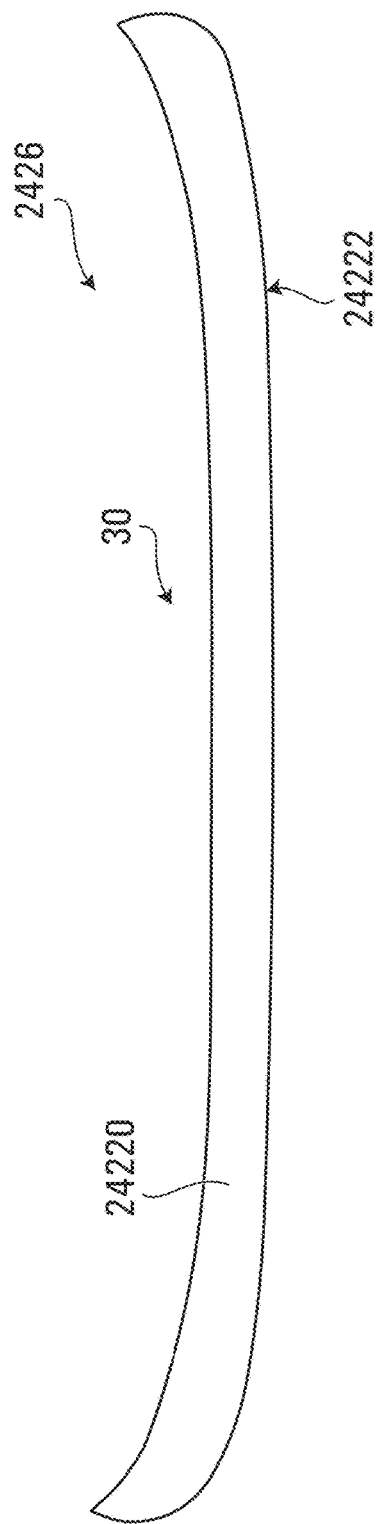
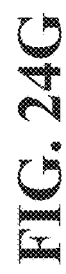
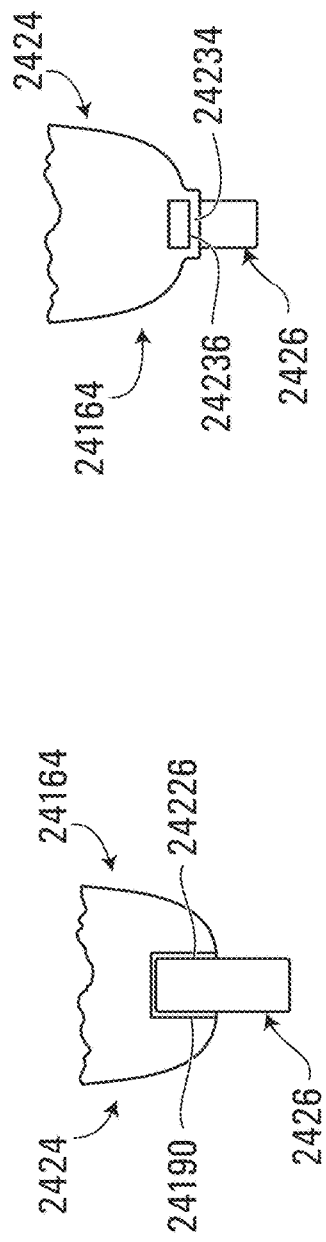
FIG. 24E
FIG. 24G
FIG. 24F

SPORTS EQUIPMENT WITH ALTERABLE CHARACTERISTIC

CROSS-REFERENCE TO RELATED APPLICATION

The present application claims the benefit of U.S. Provisional Application Ser. No. 62/827,420, filed Apr. 1, 2019, which is hereby incorporated by reference herein.

FIELD

The present disclosure generally relates to sports equipment, including striking implements and wearable articles for playing hockey or other activities, and more specifically relates to adaptable sports equipment.

BACKGROUND

Sports equipment can be used, for example, to protect a user or as an implement to help the user manipulate or strike a game projectile (such as a puck or ball). In each case, typical sports equipment has a fixed set of characteristics regardless of the game play situation that the user may be in. This can be non-ideal, considering the wide range of situations to which the user may find himself or herself exposed. Specifically, in some situations, a first given set of characteristics may be preferable to better perform, while in other situations, a second given set of characteristics different from the first given set of characteristics may be preferable to better perform. As a result, the user's choice of sports equipment may be dictated by a compromise between the different sets of characteristics that are preferable in the different situations, which may lead to inadequate performance in at least some of the situations. Alternatively, the user may purchase multiple items of sports equipment, each with a different set of characteristics, however this may be cumbersome and expensive, whereas switching between the different items of sports equipment may simply be impractical in an actual game environment.

Accordingly, sports equipment with improved characteristics would be welcomed.

SUMMARY

As contemplated herein, there is provided sports equipment with at least one alterable characteristic. In accordance with various aspects this disclosure relates to sports equipment, such as striking implements (e.g., sticks) and wearable articles (e.g., skates, helmets) for playing hockey or other activities, in which at least one of the characteristics (e.g., stiffness) of the sports equipment is adaptable and can be altered during use of the sports equipment, such as by comprising an alterable component coupled to a controller, by comprising an alterable component that is autonomously alterable, and/or by alterable component that can be altered in response to a command of a remote device.

For example, in accordance with an aspect of the disclosure, there is provided an article of sports equipment configured to autonomously alter a characteristic of the article of sports equipment during use thereof.

In accordance with another aspect of the disclosure, there is provided an article of sports equipment comprising a processing entity configured to cause a change in the article of sports equipment based on processing of an electronic signal.

In accordance with another aspect of the disclosure, there is provided a system comprising: a sports infrastructure component comprising a processing entity and an emitter, the processor configured to issue a command wirelessly via the emitter; and an article of sports equipment comprising a second processing entity and a receiver, the second processing entity configured to receive the command via the receiver and to take an action based on the command.

In accordance with another aspect of the disclosure, there is provided a hockey stick, comprising a shaft, a blade coupled to the shaft and at least one component configured to autonomously alter a visual or functional characteristic of the blade during use of the hockey stick.

In accordance with another aspect of the disclosure, there is provided a hockey skate, comprising a skate boot for receiving a foot of a wearer; a blade coupled to the skate boot; and at least one component configured to autonomously alter a visual or functional characteristic of the blade during skating.

In accordance with another aspect of the disclosure, there is provided a helmet, comprising a shell for receiving a head of a wearer, the shell comprising padding; and at least one component configured to autonomously alter a visual or functional characteristic of the padding while the helmet is worn by the wearer.

In accordance with another aspect of the disclosure, there is provided a ski, comprising a base; and at least one component configured to autonomously alter a profile of the base during skiing with the ski.

Also provided is a ski configured to autonomously emit or reflect a color that depends on a speed of the ski.

Also provided is a method, comprising: receiving a signal from a sensor; processing the received signal to determine a control signal; and sending the control signal to a component of an article of sports equipment to alter a characteristic of the article of sports equipment during use thereof.

These and other aspects of this disclosure will now become apparent to those of ordinary skill in the art upon review of the following description of embodiments in conjunction with the accompanying drawings.

BRIEF DESCRIPTION OF THE DRAWINGS

A detailed description of embodiments of the disclosure is provided below, by way of example only, with reference to drawings annexed hereto, in which.

Figure 1:
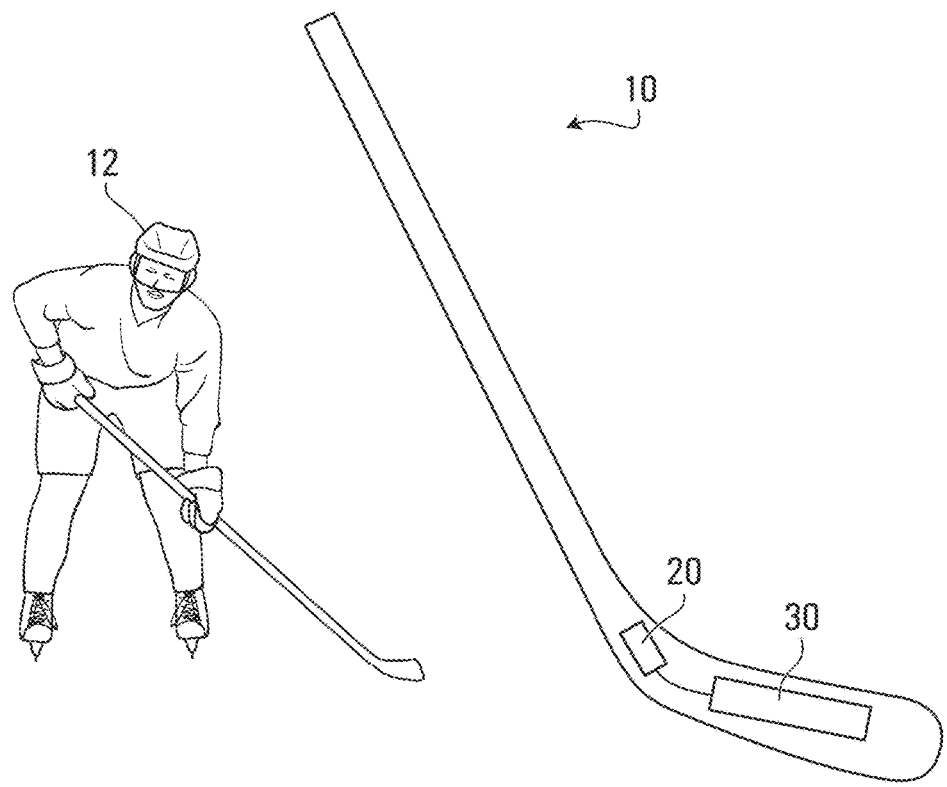
FIG. 1 illustrates an article of sports equipment in the form of a hockey stick having a controller and a component with an alterable characteristic.

In the drawings, embodiments are illustrated by way of example. It is to be expressly understood that the description and drawings are only for purposes of illustration and as an aid to understanding, and are not intended to be limiting.

DETAILED DESCRIPTION

There is described herein an article of sports equipment that may be worn or manipulated by a user. For example, the article of sports equipment may be a striking implement (such as a hockey stick, a bat or a racquet) or a wearable article (e.g., skate, helmet, protective pad). The article of sports equipment may refer to other types of sports equipment and to equipment used in other sports as well, such as skis used in skiing. In accordance with various embodiments, the article of sports equipment has an alterable characteristic. In some cases, the characteristic is altered autonomously (see section (1) below), whereas in other cases, the characteristic is altered in response to an external command (see section (2) below). The characteristic may be a visual and/or functional (e.g., mechanical) characteristic.

(1) Autonomous Altering of Characteristic

In accordance with certain embodiments, the article of sports equipment has at least one characteristic that is autonomously alterable during use of the article of sports equipment. Non-limiting examples of this characteristic and of how it is autonomously alterable are provided below. Specifically, a first class of embodiments whereby a characteristic of the article is altered autonomously employs a controller embedded in the article of sports equipment (see subsection (1.1) below) whereas a second class of embodiments does not employ such a controller (see subsection (1.2) below).

(1.1) Autonomous Altering of Characteristic with Controller

According to a first class of embodiments in which a characteristic is autonomously alterable, and with reference to FIG. 1, the article of sports equipment 10 (shown here as a hockey stick, but this is simply a non-limiting example) comprises a controller 20 and a component 30 operatively coupled to the controller 20. As such, to alter the characteristic of the article of sports equipment 10 according to this first class of embodiments, the controller 20 is configured to control the component 30 and alter a characteristic thereof during use of the article of sports equipment 10.

Figure 2:
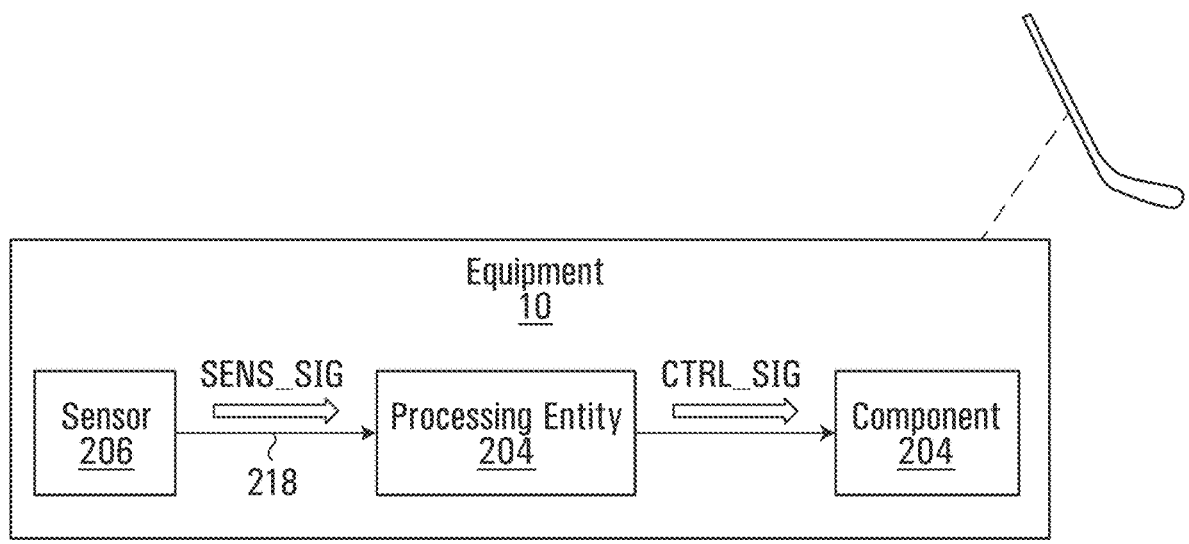
FIG. 2 is a block diagram showing the controller in the form of a processing entity coupled to the component, and a sensor forming part of the article of sports equipment.

In some embodiments, e.g., as shown in FIG. 2, the controller 20 takes the form of a processing entity 204 operatively coupled to the component 30. The processing entity 204 may include at least one processor (e.g., CPU) that reads and executes computer-readable instructions stored in a memory 205. The computer-readable instructions define program logic that, under certain conditions, results in a decision to send a control signal CTRL_SIG to the component 30 to alter a characteristic thereof. As such, the decision to send the control signal CRTL_SIG is rendered autonomously by the processing entity 204, based on execution of the program logic. It should be appreciated that in some embodiments, the computer-readable instructions may encode a machine learning algorithm (or other form of artificial intelligence) that is implemented by the processing entity 204.

In executing the program logic, the processing entity 204 may collect, aggregate and process inputs from one or more sensors, examples of which include but are not limited to a camera, a gyroscope, an accelerometer, a magnetometer, a gravity sensor, a linear acceleration sensor, a vibration sensor, a thermometer and a pressure sensor, to name a few non-limiting examples.

Figure 3:
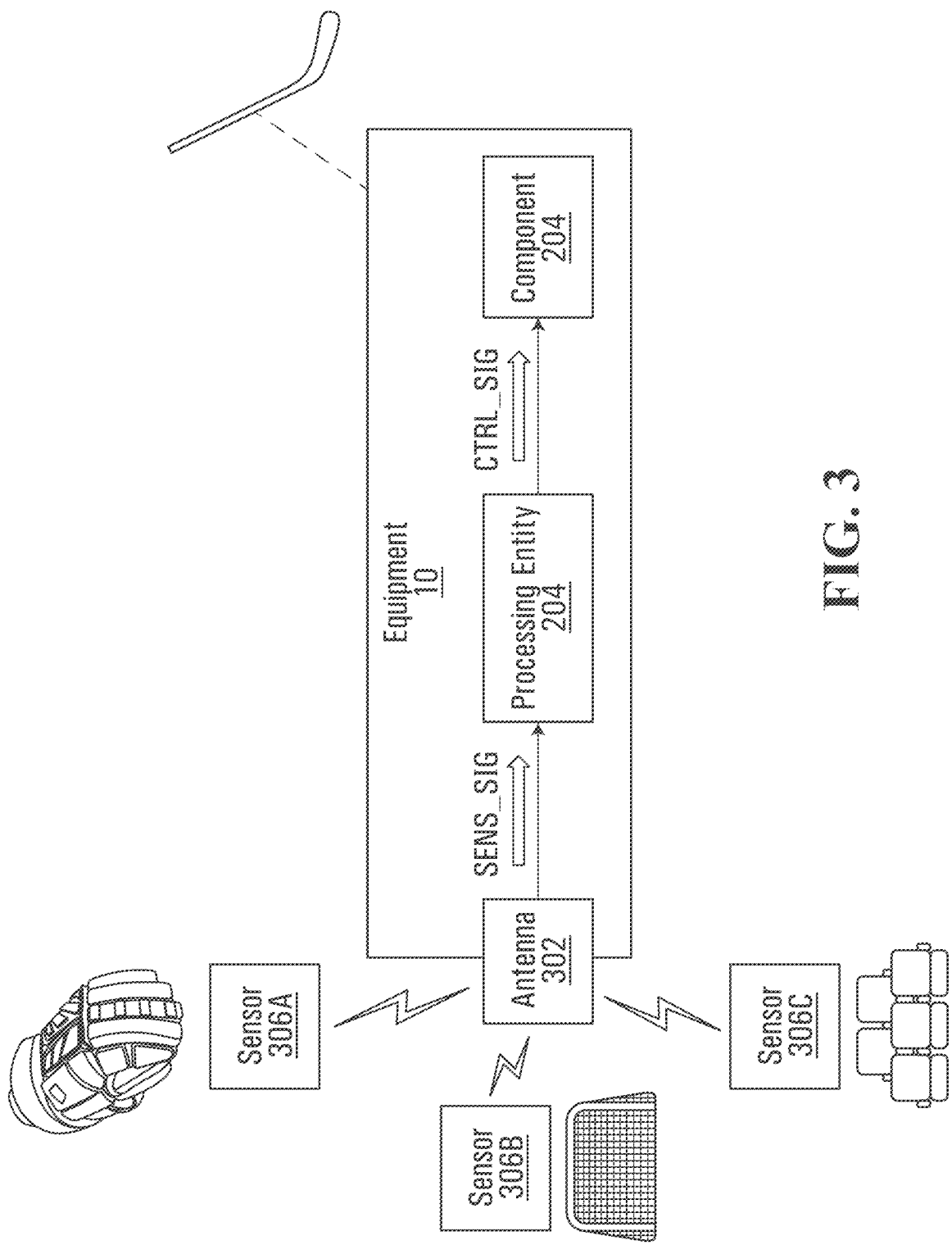
FIG. 3 is a block diagram showing the controller in the form of a processing entity coupled to the component, and sensors external to the article of sports equipment.

In one example, shown in FIG. 2, the article of sports equipment 10 may itself comprise a sensor 206, from which the processing entity 204 receives a sensor signal SENS_SIG via a wired connection 218. In another example, shown in FIG. 3, the processing entity 204 receives a sensor signal SENS_SIG from a remote sensor via a receiver (such as an antenna 302). The remote sensor that may be anywhere within range of the antenna 302, such as a sensor 306A disposed on a different article of sports equipment 310, a sensor 306B embedded within a sports infrastructure component (e.g., goal posts, hockey rink boards, basketball court net), a sensor 306C held by a spectator in the stands. It should be appreciated that wireless communication via the antenna 302 may occur in accordance with any suitable protocol, including but not limited to WiFi, Bluetooth and NFC. Of course, in some embodiments, both a sensor embedded in the article of sports equipment 10 and an external sensor may be provided. Any suitable emitter-receiver technology can be used.

Figure 36:
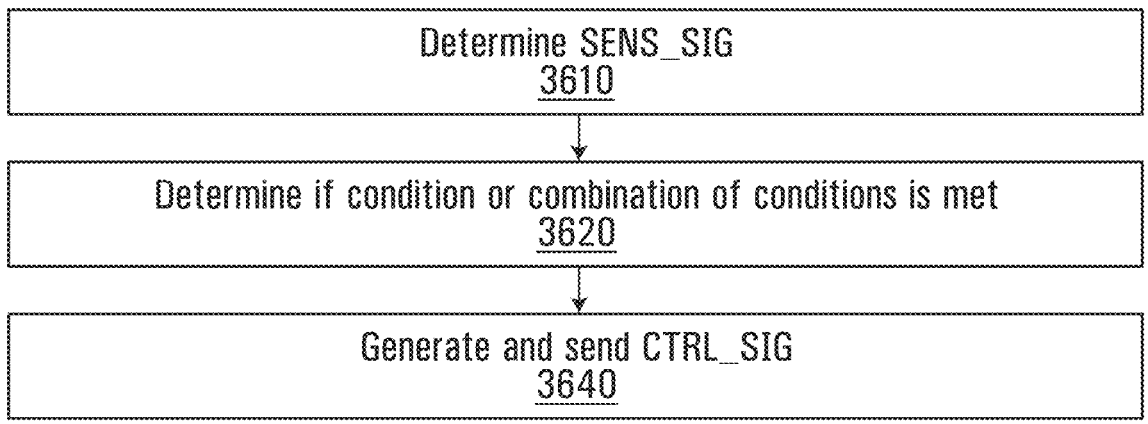
FIGS. 36 and 37 are flowcharts illustrating methods that may be executed by a processing entity, in accordance with non-limiting embodiments.

In this example, the processing entity 204 is configured to process the received sensor signal(s) SENS_SIG (step 3610 in FIG. 36) in accordance with the program logic to determine whether a particular condition is met (step 3620 in FIG. 36). Various techniques may be used, such as algorithmic processing, machine learning, look-up tables and principal component analysis. This could also involve steps 3620A and 3620B as will be described later with reference to FIG. 37. In case the particular condition is met, the processing entity 204 may be configured to send the control signal CTRL_SIG to the component 30 to alter a characteristic thereof (step 3640 in FIG. 36). Included in this mode of operation is testing for multiple different conditions and issuing a particular version of the control signal CTRL_SIG in response to a particular one of the conditions (or a combination of the conditions) being met. The control signal CTRL_SIG may be an analog signal or a digital signal.

In a specific non-limiting embodiment, the processing entity 204 may be configured to send the control signal CTRL_SIG to the component 30 in response to determining that a user 12 and/or the article of sports equipment 10 exhibits a particular movement pattern. To this end, the processing entity 204 may be configured to process the output of, say, a camera or an inertial movement unit (IMU) to recognize movement of the user 12 or of the article of sports equipment 10 and to determine whether this movement matches sufficiently closely one of a plurality of predetermined movement patterns stored in the memory 205. This comparison can be done in various ways, including algorithmic processing, look-up tables, principal component analysis and using machine learning. In machine learning, a trained model uses parameters, which are internal configuration variables whose value can be estimated from the given data. Different parameters represent different movement patterns, depending on the classification. For example, the machine learning algorithm may be trained to distinguish between:

left turn vs. right turn
forward skating vs. backward skating
straight skating vs. turning
accelerating vs. decelerating
slap shot vs. wrist shot Also, the machine learning model may be trained to detect an approaching puck, and impact of a puck or other projectile, or other conditions, including conditions that may arise in other sports, including turns, jumps and landings.

For example, in a case where the article of sports equipment 10 is a hockey stick, the plurality of predetermined movement patterns may include a first movement pattern indicative of gearing up for a slap shot and a second movement pattern indicative of gearing up for a wrist shot. The processing entity 204 may thus be configured to send the control signal CTRL_SIG at a first voltage level (causing a first amount of change in the characteristic of the component 30) in case the detected movement pattern is indicative of gearing up for a slap shot and at a second voltage level (causing a second change in the characteristic of the component 30) in case the detected movement pattern is indicative of gearing up for a wrist shot.

In a similar fashion, in a case where the article of sports equipment 10 is an item of footwear, the predetermined movement patterns may include a movement pattern indicative of acceleration and a movement pattern indicative of deceleration.

In another specific non-limiting embodiment, the processing entity 204 may be configured to send the control signal CTRL_SIG to the component 30 in response to detection of an occurrence in the environment. Such an occurrence may be external and thus not due to movement of the article of sports equipment 10. For example, the processing entity 204 may be configured to send the control signal CTRL_SIG in response to detection that a game projectile is approaching the article of sports equipment 10. The processing entity 204 may thus be configured to send the control signal CTRL_SIG at a particular voltage level to cause a change in the characteristic of the component 30 just prior to impact.

More generally, the processing entity 204 may be configured to alter the power (either by varying the voltage or the current or both) of the analog control signal CTRL_SIG, in response to determining an occurrence of a pre-determined situation to cause a change in the characteristic of the component 30 just prior to impact.

Another alternative to altering the voltage levels of an analog control signal CTRL_SIG is, in some embodiments, the use of a digital control signal CTRL_SIG, which may carry distinct digital codes to cause the component 30 to react in different ways. Modulation of the control signal CTRL_SIG may also be used for enhanced efficiency or security.

Figure 37:
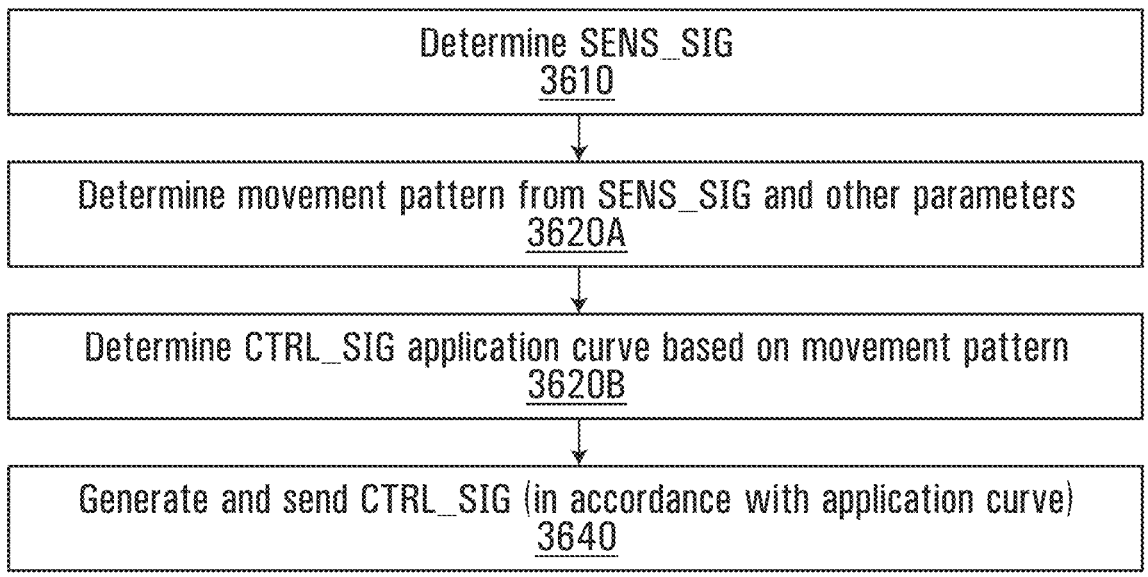
Figure 38:
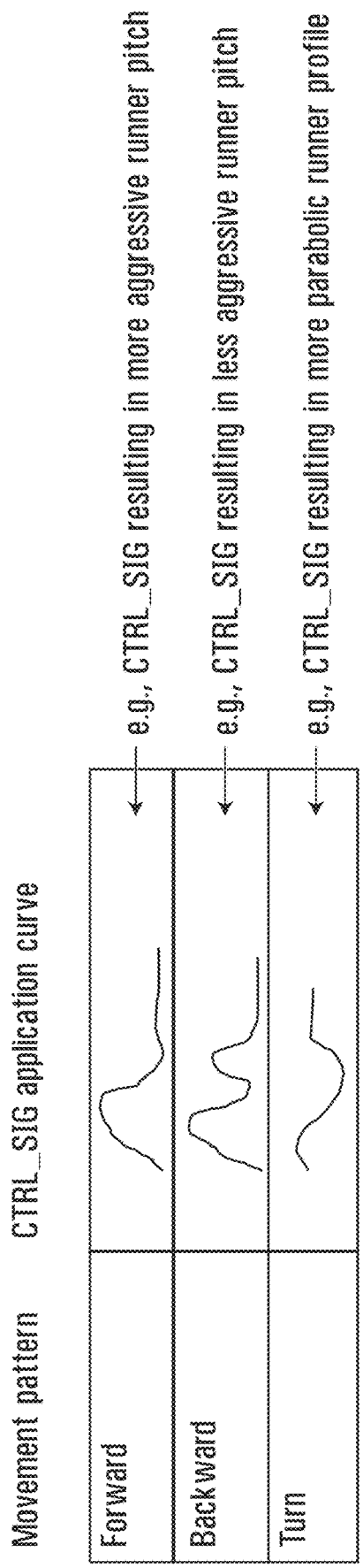
FIG. 38 illustrates a table that associates movement patterns with application curves for a control signal applied to a component, in accordance with a non-limiting embodiment.

As such, and with reference to FIG. 37, the processing entity 204 is configured to determine the received sensor signal(s) SENS_SIG at step 3610, determine a movement pattern from the received sensor signal(s) SENS_SIG and possibly other parameters (step 3620A), determine an application curve for the control signal CTRL_SIG based on the movement pattern (step 3620B) and generate and send the control signal CTRL_SIG to the component 30 to alter a characteristic thereof (step 3640). It should be appreciated that the "application curve" is meant to cover a broad range of possibilities. For instance, in one example, the application curve for the control signal CTRL_SIG may correspond to setting the control signal CTRL_SIG to a particular value and leaving it at that value. In another example, the application curve for the control signal CTRL_SIG may correspond to setting the value of the control signal CTRL_SIG to a first value and returning it to its original value after a certain amount of time. In another example, the application curve for the control signal CTRL_SIG may correspond to controlling the value of the control signal CTRL_SIG over time in accordance with a pre-determined function. The pre-determined function is generated/computed in accordance with a desired outcome from application of that control signal, based on, e.g., empirical, experimental and/or analytical methods. For example, with reference to FIG. 38, there is shown a table that maps different detected movement patterns to application curves for the control signal CTRL_SIG. Each application curve is associated with a desired effect on the component 30, such that application of the control signal CTRL_SIG in accordance with the application curve will cause the component 30 to have an effect that is deemed suitable for the corresponding movement pattern.

For instance, in the case forward skating is detected as a movement pattern, a first application curve may be appropriate, which is known (through experimental, analytical or empirical results) to cause a more aggressive runner pitch, whereas in case backward skating is detected as a movement pattern, a less aggressive runner pitch is achieved through application of the control signal CTRL_SIG in accordance with a second application curve. In other embodiment, in case a turn is detected as a movement pattern, application of the control signal CTRL_SIG in accordance with a third application curve will cause the skate runner to adopt a more parabolic shape, which is expected to facilitate the turn being attempted by the player. For example, the runner may be kept in its unadulterated state when the skater is skating (e.g., detected as pushing during strides) but when the skater initiates a turning motion, the signal from a sensor (e.g., gyro or pressure) is processed with an algorithm to detect that the skater is about to turn, and an actuator is caused to slightly deform the runner to create a parabolic shape and facilitate that turn.

Figure 39:
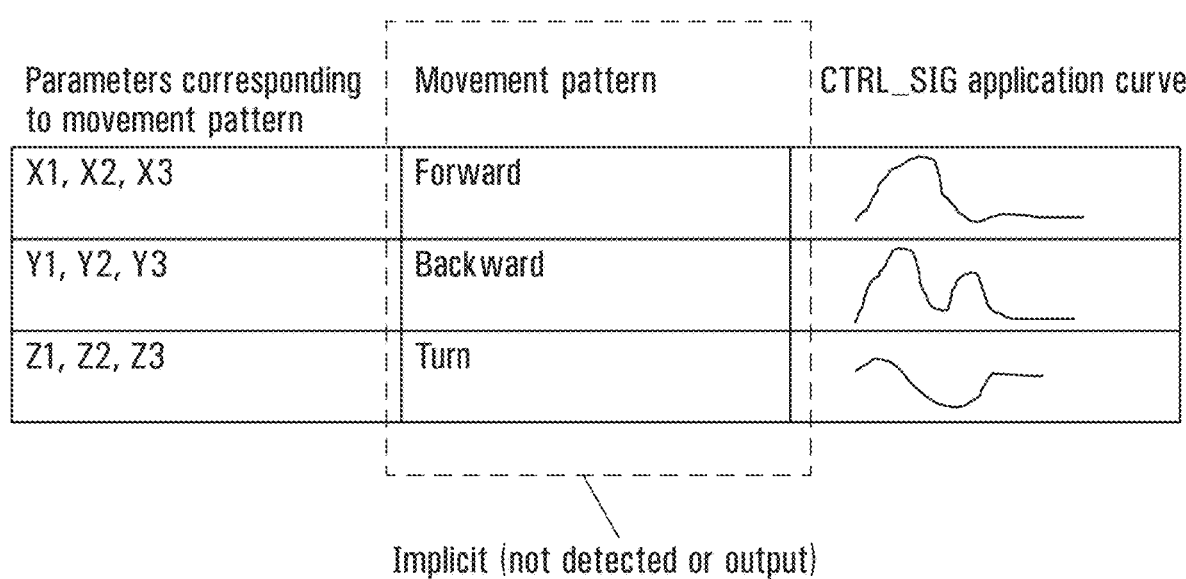
FIG. 39 illustrates a table that associates parameters associated with movement patterns with application curves for a control signal applied to a component, in accordance with a non-limiting embodiment.

It should be noted that in some embodiments, there is no need to explicitly determine the movement pattern, but rather the movement pattern is implicit in the outcome of processing the sensor signal(s) SENS_SIG. As such, it is conceivable that the processing entity 204 detects the parameters indicative of a turn and selects the appropriate application curve for the control signal CTRL_SIG, without explicitly signaling or storing information that indicates that a turn was detected. More generally, and with reference to FIG. 39, a prior phase (before execution of the method by the processing entity 204) may identify sets or ranges of parameters corresponding to different movement patterns of interest (e.g., parameters of a machine learning model). This may create a relationship between the leftmost and center columns of the table in FIG. 39. Also, during a prior phase, an empirical or experimental or analytical step may determine the application curve for the control signal CTRL_SIG for each movement pattern, thus creating a relationship between the center and rightmost columns of the table in FIG. 39. During runtime, only the leftmost and rightmost columns of the table are needed in the execution of step 3640. The processing entity 204 need simply determine parameters and match them to one of the sets or ranges of parameters in the leftmost column of FIG. 39, and then obtain the value of the control signal CTRL_SIG from the corresponding entry in the rightmost column of the table in FIG. 39. In this scenario, even though there may be an underlying movement pattern that has been detected, the processing entity 204 need not explicitly indicate or identify this underlying movement pattern.

It is to be understood that in some embodiments, multiple control signals (such as the control signal CTRL_SIG) associated with multiple components 30 may be associated with a single movement pattern and may be modified by the processing entity 204.

In some examples, the alterable characteristic of the component 30 may be one of: a geometry of the component 30; a physical aspect (e.g., a color, a texture) of the component 30; and a mechanical characteristic (e.g., a stiffness, a hardness, a resilience) of the component 30, or any combination thereof.

For example, in some embodiments, the component 30 comprises capsules comprising ink and a physical aspect of the component 30 may be alterable. In particular, the capsules may be configured to release the ink in response to a predetermined control signal CTRL_SIG, thereby changing a color of the component 30. For example, in some cases, the sensor 206 of the article of sports equipment 10 may comprise an accelerometer and when a threshold accelera-tion is detected, the controller 20 may generate the predetermined control signal CTRL_SIG causing release of the ink and indicating to an observer that the threshold acceleration has been observed.

Figure 28:
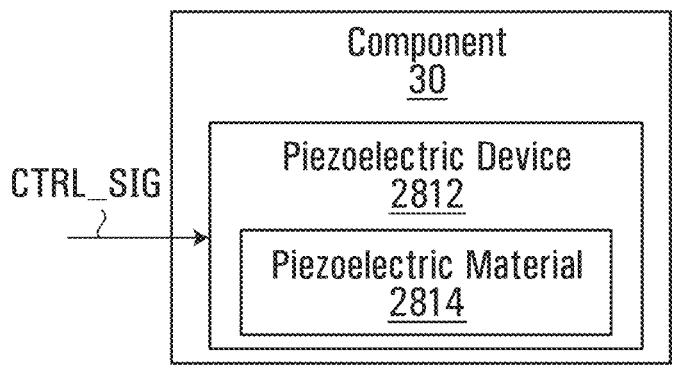
FIG. 28 shows a variant of the component comprising a piezoelectric device.

In some embodiments, e.g., as shown in FIG. 28, the component 30 comprises a piezoelectric device 2812 comprising a piezoelectric material 2814, and a mechanical characteristic of the component 30 may be alterable. A mechanical characteristic of the piezoelectric material 2814 may be alterable depending on an electric charge of the piezoelectric material 2814 and the control signal CTRL_SIG may determine the electric charge of the piezoelectric material 2814. For example, in some cases, a modulus of elasticity of the piezoelectric material 2814 may vary when the electric charge of the piezoelectric material 2814 varies. In response to the control signal CTRL_SIG, the mechanical characteristic (e.g., rigidity) of the piezoelectric material 2814 may be altered, effectively altering an analogous mechanical characteristic (e.g., stiffness) of the component 30.

The piezoelectric material 2814 may be any suitable piezoelectric material. For example, in some embodiments, the piezoelectric material 2814 comprises at a piezo polymers such as PVDF (polyvinylidene fluoride). This material shows piezoelectricity when pressure or mechanical force applied on it. Another example of the piezoelectric material 2814 may include piezoelectric ceramics such as lead zirconate titanate (PZT) or barium titanate (BATiO3), which can be used as sensors or actuators (e.g., submicrometer positioning systems).

The stiffness of the component 30 may be alterable using the piezoelectric material 2814 by any suitable proportion. For example, in some embodiments, the stiffness of the component 30 may be alterable during use by at least 5%, in some embodiments at least 10%, in some embodiments at least 25%, and in some embodiments even more, compared to the stiffness of the component 30 in a rest position or when it is not in use.

Figure 29:
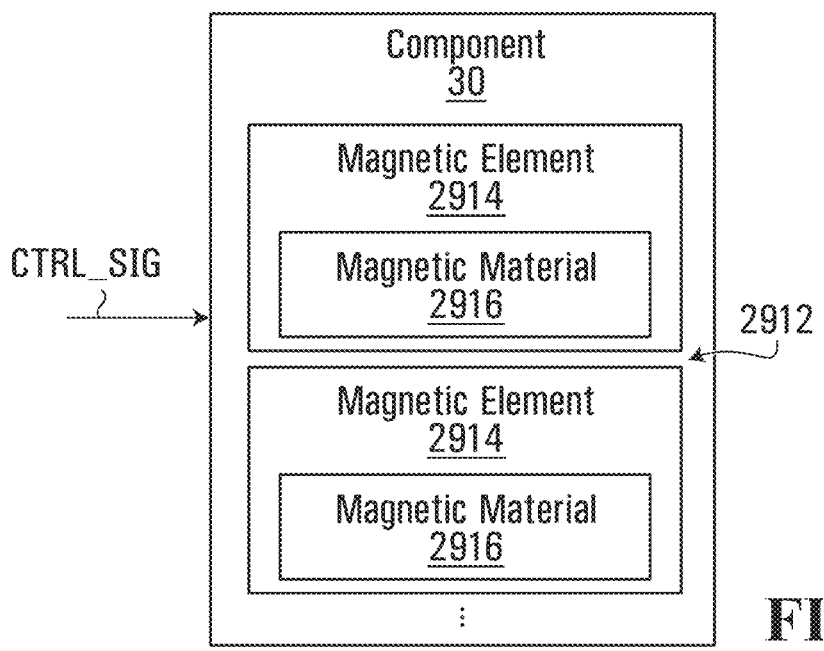
FIG. 29 shows a variant of the component comprising magnetic elements.

In some embodiments, e.g., as shown in FIG. 29, the component 30 comprises a magnetic arrangement 2912 including one or more (e.g., a pair of) magnetic elements 2914 comprising a magnetic material 2916, and a mechanical characteristic of the component 30 may be alterable. An interaction between magnetic elements 2914 and/or a state of the magnetic elements 2914 may be alterable depending on a magnetic field surrounding the magnetic elements 2914 and the control signal CTRL_SIG may determine the magnetic field surrounding the magnetic elements 2914. For example, in some cases, a magnetic pull between the magnetic elements 2914 may vary and/or the magnetic material 2916 of the magnetic elements 2914 may be more solid or more fluid depending on the magnetic field surrounding the magnetic elements 2914, resulting in that a stiffness of the magnetic arrangement 2912 may vary when the magnetic field surrounding the magnetic elements 2914 varies. In response to the control signal CTRL_SIG, the mechanical characteristic (e.g., stiffness) of the magnetic material 2916 may be altered, effectively altering an analogous mechanical characteristic (e.g., stiffness) of the component 30.

The magnetic material 2916 may be any suitable magnetic material. For example, in some embodiments, the magnetic material 2916 is configured to be in a permanent solid state during use and comprises at least one of (i.e., one of, more than one of, or any combination of): alnico and ferrite. As another example, in some embodiments, the magnetic material 2916 comprises a magnetorheological (MR) material, including at least one of: micrometer sized (0.1-10 um)

ferromagnetic fillers (ex: carbonyl iron), Newtonian-like fluid (ex: oil) and polymeric matrices (ex: silicone rubber)

The stiffness of the component 30 may be alterable using the magnetic material 2916 by any suitable proportion. For example, in some embodiments, the stiffness of the component 30 may be alterable during use by at least 5%, in some embodiments at least 19%, in some embodiments at least 25%, and in some embodiments even more, compared to the stiffness of the component 30 in a rest position or when it is not in use.

Figure 30:
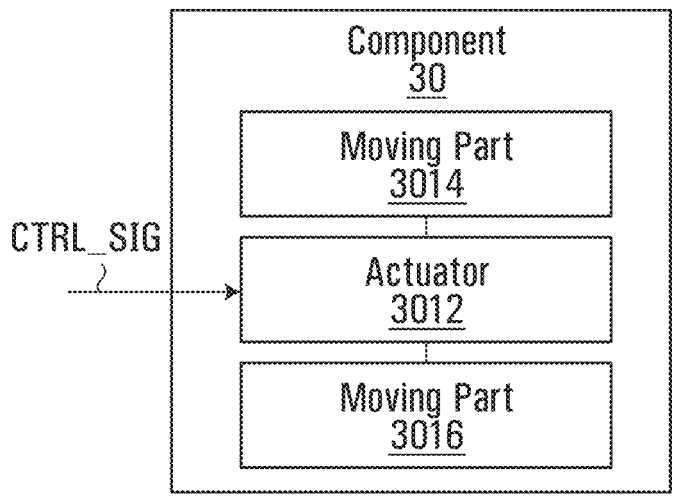
FIG. 30 shows a variant of the component comprising an actuator and moving parts.

In some embodiments, e.g., as shown in FIG. 30, the component 30 comprises an actuator 3012 and a mechanical characteristic of the component 30 may be alterable. In some cases, the component 30 comprises two movable parts 3014, 3016 which are movable relative to one another when the article of sports equipment 10 is being used, and the actuator 3012 may lock the movable parts 3014, 3016 to one another such that the movable parts are not movable relative to one another in response to the aforementioned pre-determined control signal CTRL_SIG. In some cases, the actuator 3012 may preload the component 30 in response to the pre-determined control signal CTRL_SIG; for example, the actuator 3012 may apply a pressure and/or a torque to the component 30 such that the component 30 is preloaded, changing the mechanical characteristic of the component 30.

Specific non-limiting examples of implementation will now be provided, for different types of sports equipment. These types of sports equipment are merely examples and should be considered non-limiting.

Footwear, e.g., Skates

Figure 11:
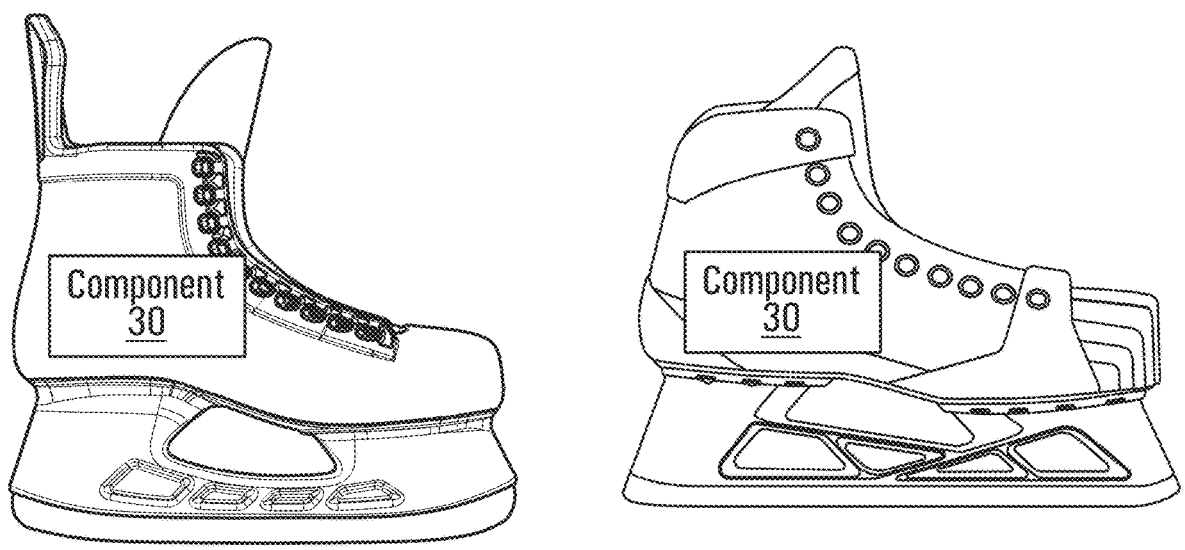
FIG. 11 shows hockey skates into which has been incorporated a component with an alterable characteristic.

In a specific non-limiting example of implementation, the article of sports equipment 10 is footwear, e.g., a skate, non-limiting examples of which are shown in FIG. 11 at 1110 and 1120. FIGS. 24A to 24M show other embodiments of a skate 2410 to which specific non-limiting examples of implementation may be applied.

Figure 24A:
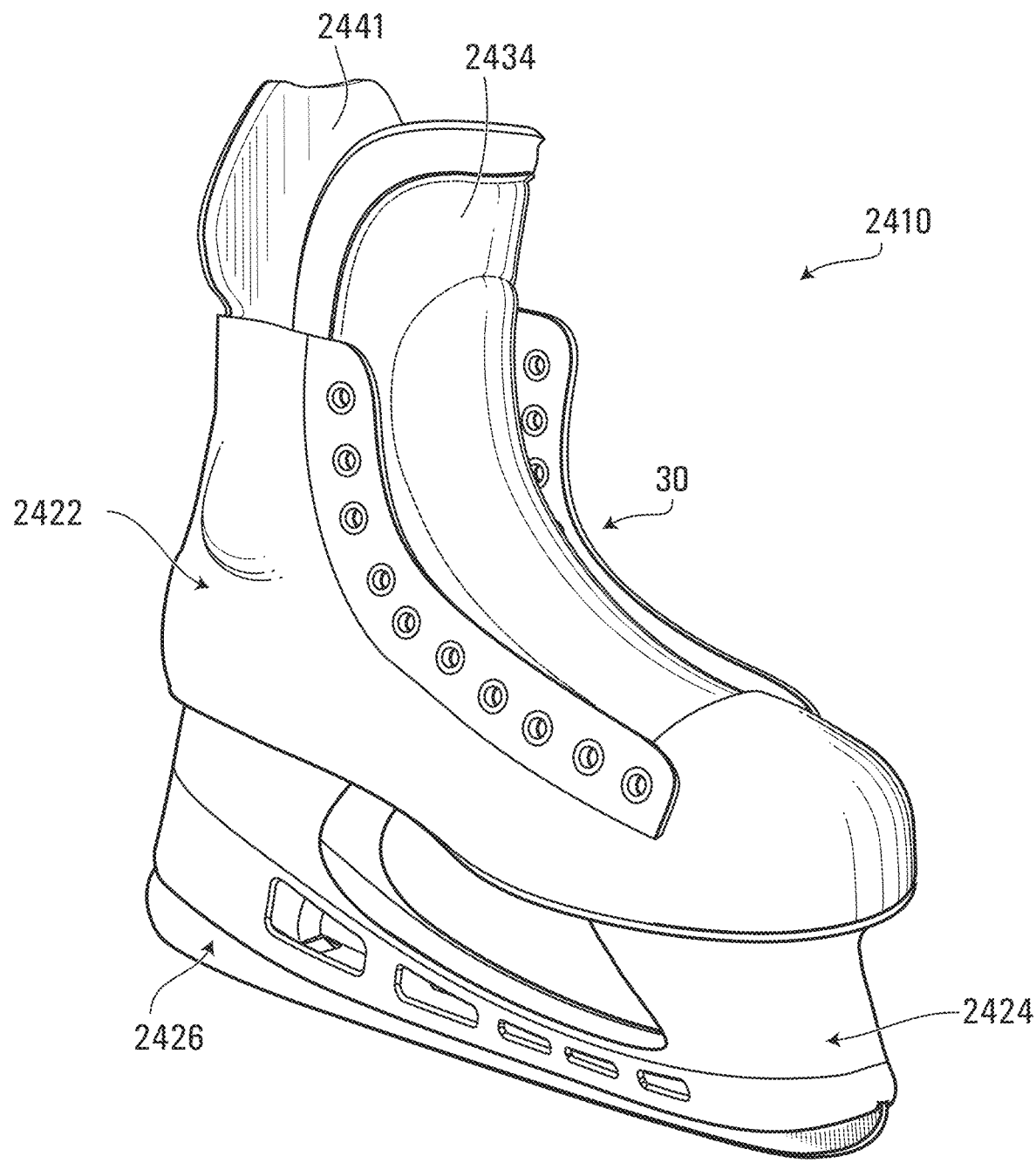
Figure 24B:
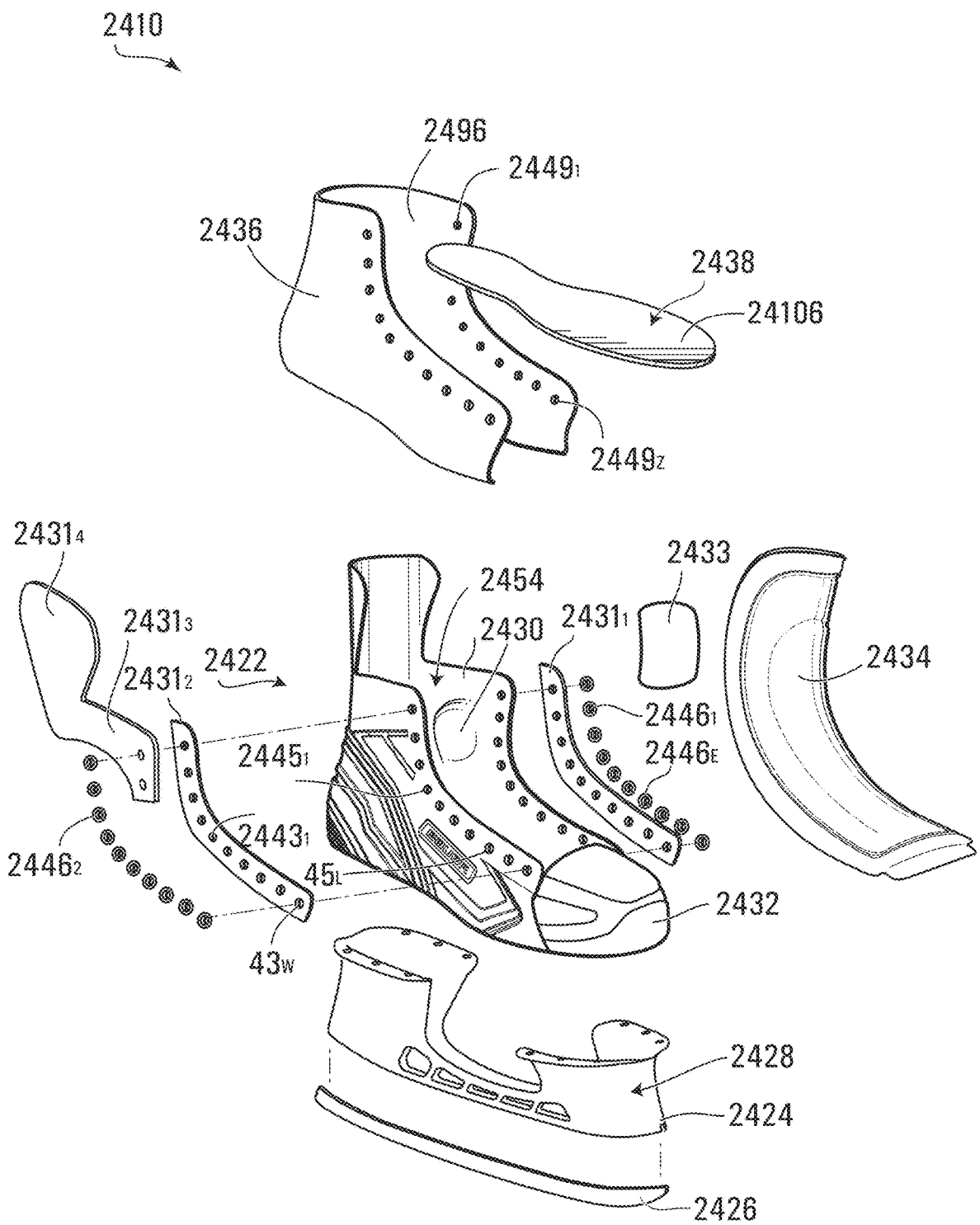
Figure 24C:
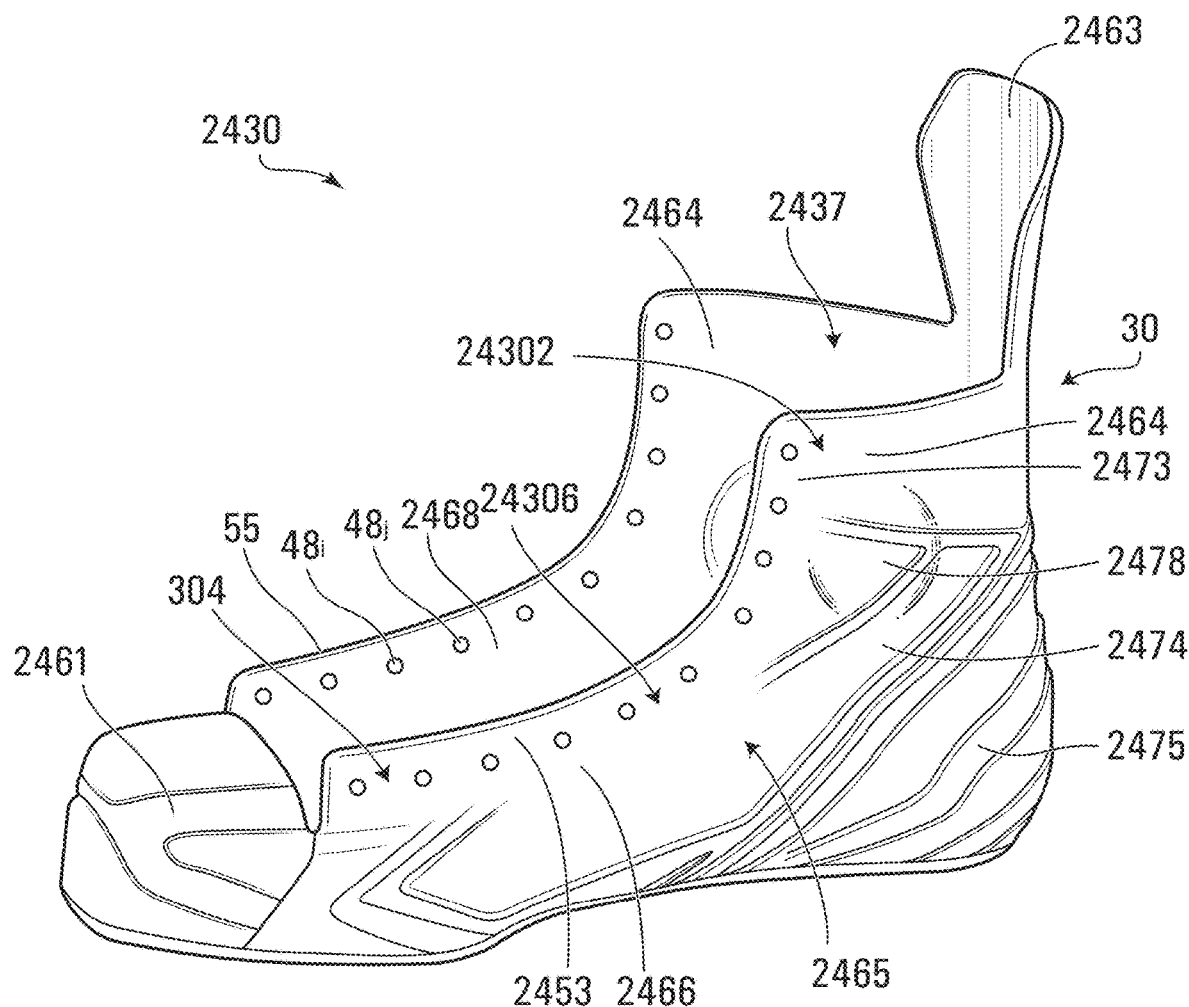
Figure 24D:
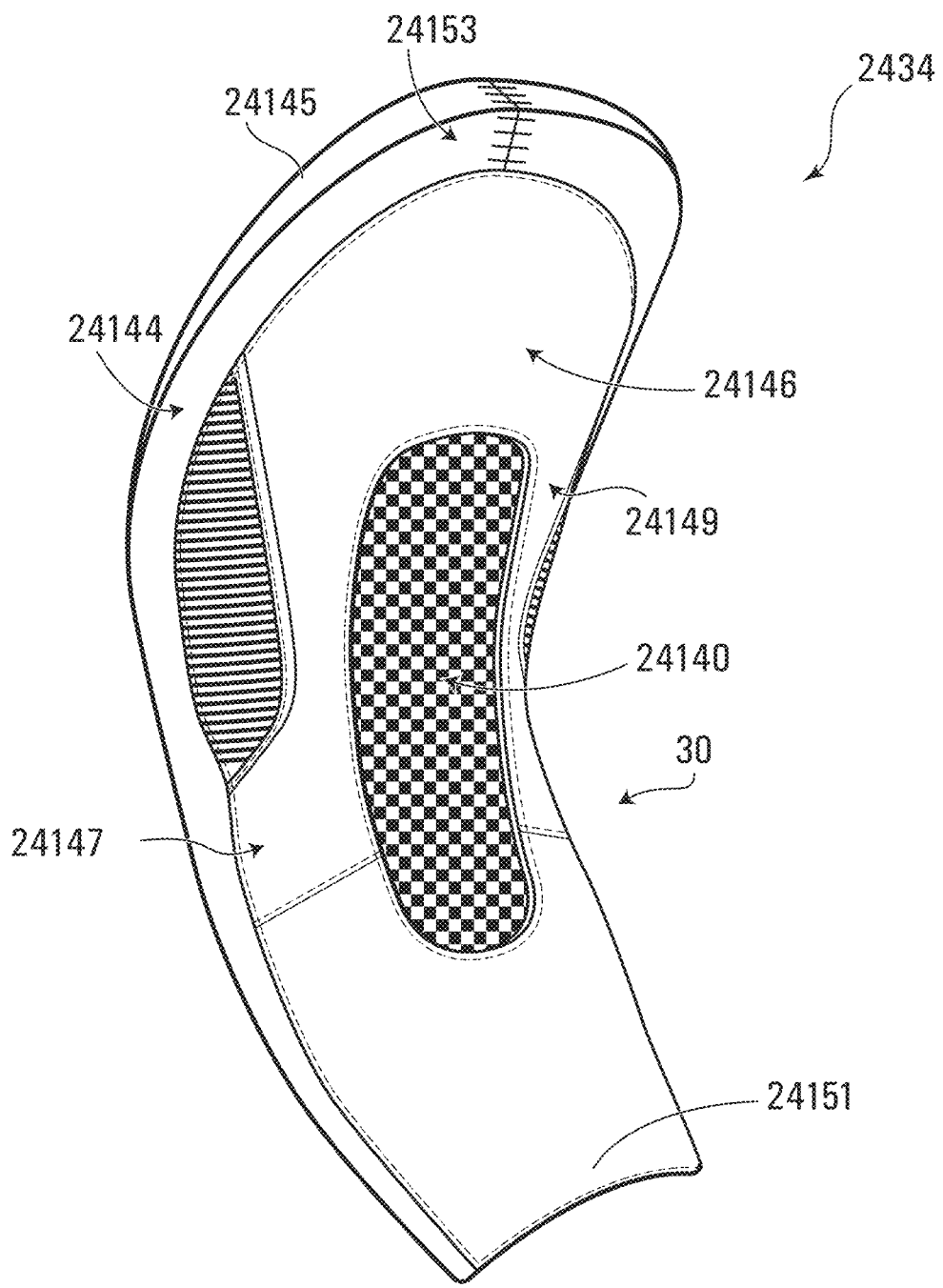
Figure 24H:
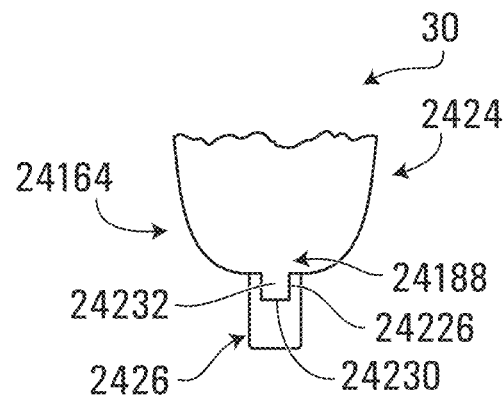
Figure 24I:
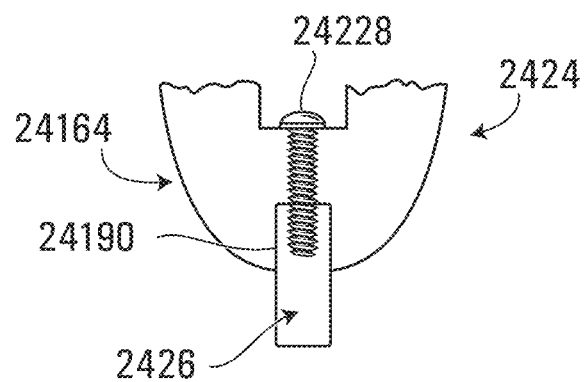
Figure 24J:
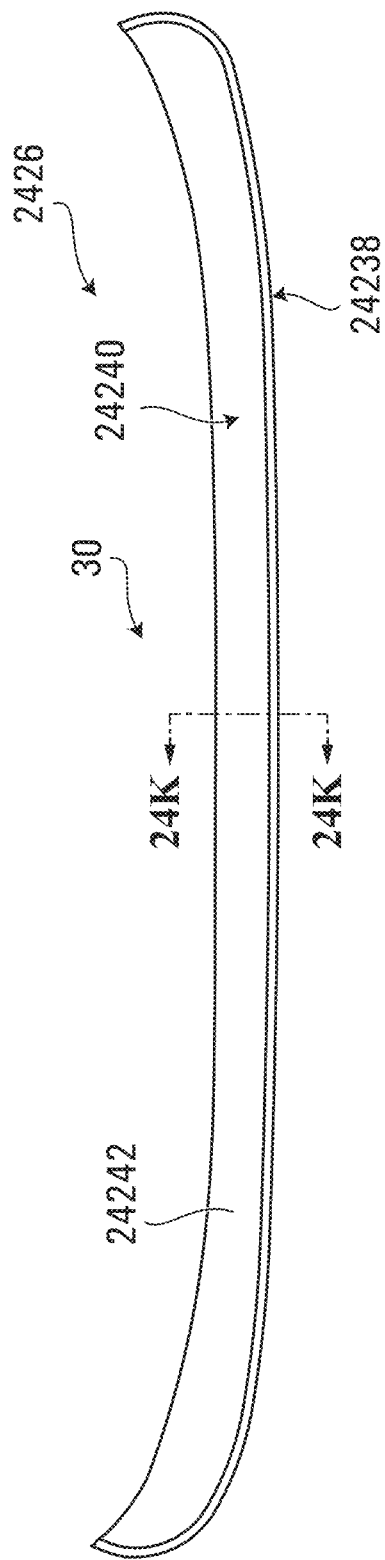
Figure 24K:
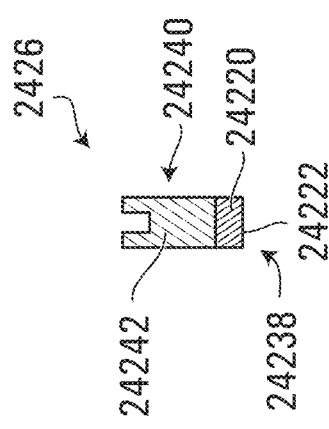
Figure 24L:
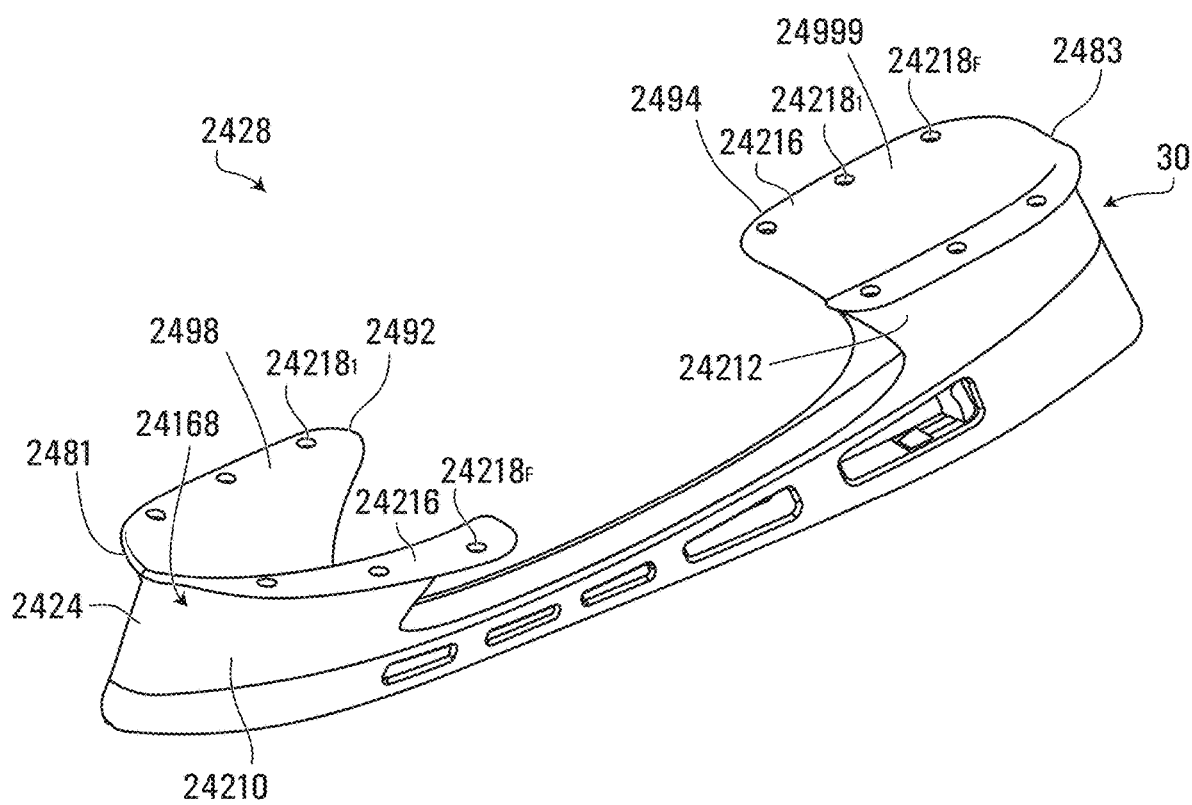
Figure 24M:
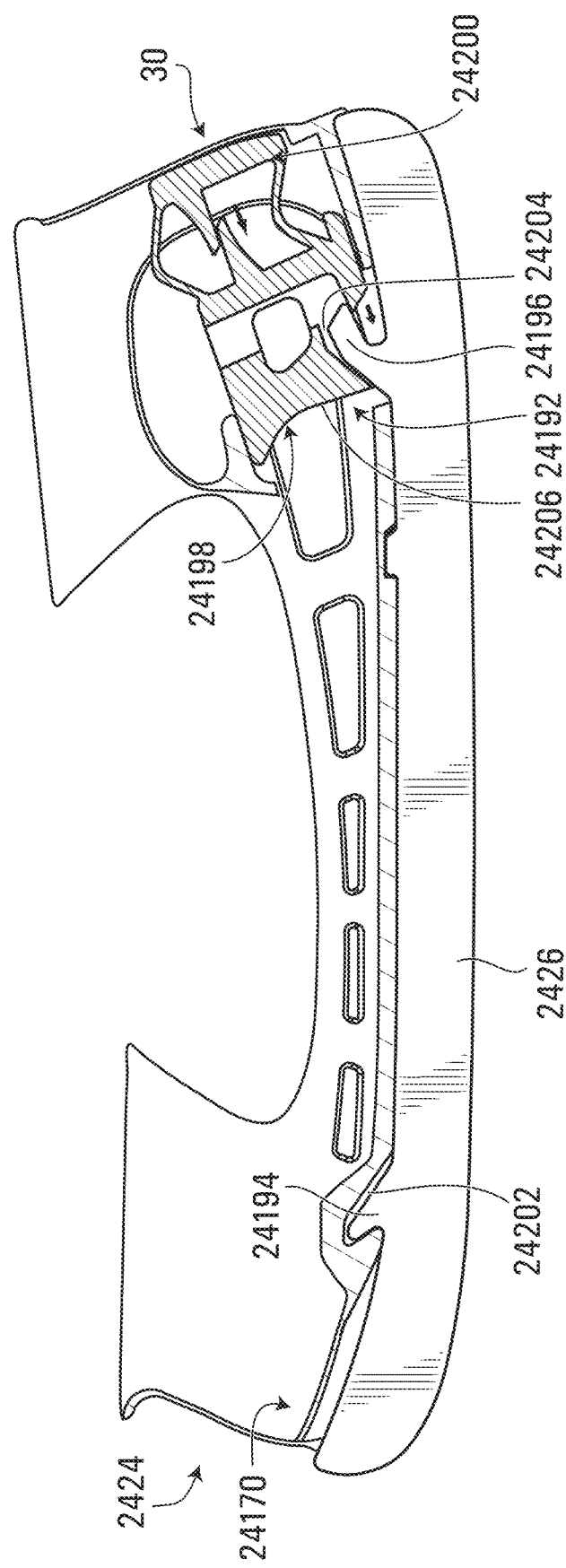
Figure 24N:
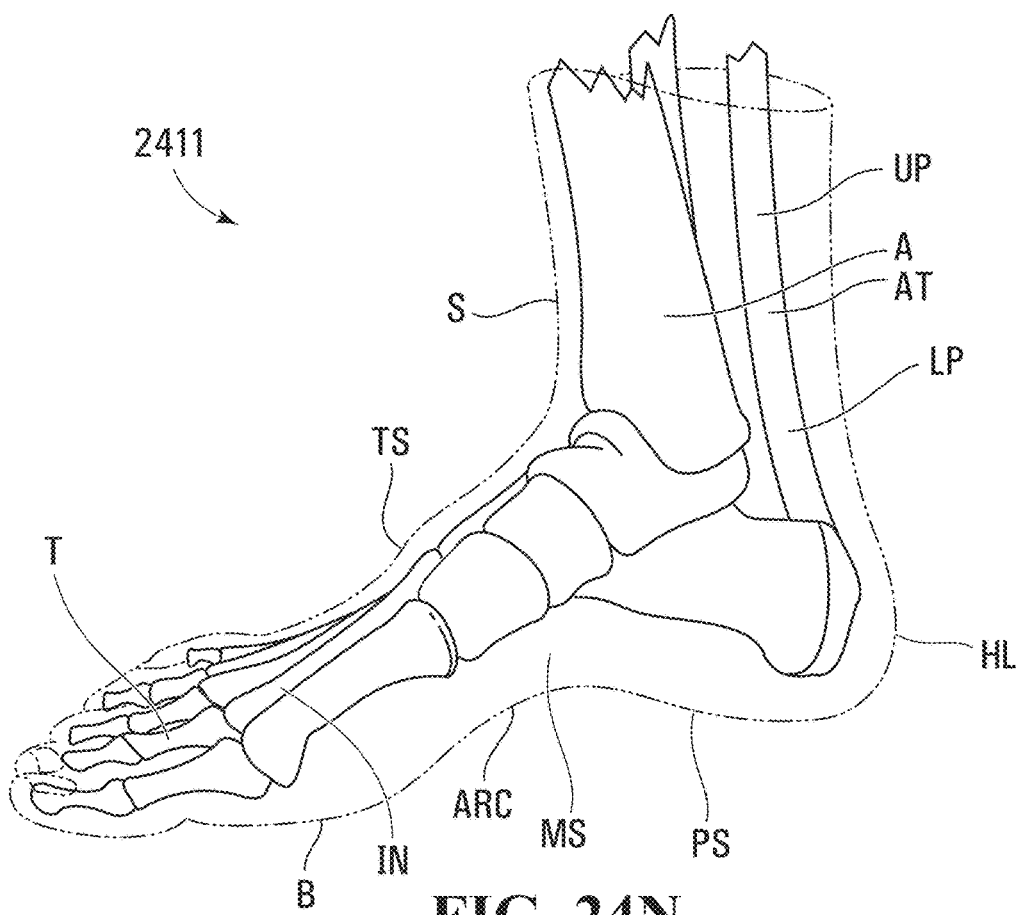
Figure 24O:
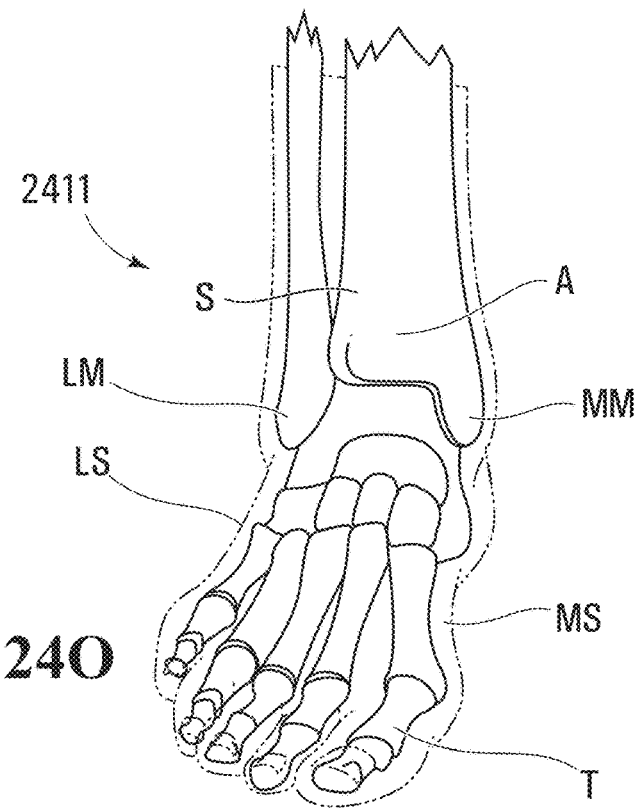
Figure 25A:
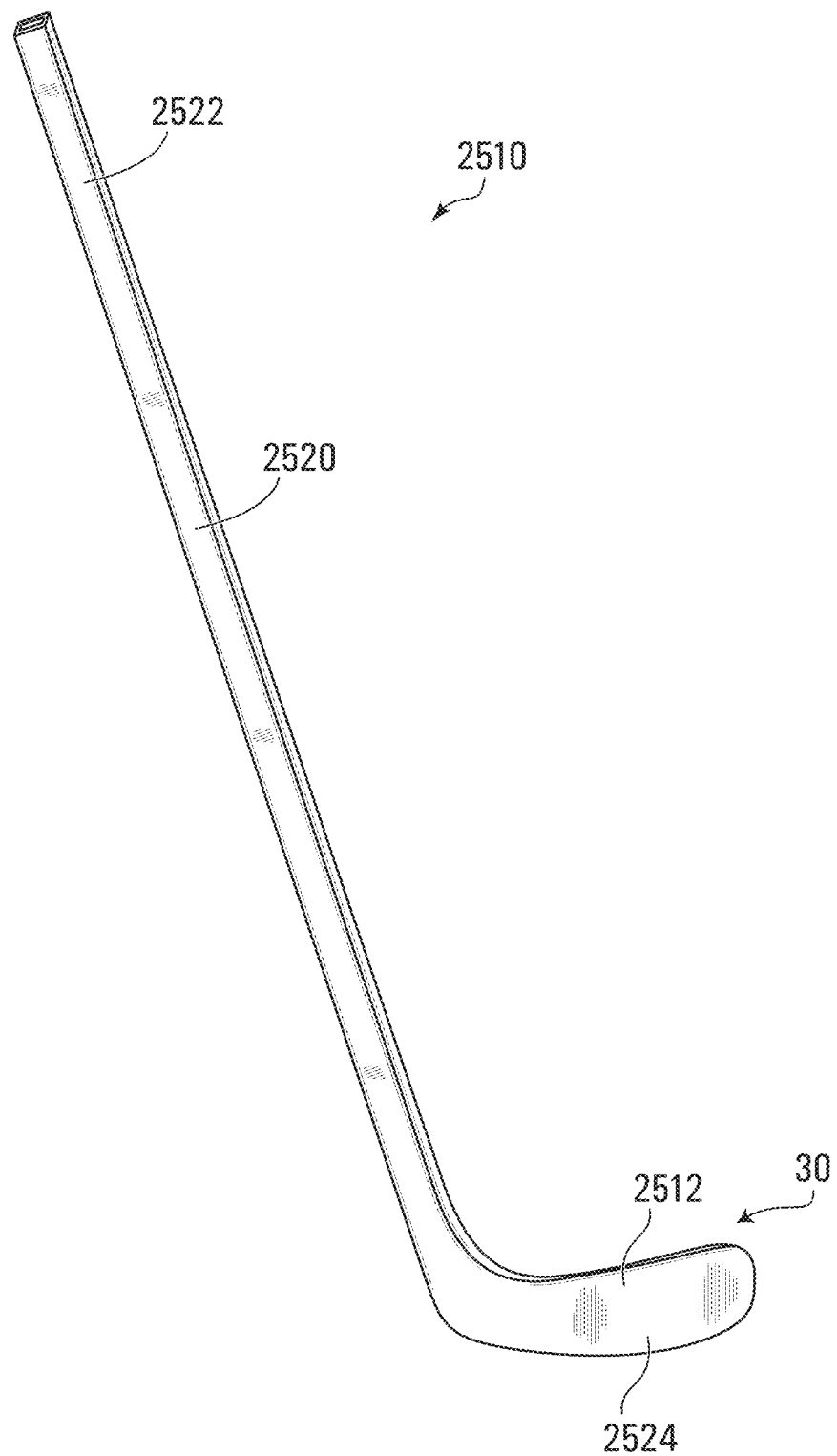
Figure 25B:
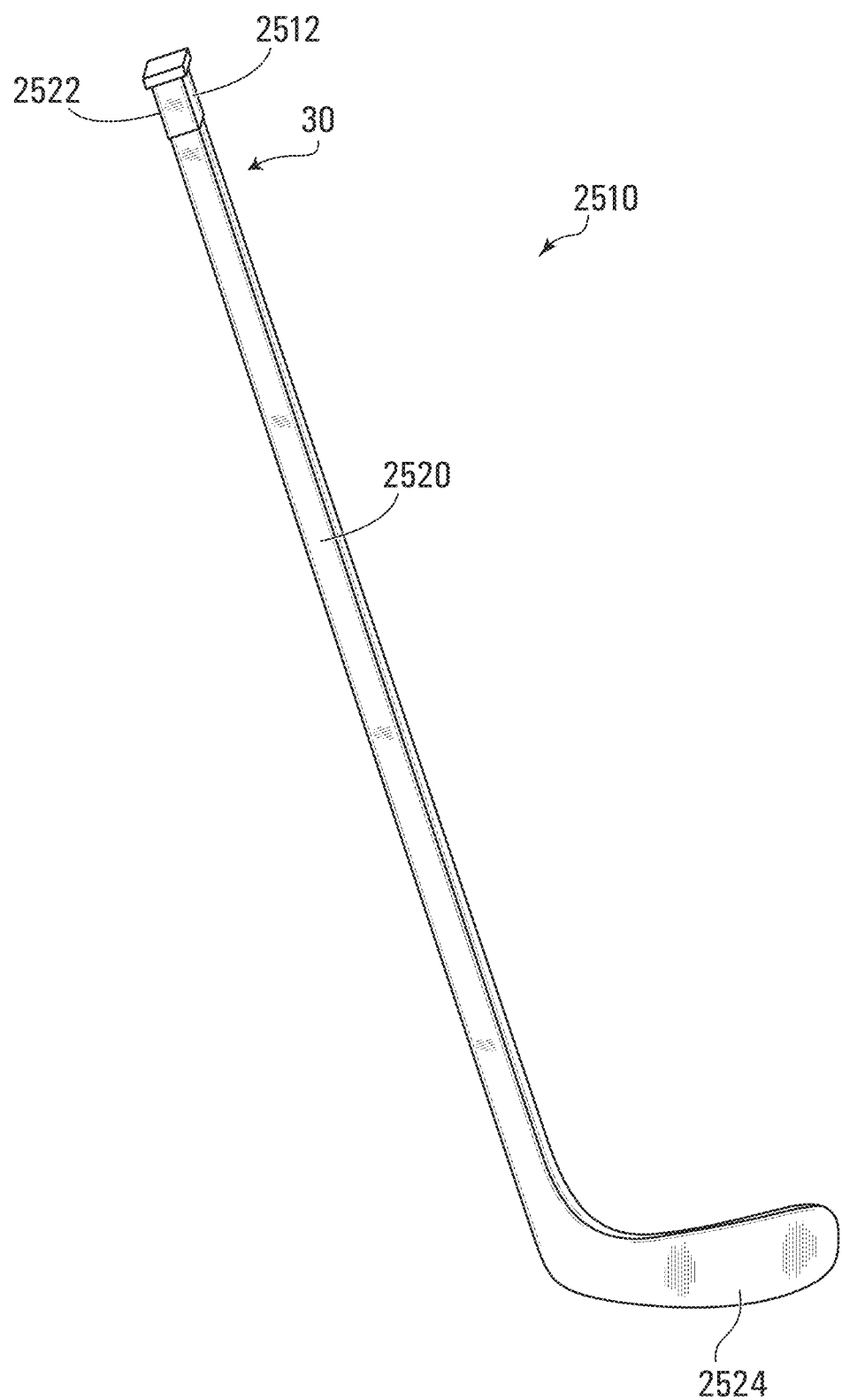
Figure 25C:
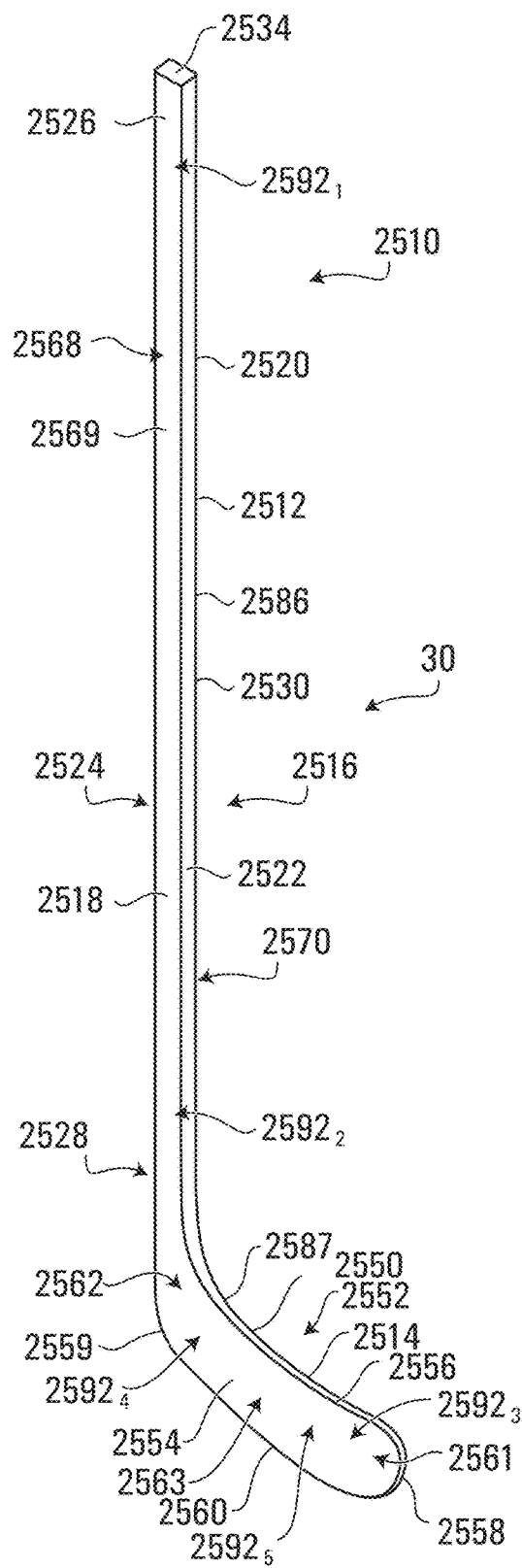
Figure 25D:
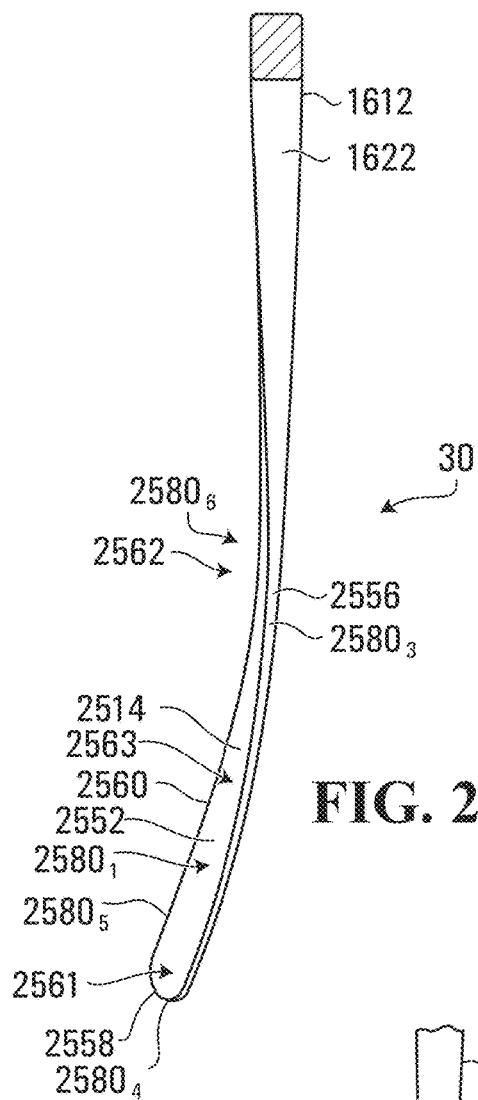
Figure 25E:
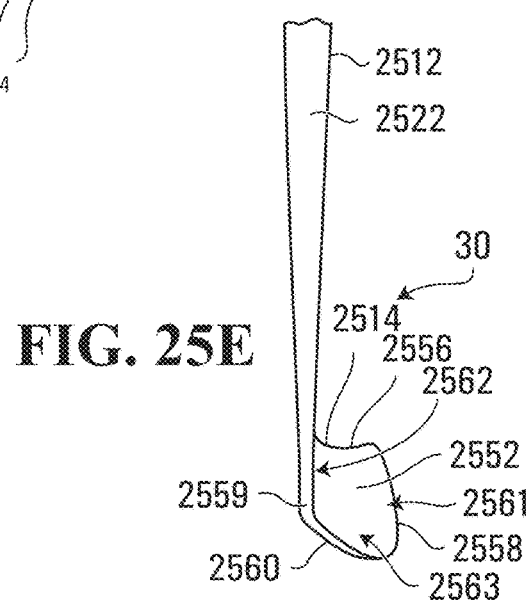

In this embodiment, as shown in FIGS. 24A to 24O, the skate 2410 for a user to skate on a skating surface. In this embodiment, the skate 2410 is a hockey skate for the user who is a hockey player playing hockey. In this example, the skate 2410 is an ice skate, a type of hockey played is ice hockey, and the skating surface is ice.

The skate 2410 comprises a skate boot 2422 for receiving a foot of the player and a skating device 2428 disposed beneath the skate boot 2422 to engage the skating surface. In this embodiment, the skating device 2428 comprises a blade 2426 for contacting the ice and a blade holder 2424 between the skate boot 2422 and the blade 2426. The skate 2410 has a longitudinal direction, a widthwise direction, and a heightwise direction.

The skate boot 2422 defines a cavity for receiving the player's foot. The player's foot may include toes T, a ball B, an arch ARC, a plantar surface PS, a top surface TS including an instep IN, a medial side MS, and a lateral side LS. The top surface TS of the player's foot 2411 is continuous with a lower portion of a shin S of the player. In addition, the player has a heel HL, an Achilles tendon AT, and an ankle A having a medial malleolus MM and a lateral malleolus LM that is at a lower position than the medial malleolus MM. The Achilles tendon AT has an upper part UP and a lower part LP projecting outwardly with relation to the upper part UP and merging with the heel HL. A forefoot of the player includes the toes T and the ball B, a hindfoot of the player includes the heel HL, and a midfoot of the player is between the forefoot and the hindfoot.

The skate boot 2422 comprises a front portion 2456 for receiving the toes T of the player, a rear portion 2458 for receiving the heel HL and at least part of the Achilles tendon AT and the ankle A of the player, and an intermediate portion 2460 between the front portion 2456 and the rear portion 2458.

More particularly, in this embodiment, the skate boot 2422 comprises a body 2430 and a plurality of components affixed to or otherwise supported by the body 2430, which in this embodiment includes overlays $2431_1$-$2431_N$, a tendon guard 2441, a tongue 2434, a liner 2436 and a footbed 2438. The skate boot 2422 also comprises lacing holes $2445_1$-$2445_L$ to receive a lace 2447 and extending through the body 2430, the liner 2436, and the overlays $2431_1$, $2431_2$ which are medial and lateral facings, respectively. In this example, eyelets $2446_1$-$2446_E$ are provided in respective ones of the lacing holes $2445_1$-$2445_L$ to engage the lace 2447.

The body 2430 is a shell which imparts strength and structural integrity to the skate 2410 to support the player's foot 2411. In this embodiment, the shell 2430 comprises a heel portion 2462 for receiving the heel HL of the player, an ankle portion 2464 for receiving the ankle A of the player, and medial and lateral side portions 2466, 2468 for respectively facing the medial and lateral sides MS, LS of the player's foot 11. The shell 2430 thus includes a quarter 2475 which comprises a medial quarter part 2477, a lateral quarter part 2479, and a heel quarter 2481. The heel portion 2462 may be formed such that it is substantially cup-shaped for following a contour of the heel HL of the player. The ankle portion 2464 comprises medial and lateral ankle sides 2474, 2476. The medial ankle side 2474 has a medial depression 2478 for receiving the medial malleolus MM of the player and the lateral ankle side 2476 has a lateral depression 2480 for receiving the lateral malleolus LM of the player. The lateral depression 2480 is located slightly lower than the medial depression 2478 for conforming to the morphology of the player's foot 2411. In this example, the shell 2430 also comprises a sole portion 2469 for facing the plantar surface PS of the player's foot 2411 and a toe portion 2461 for enclosing the toes T of the player.

In this embodiment, the shell 2430 may be manufactured by any suitable way, and any suitable material M may be used to make the shell 2430. For example, in this embodiment, a polymeric material such as polyethylene, polypropylene, polyurethane (PU), ethylene-vinyl acetate (EVA), nylon, polyester, vinyl, polyvinyl chloride, polycarbonate, an ionomer resin (e.g., Surlyn®), styrene-butadiene copolymer (e.g., K-Resin®) etc.), self-reinforced polypropylene composite (e.g., Curv®), glass reinforced materials and/or any other thermoplastic or thermosetting polymer may be used. Different parts of the shell 2430 may vary in material composition, stiffness and/or in thickness for fit, comfort, performance, and/or other reasons.

In this embodiment, the liner 2436 of the skate boot 2422 is affixed to an inner surface 2437 of the shell 2430 and comprises an inner surface 2496 for facing the heel HL and medial and lateral sides MS, LS of the player's foot 2411 and ankle A. The liner 2436 may be affixed to the shell 2430 by stitching or stapling the liner 2436 to the shell 2430, gluing with an adhesive and/or any other suitable technique. The inner lining 2436 may be made of a soft material (e.g., a fabric made of NYLON® fibers, polyester fibers or any other suitable fabric). The footbed 2438 may include a foam layer, which may be made of a polymeric material. For example, the footbed 2438, in some embodiments, may include a foam-backed fabric. The footbed 2438 is mounted inside the shell 2430 and comprises an upper surface 24106 for receiving the plantar surface PS of the player's foot 2411. In this embodiment, the footbed 38 affixed to the sole portion 2469 of the shell 2430 by an adhesive and/or any other suitable technique. In other embodiments, the footbed 2438 may be removable. In some embodiments, the footbed 2438 may also comprise a wall projecting upwardly from the upper surface 24106 to partially cup the heel HL and extend up to a medial line of the player's foot 2411.

The lacing holes $2445_1$-$2445_L$ are configured to receive the lace 2447. In this embodiment, the lacing holes $2445_1$-$2445_L$ extend through the shell 2430, the liner 2436, and the medial and lateral facings $2431_1$, $2431_2$. Thus, in this case, each lacing hole $2445_x$ comprises an opening $2448_x$ in the shell 2430, an opening $2449_x$ in the liner 2436, and an opening $2443_x$ in a given one of the medial and lateral facings $2431_1$, $2431_2$ that are aligned with one another to create the lacing hole $2445_x$. In this embodiment, respective ones of the lacing holes $2445_1$-$2445_L$ are disposed in the medial side portion 2466, the lateral side portion 2468 and the ankle portion 2464. In this embodiment, upper ones of the lacing holes $2445_1$-$2445_L$ extend through the upper part 24302 of the shell 2430 and lower ones of the lacing holes $2445_1$-$2445_L$ extend through the lower part 24304 of the shell 2430.

The tongue 2434 extends upwardly and rearwardly from the toe portion 2461 for overlapping the top surface TS of the player's foot 2411. In this embodiment, the tongue 2434 is affixed to the shell 2430. In particular, in this embodiment, the tongue 2434 is fastened to the toe portion 2461. In some embodiments, the tongue 2434 comprises a core 24140 defining a section of the tongue 2434 with increased rigidity, a padding member (not shown) for absorbing impacts to the tongue 2434, a peripheral member 24144 for at least partially defining a periphery 24145 of the tongue 2434, and a cover member 24146 configured to at least partially define a front surface of the tongue 2434. The tongue 2434 defines a lateral portion 24147 overlying a lateral portion of the player's foot 2411 and a medial portion 24149 overlying a medial portion of the player's foot 2411. The tongue 2434 also defines a distal end portion 24151 for affixing to the toe portion 2461 (e.g., via stitching or riveting) and a proximal end portion 24153 that is nearest to the player's shin S. The core 24140 may be made of foam or similar materials to that of the shell 2430 and may be formed by injection molding in a similar manner to that of the shell 2430, as described herein.

The tendon guard 2441 may be fastened to the shell 2430, such as via a mechanical fastener (e.g., via stitching, stapling, a screw, etc.) or in any other suitable way, or may be integrally made with the shell 2430. For instance, in some embodiments, the ankle portion 2464, the heel portion 2462, the medial side portion 2466, the lateral side portion 2468, the sole portion 2469, and the toe portion 2461 may be molded together and integral with one another and the tendon guard 2441 may be formed separately and attached to the shell 2430 after it has been molded, while in some embodiments the ankle portion 2464, the heel portion 2462, the medial side portion 2466, the lateral side portion 2468, the sole portion 2469, the toe portion 2461 and the tendon guard 2441 may be molded together and integral with one another.

In this embodiment, the blade 2426 comprises a lower portion and an upper portion. In this embodiment, the upper portion of the blade 2426 includes a plurality of projections 24194, 24196 which can be used to attach the blade to the blade holder 2424. The lower portion may comprise an ice-contacting material 24220 including an ice-contacting surface 24222 for sliding on the ice surface while the player skates. In this embodiment, the ice-contacting material 24220 is a metallic material (e.g., stainless steel). The ice-contacting material 24220 may be any other suitable material in other embodiments. In this embodiment, the lower portion and the upper portion of the blade 2426 are unitary and comprise the same material.

The blade 2426 may be implemented in any other suitable way in other embodiments. For example, in some embodiments, the blade 2426 may comprise a lower member 24238 that is made of the ice-contacting material 24220 and includes the ice-contacting surface 24222 and an upper member 24240 connected to the lower member 24238 and made of a material 24242 different from the ice-contacting material 24220. The lower member 24238 and the upper member 24240 of the blade 2426 may be retained together in any suitable way. For example, in some cases, the lower member 238 may be adhesively bonded to the upper member 24240 using an adhesive. As another example, in addition to or instead of being adhesively bonded, the lower member 24238 and the upper member 24240 may be fastened using one or more fasteners (e.g., rivets, screws, bolts, etc.). As yet another example, the lower member 24238 and the upper member 24240 may be mechanically interlocked by an interlocking portion of one of the lower member 24238 and the upper member 24240 that extends into an interlocking space (e.g., one or more holes, one or more recesses, and/or one or more other hollow areas) of the other one of the lower member 24238 and the upper member 24240 (e.g., the upper member 24240 may be overmolded onto the lower member 24238).

The blade holder 2424 comprises a lower portion 24162 comprising a blade-retaining base 24164 that retains the blade 2426 and an upper portion 24166 comprising a support 24168 that extends upwardly from the blade-retaining base 24164 towards the skate boot 2422 to interconnect the blade holder 2424 and the skate boot 2422. A front portion 24170 of the blade holder 2424 and a rear portion 24172 of the blade holder 2424 define a longitudinal axis 24174 of the blade holder 2424. The front portion 24170 of the blade holder 2424 includes a frontmost point 24176 of the blade holder 2424 and extends beneath and along the player's forefoot in use, while the rear portion 24172 of the blade holder 2424 includes a rearmost point 24178 of the blade holder 2424 and extends beneath and along the player's hindfoot in use. An intermediate portion 24180 of the blade holder 2424 is between the front and rear portions 24170, 24172 of the blade holder 2424 and extends beneath and along the player's midfoot in use. The blade holder 2424 comprises a medial side 24182 and a lateral side 24184 that are opposite one another.

The blade-retaining base 24164 is elongated in the longitudinal direction of the blade holder 2424 and is configured to retain the blade 2426 such that the blade 2426 extends along a bottom portion 24186 of the blade-retaining base 24164 to contact the ice surface. To that end, the blade-retaining base 24164 comprises a blade-retention portion 24188 to face and retain the blade 2426. In this embodiment, the blade-retention portion 24188 comprises a recess 24190 in which an upper portion of the blade 2426 is disposed.

The blade holder 2424 can retain the blade 2426 in any suitable way. For example, in this embodiment, the blade holder 2424 comprises a blade-detachment mechanism 24192 such that the blade 2426 is selectively detachable and removable from, and attachable to, the blade holder 2424 (e.g., when the blade 2426 is worn out or otherwise needs to be replaced or removed from the blade holder 2424).

More particularly, in this embodiment, the blade-detachment mechanism 24192 includes an actuator 24198 and a biasing element 24200 which biases the actuator 24198 in a direction towards the front portion 24170 of the blade holder 2424. In this embodiment, the actuator 24198 comprises a trigger. To attach the blade 2426 to the blade holder 2424, the front projection 24194 is first positioned within a hollow space 24202 (e.g., a recess or hole) of the blade holder 2424. The rear projection 24196 can then be pushed upwardly into a hollow space 24204 (e.g., a recess or hole) of the blade holder 2424, thereby causing the biasing element 24200 to bend and the actuator 24198 to move in a rearward direction. In this embodiment, the rear projection 24196 will eventually reach a position which will allow the biasing element 24200 to force the actuator 24198 towards the front portion 24170 of the blade holder 2424, thereby locking the blade 2426 in place. The blade 2426 can then be removed by pushing against a finger-actuating surface 24206 of the actuator 24198 to release the rear projection 24196 from the hollow space 24204 of the blade holder 2424. Thus, in this embodiment, the blade-detachment mechanism 24192 is free of any threaded fastener (e.g., a screw or bolt) to be manipulated to detach and remove the blade 2426 from the blade holder 2424 or to attach the blade 2426 to the blade holder 2424.

Further information on examples of implementation of the blade-detachment mechanism 24192 in some embodiments may be obtained from U.S. Pat. No. 8,454,030 hereby incorporated by reference herein. The blade-detachment mechanism 24192 may be configured in any other suitable way in other embodiments.

The support 24168 is configured for supporting the skate boot 2422 above the blade-retaining base 24164 and transmit forces to and from the blade-retaining base 24164 during skating. In this embodiment, the support 24168 comprises a front pillar 24210 and a rear pillar 24212 which extend upwardly from the blade-retaining base 24164 towards the skate boot 2422. The front pillar 24210 extends towards the front portion 2456 of the skate boot 2422 and the rear pillar 24212 extends towards the rear portion 2458 of the skate boot 2422. The blade-retaining base 24164 extends from the front pillar 24210 to the rear pillar 24212. More particularly, in this embodiment, the blade-retaining base 24164 comprises a bridge 24214 interconnecting the front and rear pillars 24210, 24212.

The skate 2410, including the skate boot 2422, the blade holder 2424 and the blade 2426, may be implemented in any other suitable manner in other embodiments.

In this non-limiting example of implantation, the skate 2410 comprises the component 30. Non-limiting variants of the skate 2410 implementing the component 30 are further described below.

In a first skate variant, the component 30 is configured to cause a change in a suspension of the skate 1110, 1120, 2410 based on a received control signal CTRL_SIG. The processing entity 204 receives the sensor signal SENS_SIG, processes it, and sends a control signal CTRL_SIG to cause a change in the suspension of the skate.

In particular, the suspension of the skate 1110, 1120, 2410 may be disposed in a blade-holding portion of the skate 1110, 1120, 2410 or between the blade-holding portion of the skate 1110, 1120, 2410 and a skate boot of the skate 1110, 1120, 2410. The skate 1110, 1120, 2410 may comprise the sensors 206 which, in this embodiment, are force sensors. The processing entity 204 may process the sensor signal SENS_SIG to determine if the skate 1110, 1120, 2410 is in a rest situation or in a dynamic situation. In a rest situation, high reactivity of the skate 1110, 1120, 2410 may not be required and it may be advantageous to have a skate exhibiting less stiffness for more comfort. In contrast, in a dynamic situation, high reactivity of the skate 1110, 1120, 2410 may be important and it may thus be advantageous to have a stiffer skate. In this embodiment, if the sensor signal SENS_SIG is below a threshold, the processing entity 204 may consider the skate 1110, 1120, 2410 to be in a rest situation and may generate the control signal CTRL_SIG which may diminish a stiffness of the suspension of the skate 1110, 1120, 2410. If the sensor signal SENS_SIG is above the threshold, the processing entity 204 may consider the skate 1110, 1120, 2410 to be in a dynamic situation and may generate the control signal CTRL_SIG which may increase the stiffness of the suspension of the skate 1110, 1120, 2410.

In a second skate variant, the skate 1110, 1120, 2410 has a tongue (e.g., the tongue 2434). The component 30 is configured to cause a change in a flexibility of the tongue of the skate 1110, 1120, 2410 based on a received control signal CTRL_SIG. The processing entity 204 receives the sensor signal SENS_SIG, processes it, and sends a control signal CTRL_SIG to cause a change in the flexibility of the tongue.

In particular, the skate 1110, 1120, 2410 may comprise the sensors 206 which, in this embodiment, are accelerometers. The processing entity 204 may process the sensor signal SENS_SIG to determine if the skate 1110, 1120, 2410 is in a low-speed situation or in a high-speed situation. In a low-speed situation, high agility of the skate 1110, 1120, 2410 may be required and it may be advantageous to have a tongue exhibiting more flexibility for more comfort. In contrast, in a high-speed situation, it may be advantageous to have a stiffer tongue in order to increase comfort and/or power transfer to a playing surface during skating strides. In this embodiment, if the sensor signal SENS_SIG is below a threshold, the processing entity 204 may consider the skate 1110, 1120, 2410 to be in a low-speed situation and may generate a control signal CTRL_SIG which may diminish a stiffness of the tongue 1130 of the skate 1110, 1120, 2410. If the sensor signal SENS_SIG is above the threshold, the processing entity 204 may consider the skate 1110, 1120, 2410 to be in a high-speed situation and may generate the control signal CTRL_SIG which may increase the stiffness of the tongue 1130 of the skate 1110, 1120, 2410.

In a third skate variant, the skate has a tendon guard (e.g., the tendon guard 2441). The component 30 is configured to cause a change in a flexibility of the tendon guard of the skate 1110, 1120, 2410 based on a received control signal CTRL_SIG. The processing entity 204 receives the sensor signal SENS_SIG, processes it, and sends a control signal CTRL_SIG to cause a change in the flexibility of the tendon guard.

In particular, the skate 1110, 1120, 2410 may comprise the sensors 206 which, in this embodiment, are accelerometers. The processing entity 204 may process the sensor signal SENS_SIG to determine if the skate 1110, 1120, 2410 is in a low-speed situation or in a high-speed situation. In a low-speed situation, high agility of the skate 1110, 1120, 2410 may be required and it may be advantageous to have a tendon guard exhibiting more flexibility for more comfort. In contrast, in a high-speed situation, it may be advantageous to have a stiffer tendon guard, e.g., for better comfort at high speeds and/or in order to increase power transfer to a playing surface during skating strides. In this embodiment, if the sensor signal SENS_SIG is below a threshold, the processing entity 204 may consider the skate 1110, 1120, 2410 to be in a low-speed situation and may generate a control signal CTRL_SIG which may diminish a stiffness of the tendon guard of the skate 1110, 1120, 2410. If the sensor signal SENS_SIG is above the threshold, the processing entity 204 may consider the skate 1110, 1120, 2410 to be in a high-speed situation and may generate the control signal CTRL_SIG which may increase the stiffness of the tendon guard of the skate 1110, 1120, 2410.

Figure 40A:
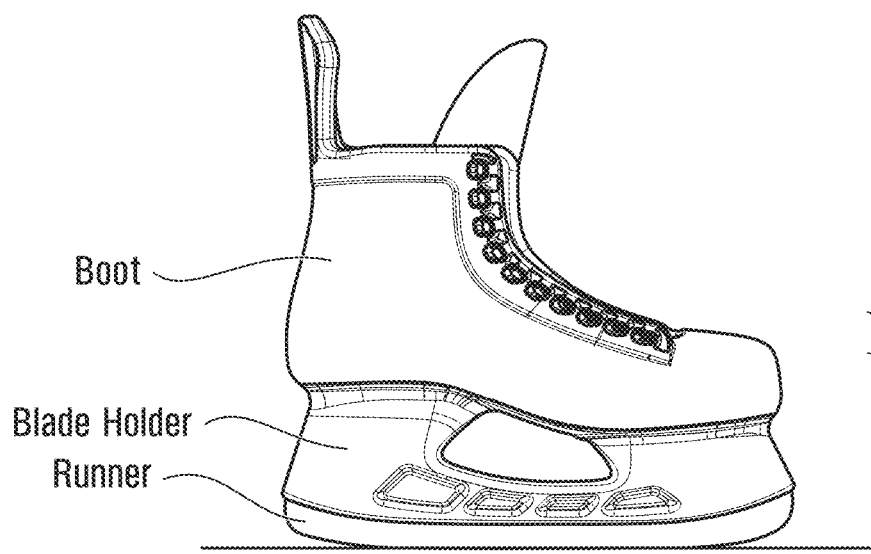
FIGS. 40A to 40C show a skate to which a different pitch has been applied in each case.
Figure 40B:
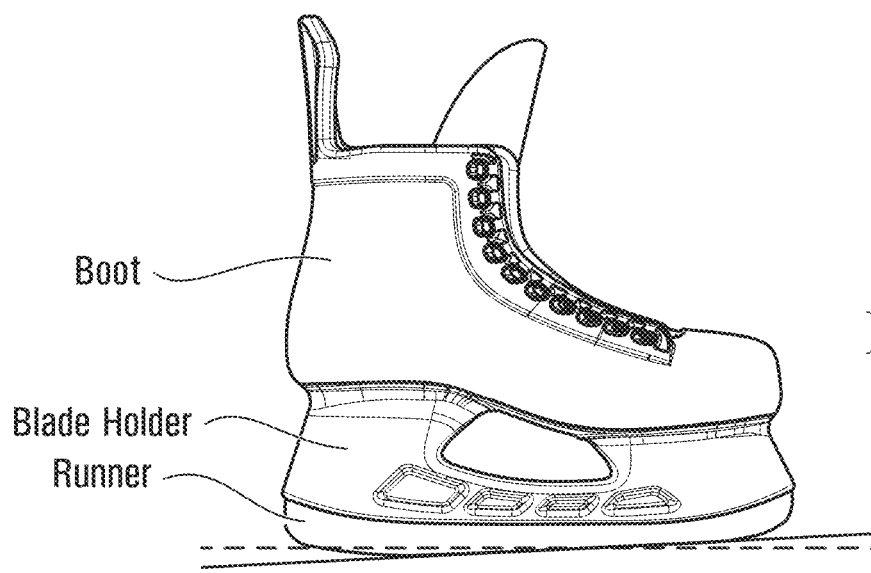
Figure 40C:
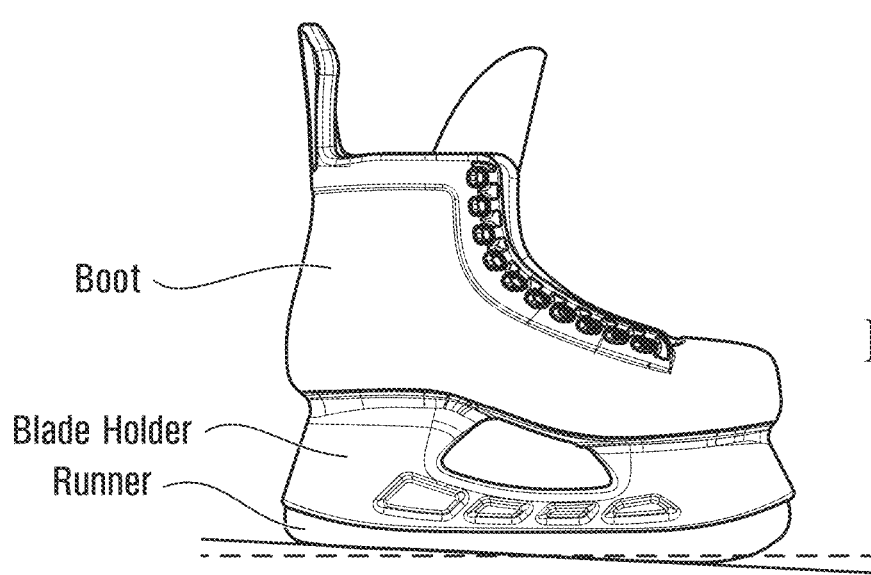

In a fourth skate variant, the component 30 is configured to cause a change in a pitch 1150 of the skate 1110, 1120, 2410 based on a received control signal CTRL_SIG. The processing entity 204 receives the sensor signal SENS_SIG, processes it, and sends a control signal CTRL_SIG to cause a change in the pitch 1150 of the skate 1110, 1120, 2410. As shown in FIGS. 40A, 40B and 40C, pitch is the angle in which the blade (runner) leans toward the ice. It can be forward (FIG. 40B), neutral (FIG. 40A) or reverse/backward (FIG. 40C), and in varying amounts (in degrees or fractions of inches). For example a minor forward pitch could be 0.5 degrees or 1/64".

In this non-limiting variant, the skate 1110, 1120, 2410 may comprise the sensors 206 which, in this embodiment, are accelerometers. The processing entity 204 may process the sensor signal SENS_SIG to determine if the skate 1110, 1120, 2410 is in a low-speed situation or in a high-speed situation. In a low-speed situation, high agility of the skate 1110, 1120, 2410 may be required and it may be advantageous to have a more neutral pitch. In contrast, in a high-speed situation, it may be advantageous to have a more forward pitch in order to increase power transfer to a playing surface during skating strides. In this embodiment, if the sensor signal SENS_SIG is below a threshold, the processing entity 204 may consider the skate 1110, 1120, 2410 to be in a low-speed situation and may generate a control signal CTRL_SIG which may diminish the pitch 1150 of the skate 1110, 1120, 2410. If the sensor signal SENS_SIG is above the threshold, the processing entity 204 may consider the skate 1110, 1120, 2410 to be in a high-speed situation and may generate the control signal CTRL_SIG which may increase the pitch 1150 of the skate 1110, 1120, 2410.

In another variant, the processing entity 204 may process the sensor signal SENS_SIG to determine if the skate 1110, 1120, 2410 is skating forward or backward. In a forward skating scenario, a more forward pitch of the skate 1110, 1120, 2410 may be advantageous. In a backward skating scenario, a more neutral pitch of the skate 1110, 1120, 2410 may be advantageous. As such, in general, pitch adjustments are made to the skate as a function of direction of movement (or change to direction of movement) of the skate and/or player.

Of course, the value of CTRL_SIG in this embodiment as in all others may be modulated in intensity over time in order to correspond with a detected movement pattern.

In a fifth skate variant, the component 30 is configured to cause a change in a profile of the runner based on a received control signal CTRL_SIG. The processing entity 204 receives the sensor signal SENS_SIG, processes it to determine a movement pattern (or parameters indicative of a particular movement pattern), and sends a control signal CTRL_SIG to cause a change in the runner profile based on the movement pattern/parameters. The runner profile can therefore be mapped to what the skate or player is found to be doing. For example, if a turn is detected, it may be advantageous to slightly adjust the rectitude of the holder/runner and create a slight parabolic profile to the runner to facilitate that turn.

As such, the processing entity 204 is configured to cause a change in a profile of the runner based on the sensor signal SENS_SIG. More particular, the processing entity 204 is configured to cause a profile of the runner to change from a first profile to a second profile in response to the sensor signal SENS_SIG being associated with a movement indicating that the skate is turning or that a user of the skate is turning. Then, the processing entity 204 may be configured to cause the profile of the runner to return to the first profile in response to the sensor signal SENS_SIG being associated with a movement indicating that the skate is no longer turning or that a user of the skate is no longer turning. In an embodiment, the second profile is more curved than the first profile. In another embodiment, the second profile is more parabolic than the first profile. This may be taken to mean that if the first and second profiles were best-fit to the formula $y=ax^2$, for some value of a, the "a" for the first profile would be smaller than the "a" for the second profile. Generally, those skilled in the art will understand what is meant by one surface appearing to be more curved (or more parabolic, or less straight) than another.

Figure 41:
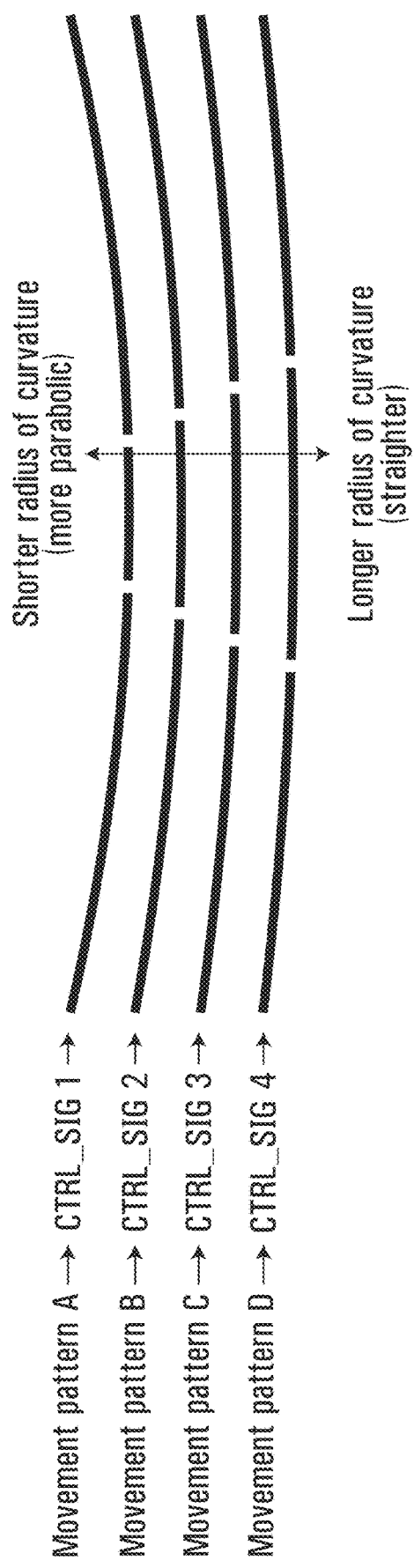
FIG. 41 illustrates a relationship between movement patterns and runner profiles, in accordance with a non-limiting embodiment.
Figure 42:
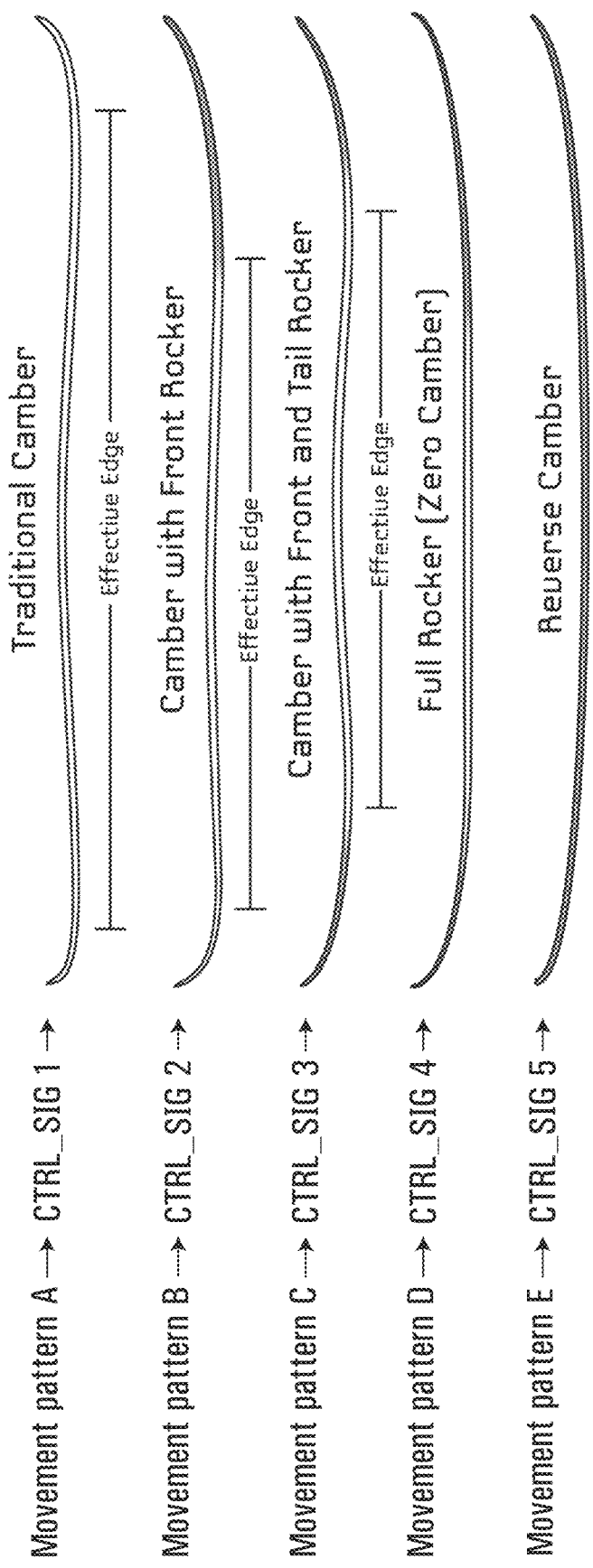
FIG. 42 illustrates a relationship between movement patterns and ski base profiles, in accordance with a non-limiting embodiment.

FIG. 41 shows how various detected movement patterns (of which there are 4 in this example) may correspond to different radii of curvature of a central portion of the runner. There may be fewer possible radii of curvature, and there may be a continuity rather than a discreteness between radii of curvature. Also, curvature (or parabolic likeness) need not be measure by radius of curvature per se, but could be customized for skates so as to have different areas or shapes. As such, there may be simply a mapping between detected movement pattern and profile, with this profile having parameters that influence its shape, and it is these parameters that are controlled by the control signal CTRL_SIG. Detection of turning may thus trigger a more curved shape of runner and detection of no turning may thus trigger a less curved shape of runner, or a return to its original state in case it had been made more curved through previous action of the control signal CTRL_SIG.

In a sixth skate variant, the component 30 is configured to cause a change in a stiffness of a skate boot of the skate 1110, 1120, 2410 based on a received control signal CTRL_SIG. The processing entity 204 receives the sensor signal SENS_SIG, processes it, and sends a control signal CTRL_SIG to cause a change in the suspension of the skate. It should be appreciated that a similar approach may be adopted for other boots (e.g., ski boots) and footwear, thereby to adjust stiffness of the boot or other footwear in a manner that depends on a condition being met, such as parameters associated with a movement pattern being detected.

In particular, the skate boot of the skate 1110, 1120, 2410 may be disposed in a blade-holding portion of the skate 1110, 1120, 2410 or between the blade-holding portion of the skate 1110, 1120, 2410 and a skate boot of the skate 1110, 1120, 2410. The skate 1110, 1120, 2410 may comprise the sensors 206 which, in this embodiment, are force sensors. The processing entity 204 may process the sensor signal SENS_SIG to determine if the skate 1110, 1120, 2410 is in a rest situation or in a dynamic situation. In a rest situation, high reactivity of the skate boot may not be required, and it may be advantageous to have a skate boot exhibiting less stiffness for more comfort. In contrast, in a dynamic situation, high reactivity of the skate 1110, 1120, 2410 may be important and it may thus be advantageous to have a stiffer skate. In this embodiment, if the sensor signal SENS_SIG is below a threshold, the processing entity 204 may consider the skate 1110, 1120, 2410 to be in a rest situation and may generate a control signal CTRL_SIG which may diminish a stiffness of the skate boot of the skate 1110, 1120, 2410. If the sensor signal SENS_SIG is above the threshold, the processing entity 204 may consider the skate 1110, 1120, 2410 to be in a dynamic situation and may generate a control signal CTRL_SIG which may increase the stiffness of the skate boot of the skate 1110, 1120, 2410.

In other embodiments, the component 30 can cause a change to a functional or visual aspect of any element of a skate as described above.

Although in the example described above the footwear 10 is a skate, the footwear 10 may be any other type of footwear in other embodiments. For example, in some embodiments the footwear 10 is a ski boot; in some embodiments the footwear 10 is a snowboard boot; in some embodiments, the footwear 10 is a cleat (e.g., a soccer/football cleat); in some embodiments the footwear 10 is a working boot; in some embodiments the footwear 10 is an outdoor boot; and so on, and in each of the aforementioned embodiments the footwear may implement the component 30.

Sticks

Figure 12:
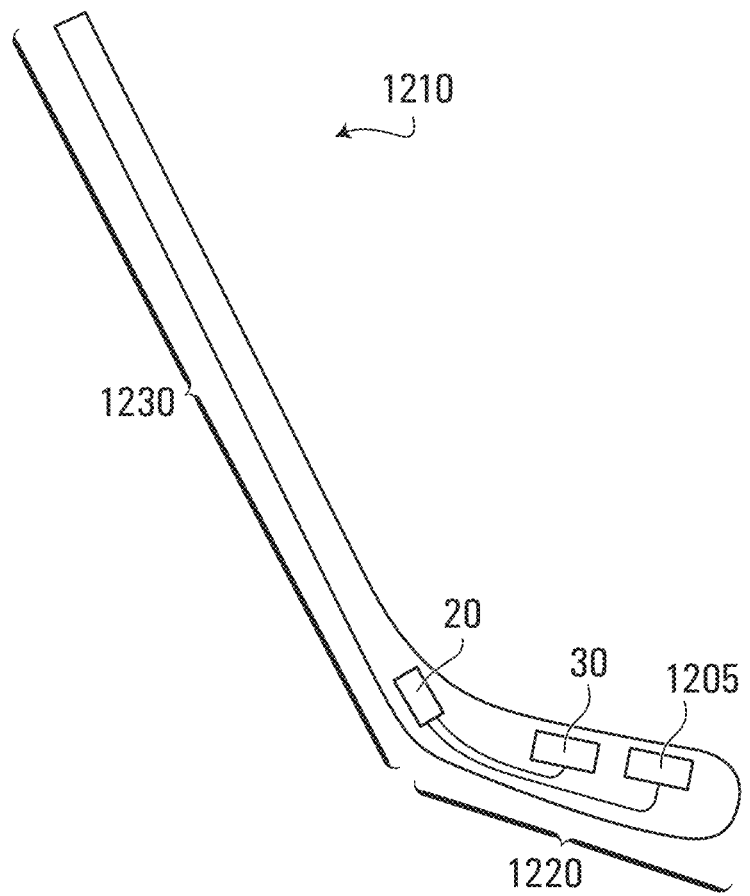
FIG. 12 shows a hockey stick with a sensor, a controller and a component capable of having a characteristic altered.

In another specific non-limiting example of implementation, the article of sports equipment 10 is a stick, e.g., a hockey stick as shown in FIG. 1 at 10 and in FIG. 12 at 1210. FIGS. 25A to 25E at 2510 and FIG. 26 at 2610 show other embodiments of a hockey stick, and FIGS. 27A and 27B show an embodiment of a lacrosse stick at 2710, to which specific non-limiting examples of implementation may be applied.

FIGS. 25A to 25E show embodiments of a sporting implement 2510 for use by a user engaging in a sport. The sporting implement 2510 comprises an elongate holdable member 2512 configured to be held by the user and an object-contacting member 2514 configured to contact an object (e.g., a puck or ball) intended to be moved in the sport. In this embodiment, the sport is hockey and the sporting implement 2510 is a hockey stick for use by the user, who is a hockey player, to pass, shoot or otherwise move a puck or ball. The elongate holdable member 2512 of the hockey stick 2510 is a shaft, which comprises a handle 2520 of the hockey stick 2510, and the object-contacting member 2514 of the hockey stick 2510 is a blade.

In this embodiment, as further discussed later, the hockey stick 2510 is designed to enhance its use, performance and/or manufacturing, including, for example, by being lightweight, having improved strength, flex, stiffness, impact resistance and/or other properties, reducing scrap or waste during its construction, and/or enhancing other aspects of the hockey stick 2510.

The shaft 2512 is configured to be held by the player to use the hockey stick 2510. A periphery 2530 of the shaft 2512 includes a front surface 2516 and a rear surface 2518 opposite one another, as well as a top surface 2522 and a bottom surface 2524 opposite one another. Proximal and distal end portions 2526, 2528 of the shaft 2512 are spaced apart in a longitudinal direction of the shaft 2512, respectively adjacent to the handle 2520 and the blade 2514, and define a length of the shaft 2512. A length of the hockey stick 2510 is measured from a proximal end 2534 of the shaft 2512 along the top surface 2522 of the shaft 2512 through the blade 2514.

A cross-section of the shaft 2512 may have any suitable configuration. For instance, in this embodiment, the cross-section of the shaft 2512 has a major axis 2536 which defines a major dimension D of the shaft's cross-section and a minor axis 2538 which defines a minor dimension W of the shaft's cross-section. In this example, the cross-section of the shaft 2512 is generally polygonal. More particularly, in this example, the cross-section of the shaft 2512 is generally rectangular, with the front surface 2516, the rear surface 2518, the top surface 2522, and the bottom surface 2524 being generally flat. Corners between these surfaces of the shaft 2512 may be rounded or beveled.

The shaft 2512 may have any other suitable shape and/or be constructed in any other suitable way in other embodiments. For example, in some embodiments, the cross-section of the shaft 2512 may have any other suitable shape (e.g., the front surface 2516, the rear surface 2518, the top surface 2522, and/or the bottom surface 2524 may be curved and/or angular and/or have any other suitable shape, possibly including two or more sides or segments oriented differently, such that the cross-section of the shaft 2512 may be pentagonal, hexagonal, heptagonal, octagonal, partly or fully curved, etc.). As another example, the cross-section of the shaft 2512 may vary along the length of the shaft 2512.

The blade 2514 is configured to allow the player to pass, shoot or otherwise move the puck or ball. A periphery 2550 of the blade 2514 comprises a front surface 2552 and a rear surface 2554 opposite one another, as well as a top edge 2556, a toe edge 2558, a heel edge 2559, and a bottom edge 2560. The blade 2514 comprises a toe region 2561, a heel region 2562, and an intermediate region 2563 between the toe region 2561 and the heel region 2562. The blade 2514 has a longitudinal direction that defines a length of the blade 2514, a thicknesswise direction that is normal to the longitudinal direction and defines a thickness of the blade 2514, and a heightwise direction that is normal to the longitudinal direction and defines a height of the blade 2514.

A cross-section of the blade 2514 may have any suitable configuration. For instance, in this embodiment, the cross-section of the blade 2514 varies along the longitudinal direction of the blade 2514 (e.g., tapers towards the toe region 2561 of the blade 2514), with the front surface 2552 and the rear surface 2554 curving so that the front surface 2552 is concave and the rear surface 2554 is convex. Corners between the front surface 2552, the rear surface 2554, the top edge 2556, the toe edge 2558, the heel edge 2559, and the bottom edge 2560 may be rounded or beveled.

The blade 2514 may have any other suitable shape and/or be constructed in any other suitable way in other embodiments. For example, in some embodiments, the cross-section of the blade 2514 may have any other suitable shape (e.g., the front surface 2552, the rear surface 2554, the top edge 5256, the toe edge 2558, the heel edge 2559, and the bottom edge 2560 may be curved differently and/or angular and/or have any other suitable shape, etc.).

The shaft 2512 and the blade 2514 may be interconnected in any suitable way. For instance, in this embodiment, the shaft 2512 and the blade 2514 are integrally formed with one another (i.e., at least part of the shaft 2512 and at least of the blade 2514 are integrally formed together) such that they constitute a one-piece stick. In other embodiments, the blade 2514 may be secured to and removable from the shaft 2512 (e.g., by inserting a shank of the blade 2514, which may include a tenon, into a cavity of the shaft 2512).

Figure 26:
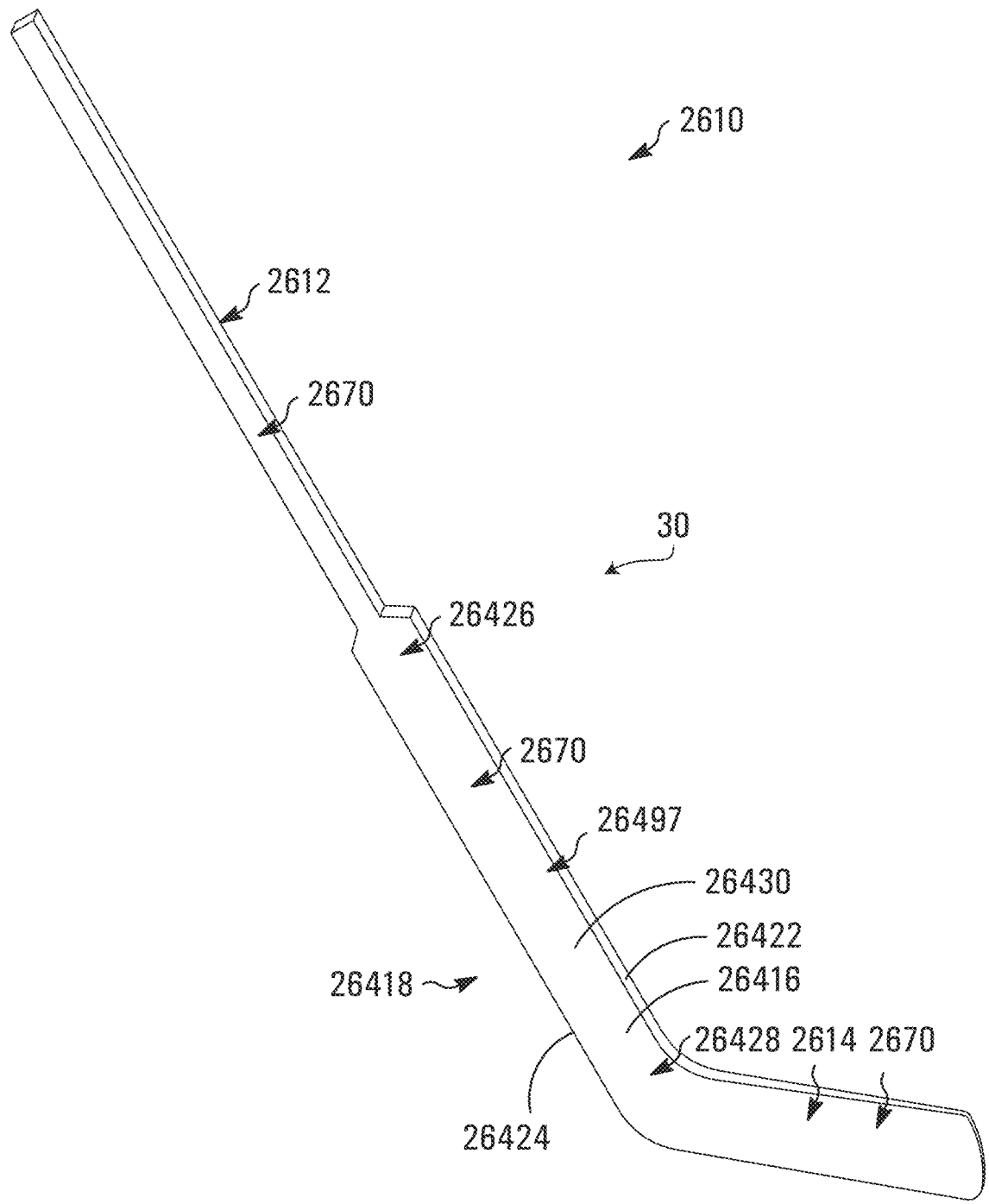
Figure 27A:
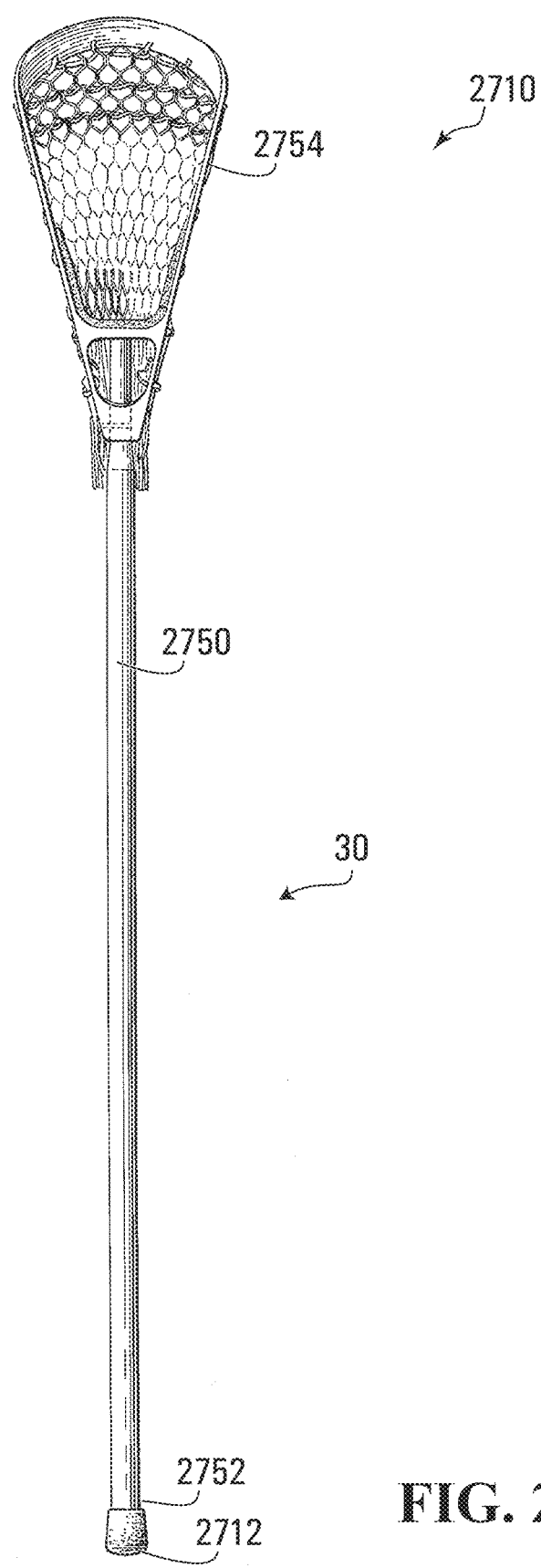
Figure 27B:
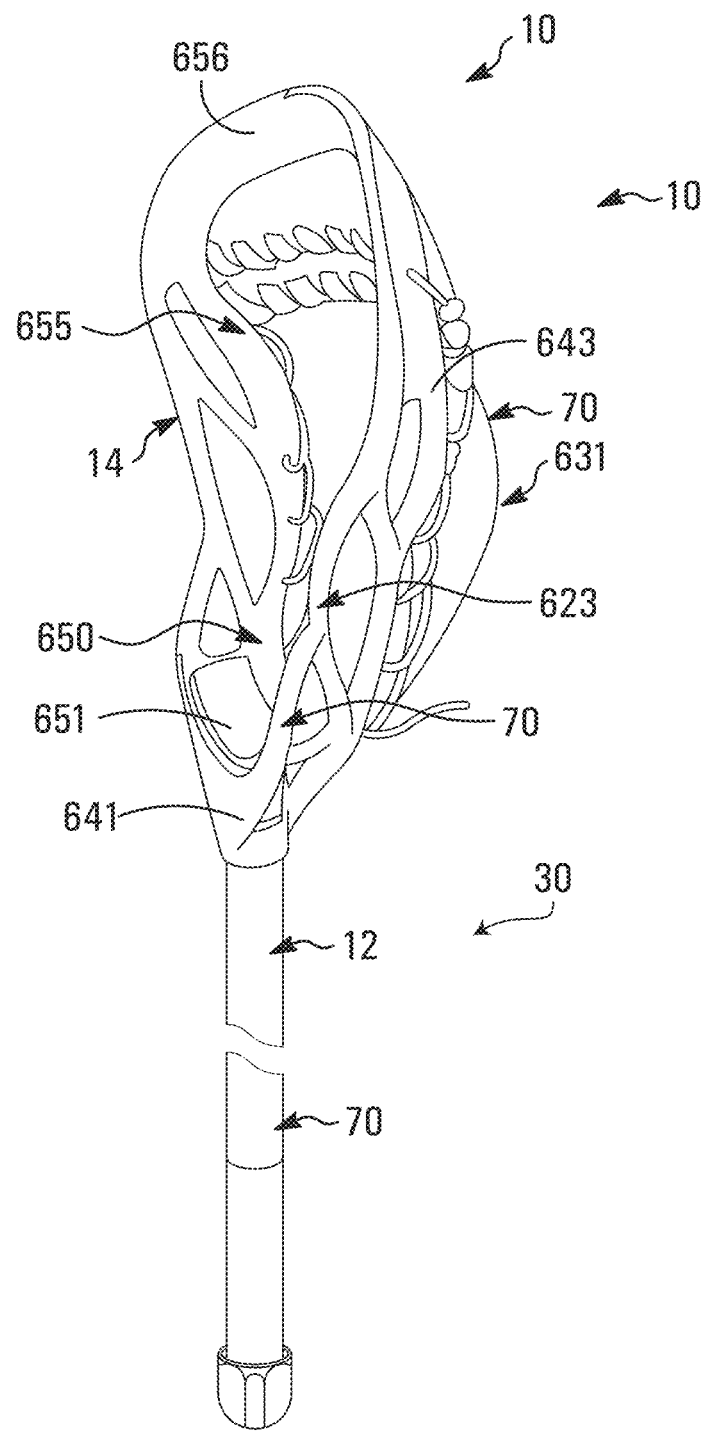

While in this embodiment the hockey stick 2510 is a player stick for the user that is a forward, i.e., right wing, left wing, or center, or a defenseman, in other embodiments, as shown in FIG. 26, the article 10 may be a goalie stick 2610 where the user is a goalie. The goalie stick 2610 may be constructed according to principles discussed herein.

In this embodiment, the goalie stick 2610 comprises a paddle 26497 that may be constructed according to principles discussed herein. For instance, in some embodiments, the paddle 26497 may be disposed between the shaft 2612 and the blade 2614. The paddle 26497 is configured to block hockey pucks from flying into the net. A periphery 26430 of the paddle 26497 includes a front surface 26416 and a rear surface 26418 opposite one another, as well as a top edge 26422 and a bottom edge 26424 opposite one another. Proximal and distal end portions 26426, 26428 of the paddle 26497 are spaced apart in a longitudinal direction of the paddle 26497, respectively adjacent to the shaft 2612 and the blade 2614, and define a length of the paddle 26497.

Although in this embodiment the article is a sport implement that is a hockey stick, in other embodiments, the article 10 may be any other implement used for striking, propelling or otherwise moving an object in a sport.

For example, in other embodiments, as shown in FIGS. 27A and 27B, the article 10 may be a lacrosse stick 2710 for a lacrosse player, in which the object-contacting member 2714 of the lacrosse stick 2710 comprises a lacrosse head for carrying, shooting and passing a lacrosse ball.

The lacrosse head 2714 comprises a frame 2723 and a pocket 2731 connected to the frame 2723 and configured to hold the lacrosse ball. The frame 2723 includes a base 2741 connected to the shaft 2712 and a sidewall 2743 extending from the base 2741. In this embodiment, the sidewall 2743 is shaped to form a narrower area 2750 including a ball stop 2751 adjacent to the base 2741 and an enlarged area 2755 including a scoop 2756 opposite to the base 2741. Also, in this embodiment, the pocket 2731 includes a mesh 2760.

The stick 1210, 2510, 2610, 2710 including its components, may be implemented in any other suitable manner in other embodiments.

In this non-limiting example of implantation, the stick 1210, 2510, 2610, 2710 comprises the component 30. Non-limiting variants of the stick 1210, 2510, 2610, 2710 implementing the component 30 are further described below.

In a first stick variant, the component 30 is configured to cause a change in a curvature of a blade 1220 the stick 1210, 2510, 2610, 2710 based on a received control signal CTRL_SIG. The processing entity 204 receives the sensor signal SENS_SIG, processes it, and sends a control signal CTRL_SIG to cause a change in the curvature of the blade 1220 of the stick 1210, 2510, 2610, 2710 (e.g., which may be constructed in a similar fashion as the blades 2514, 2614 described above).

Figure 13A:
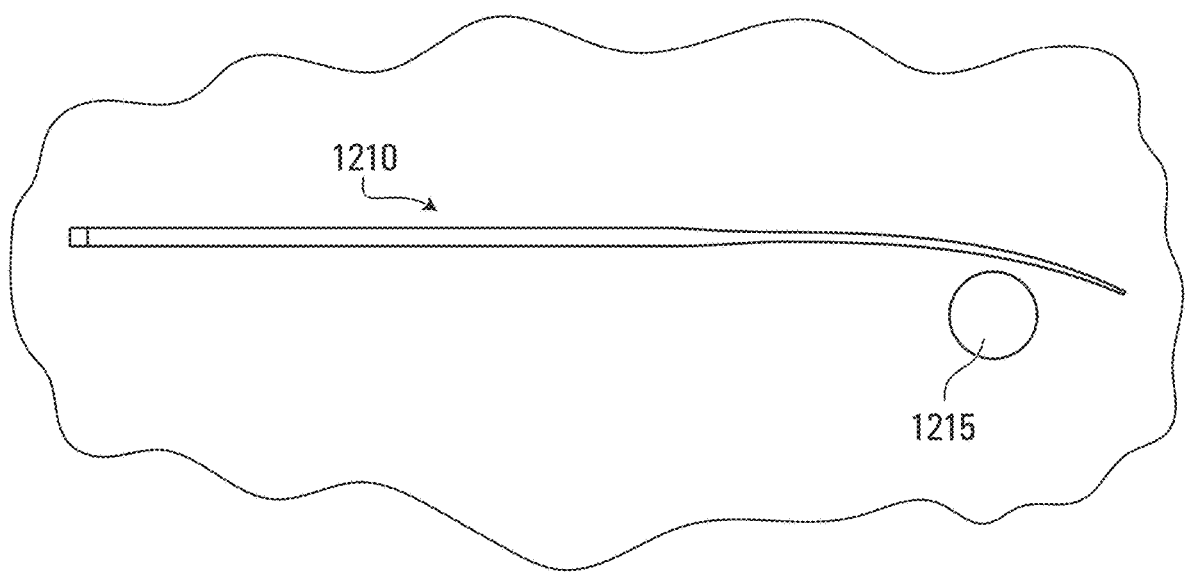
FIGS. 13A and 13B are views of a blade of a hockey stick, from above an ice surface, wherein the blade has a more pronounced curvature induced by a component such as that of FIG. 12.
Figure 13B:
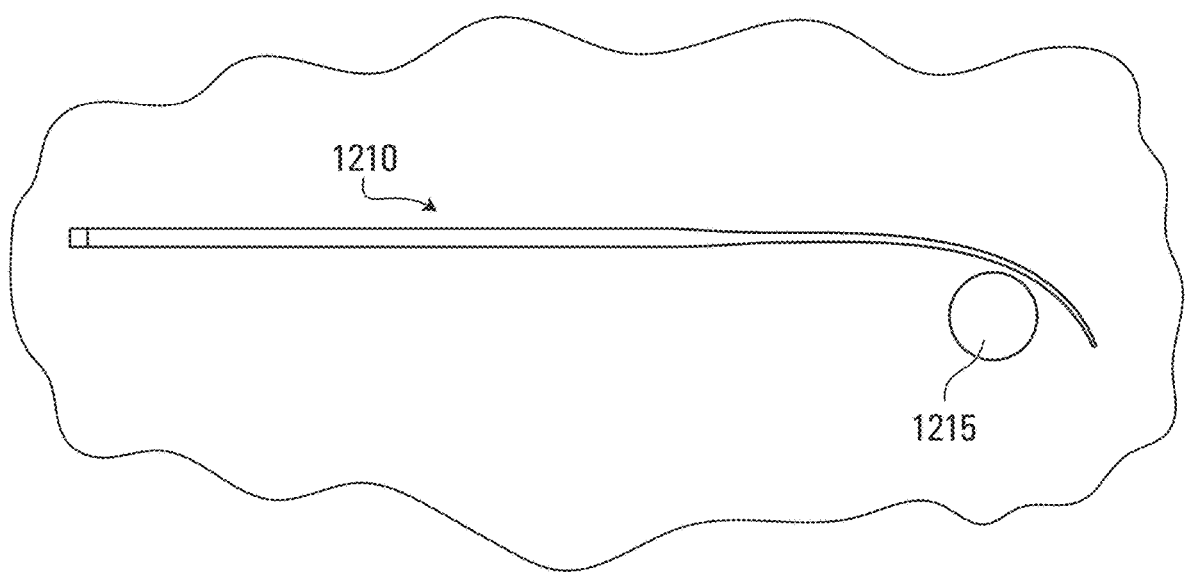

For example, the component 30 can comprise a shape memory alloy. A sensor 1205 (such as an accelerometer or an array of pressure sensors) embedded in the blade 1220 allow the controller 20 to determine that a puck has contacted the blade 1220. In this case, the controller 20 can pass a current through the shape memory alloy to increase the curvature of the blade 1220 and thus create a "cupping effect" as seen in FIGS. 13A and 13B. This additional deformation of the blade 1220 (e.g., by decreasing the radius of curvature 1310) can help cradle the puck 1215, allowing better control thereof. Suitable examples of shape memory alloy may include Copper-aluminum-nickel alloy and Nickel-Titanium alloy (Nitinol 55 or Nitinol 60).

The radius of curvature 1310 of the blade 1220 can vary from 15.7 inches to over 46 inches. Upon impact, the radius can become 20% to 30% smaller as a result of the aforementioned cupping effect. Thereafter, upon deformation, and to additionally create a snapping effect with the blade, the blade may be made to snap back in place faster. As such, a return to its neutral axis by controllably bringing the blade back to its original radius of curvature. The value of the control signal CTRL_SIG mapped over time in order to achieve this effect may be stored as one of the application curves in memory.

In a second stick variant, the stick 1210, 2510, 2610, 2710 has a shaft 1230 (e.g., which may be constructed in a similar fashion as the shafts 2512, 2612 described above). The component 30 is configured to cause a change in a stiffness of at least part of the shaft 1230 of the stick 1210, 2510, 2610, 2710 based on a received control signal CTRL_SIG. The processing entity 204 receives the sensor signal SENS_SIG, processes it, and sends a control signal CTRL_SIG to cause a change in the stiffness of the shaft 1230 of the stick 1210, 2510, 2610, 2710.

For example, the component 30 comprises a shape memory allow such as nitinol. When the controller 20 sends a current through the material, it shrinks, in effect causing it to move. This may help the hockey stick 1210, 2510, 2610, 2710 spring back faster to its original position upon impact and thus shoot the puck quicker.

Figure 14A:
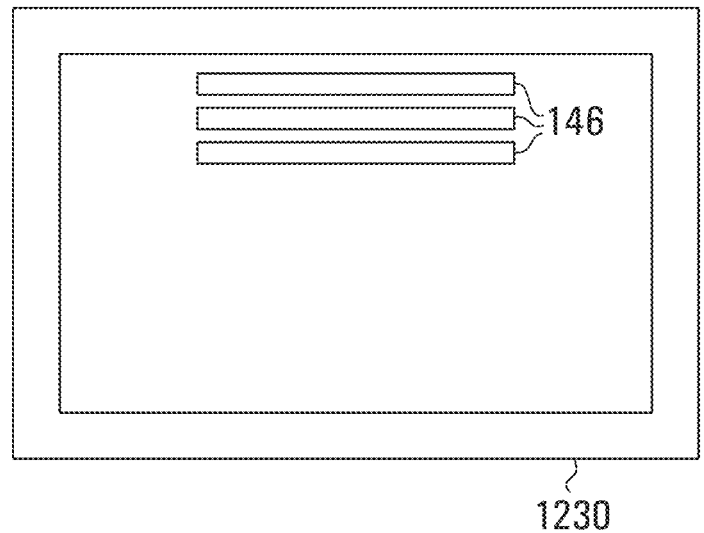
FIGS. 14A and 14B are, respectively, widthwise and lengthwise cross-sectional views of a shaft of a hockey stick showing a stack of layers of a material that changes properties based upon the state of a micro solenoid pump.
Figure 14B:
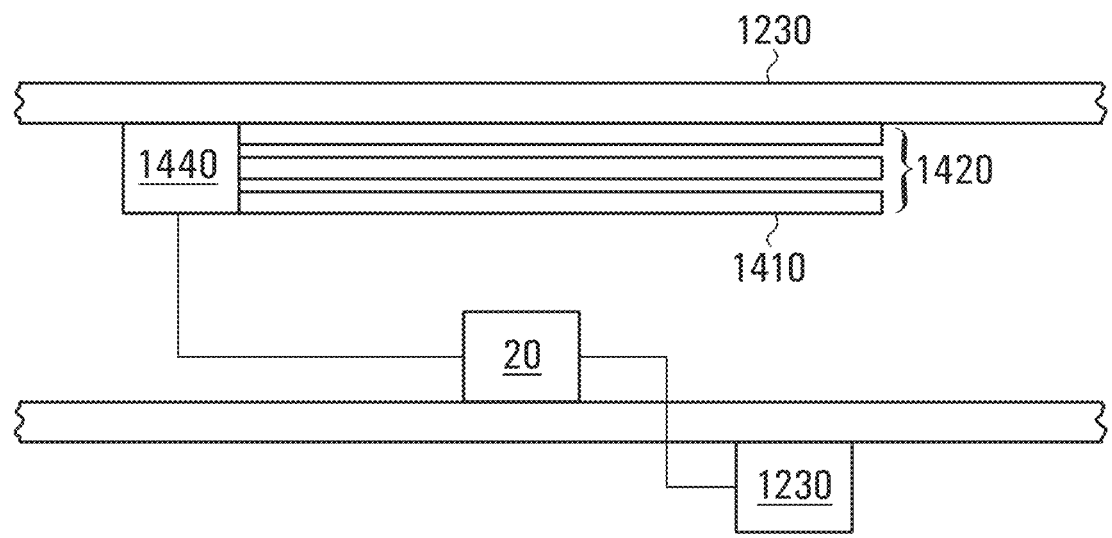

In another specific non-limiting example, shown in FIGS. 14A and 14B, the component 30 comprises a stack 1420 of several thin sheets 1410 of material. This can be referred to as "layer jamming". According to this technique, vacuum or pressure is applied between the several thin sheets 1410 of material. When there is no pressure or vacuum applied on the multiple sheets 1410, they can slide on top of each other and the stack 1420 of these sheets would be quite flexible. However, if one applies a high pressure or pulls vacuum so that the thin layers of material cannot slide, the stack 1420 of sheets becomes instantly stiffer. As such, one or more sensors 1230 (accelerometers and gyroscopes) could be embedded in the blade 1220 to measure the behavior of the stick 1210, 2510, 2610, 2710. Once the controller 20 would recognize a specific pattern in the signals measured by the accelerometer and gyroscope, it would send a signal CTRL_SIG to a micro solenoid pump 1440, which increases the pressure inside the stick 1210, 2510, 2610, 2710 to compress a floating layer 1410 onto an inner wall 1450 of the shaft 1230 to boost stiffness of the shaft 1230 during a slapshot for example. Once the task is complete, the pressure would drop back to normal to bring back the original stiffness of the stick. It is expected that the pressure required is around 40-80 psi to increase stiffness by 10-20%.

As such, it is appreciated that different levels of the control signal cause the component 30 to exhibit different degrees of stiffness, thus allowing a characteristic of the component 30 to be altered under control of the controller 20. Other examples of the component 30 whose characteristic is alterable include other materials with controllable properties such as a piezoelectric material, which can be energized with a control signal from the controller 20. In one example, the piezoelectric material could be a piezoelectric fiber. In another example, the piezoelectric material could be a paint that contains a fine powder of a piezoelectric material (such as, e.g., lead zirconate titanate (PZT)), which is able to sense vibrations. When PZT crystals are stretched or squeezed they produce an electrical signal that is proportional to the force. For example, a patch piezoelectric paint can be painted onto a section of the article of sports equipment 10 and coated with a second layer of an electrically conductive paint. A voltage can be applied to the piezoelectric paint to cause stretching or compression of the paint and, along with it, of the section covered by the piezoelectric paint. The piezoelectric paint could also be used in its reverse role as a vibration sensor.

In particular, the shaft 1230 of the stick 1210, 2510, 2610, 2710 may comprise the sensors 206 which, in this embodiment, are pressure sensors disposed over a delimited portion of the stick 1210, 2510, 2610, 2710. The pressure sensors 206 of the stick 1210, 2510, 2610, 2710 may be disposed in a region of the shaft 1230 that is typically gripped by a lower hand of a hockey player when preparing for a slapshot. In this embodiment, when the pressure sensors 206 are pressed above a predetermined threshold (e.g., by the lower hand of the hockey player) and the sensor signal SENS_SIG is above a predetermined threshold, the processing entity 204 may consider that the stick 1210, 2510, 2610, 2710 is being used for a slapshot and may generate the control signal CTRL_SIG which will increase the stiffness of the shaft 1230 of the stick 1210, 2510, 2610, 2710 to increase stored energy and power transfer during the slapshot. If the pressure sensors 206 are not pressed above the predetermined threshold (e.g., because there is no hand gripping the delimited portion of the stick 1210, 2510, 2610, 2710), the processing entity 204 may consider that the stick 1210, 2510, 2610, 2710 is not being used for a slapshot and may not generate any control signal, effectively maintaining the original (lower) stiffness of the shaft 1230 of the stick 1210, 2510, 2610, 2710 to increase puck control. In the case of a wrist shot, the opposite may be done, i.e., a lower stiffness right as the shot is being made.

In a third stick variant, now described with reference to FIGS. 15A and 15B, the component 30 is configured to cause a change in a weight distribution along at least part of the shaft 1230 of the stick 1210, 2510, 2610, 2710 based on a received control signal CTRL_SIG. The processing entity 204 receives the sensor signal SENS_SIG, processes it, and sends a control signal CTRL_SIG to cause a change in the weight distribution along the shaft 1230 of the stick 1210, 2510, 2610, 2710. A change in weight distribution inside the stick could create a "hammer" effect. One way this could be achieved by moving a mass 1510 affixed to a bracket 1520 within the stick (e.g., within the shaft 1230), the mass comprising a shape memory alloy or fiber. For example, running a current through the mass 1510 will shrink it and it will move upwards along the shaft (against gravity) because the bracket 1520 is fixed. Stopping the current from the controller 1520 will bring the mass 1510 down towards the blade 1220. In a specific example, it may be desirable to keep the mass 1510 in a stable position higher up the shaft when the player is stick-handling or passing (resulting in lower inertia, which allows the player to move his/her hands and the puck with greater ease). However, on a slap shot, it may be desirable to drop that mass 1510 down towards the blade 1210 during, e.g., the downswing to add inertia to the movement and generate a higher shot velocity and/or power. Here too, accelerometers and/or gyroscopes 1530 coupled with an onboard chip in the controller 20 analyzing the signals in real time could be a solution to trigger the mass 1510 drop exactly at the right moment.

Figures 15A, 15B:
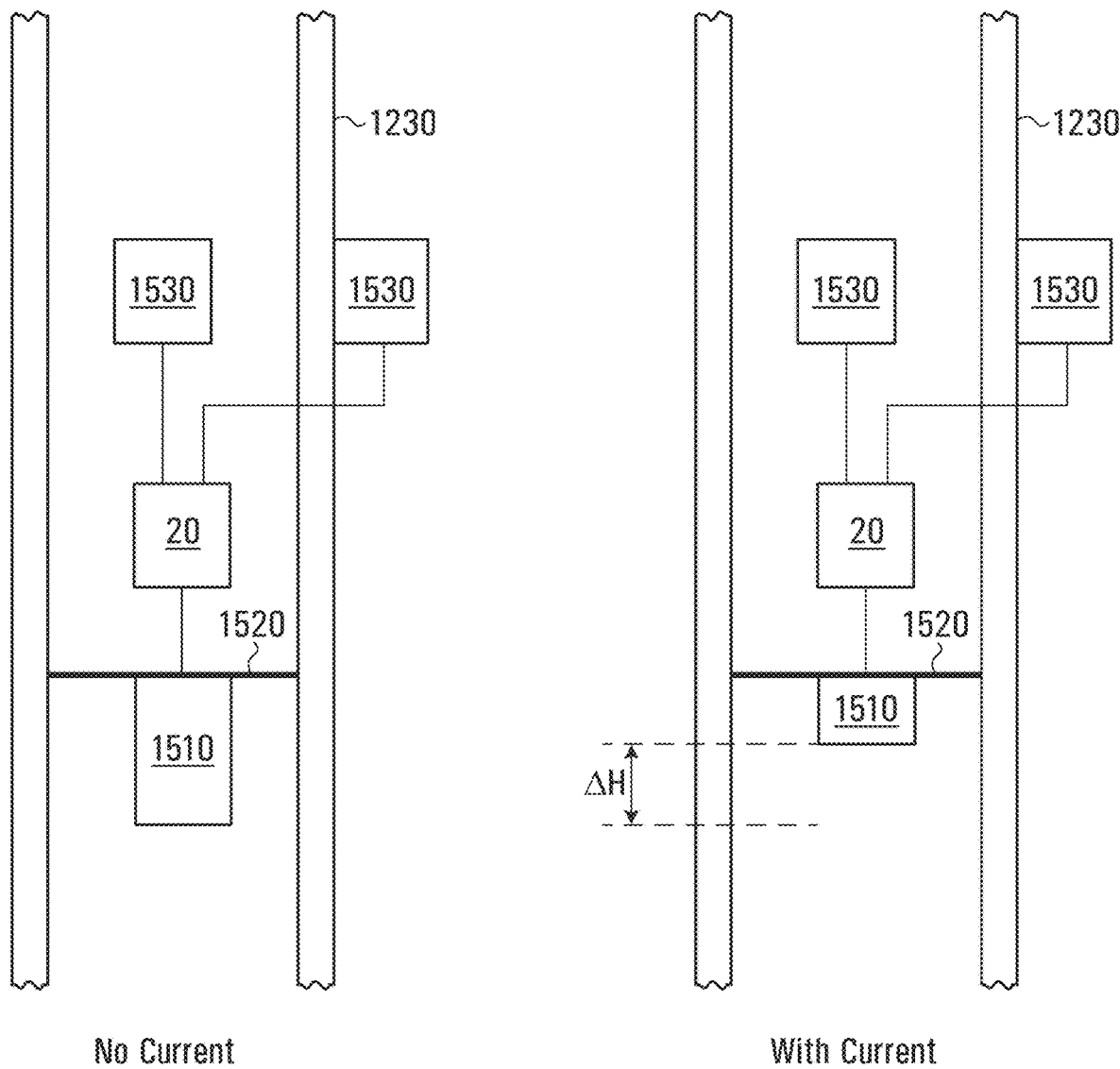
FIGS. 15A and 15B are cross-sectional views of a shaft of a hockey stick showing controllable movement of a mass along the longitudinal axis the shaft as a function of a voltage applied from a controller.
Figure 16A:
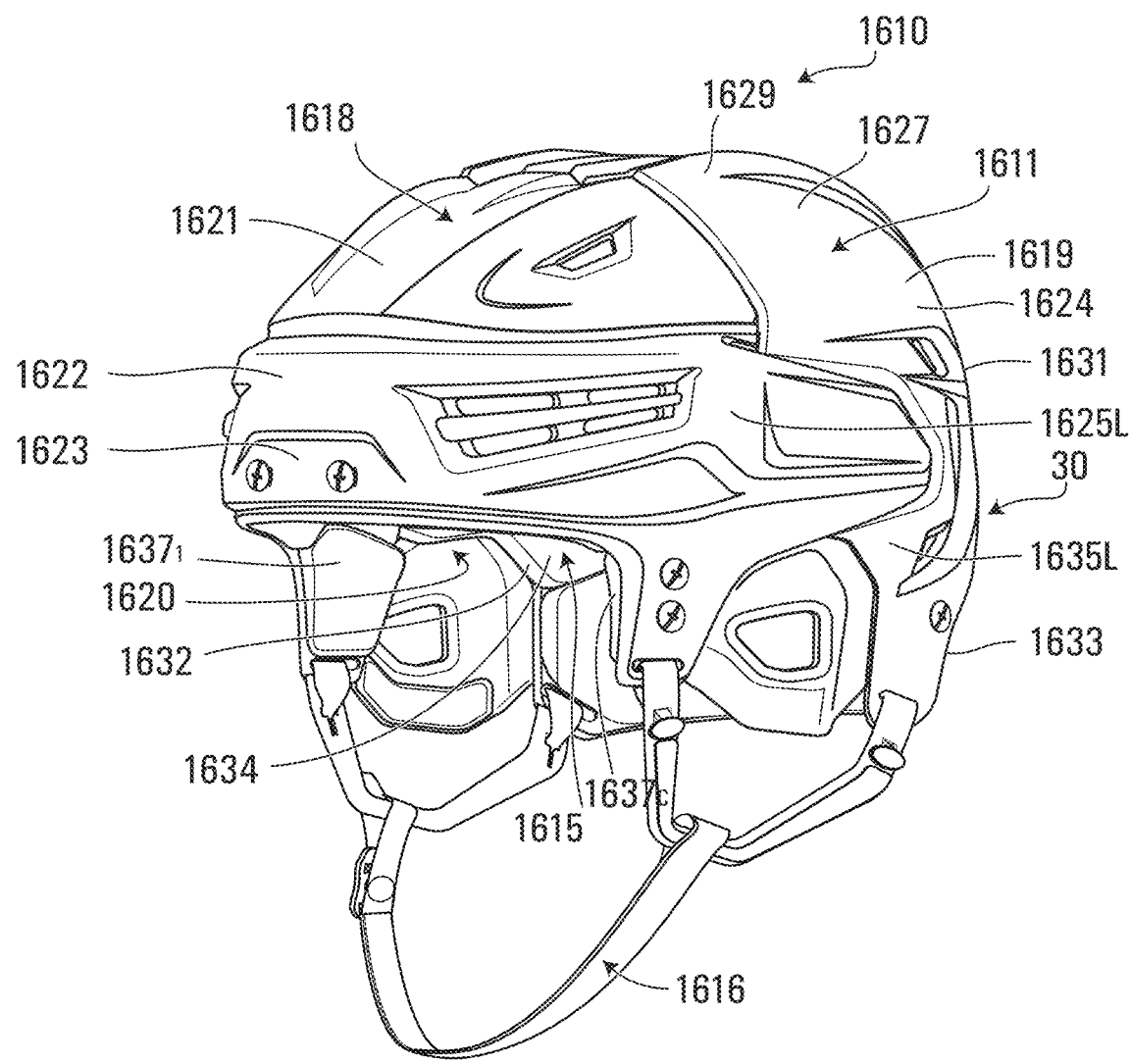
FIGS. 16A to 27B show various articles of sports equipment to which various embodiments of the present invention may be applied.
Figure 16B:
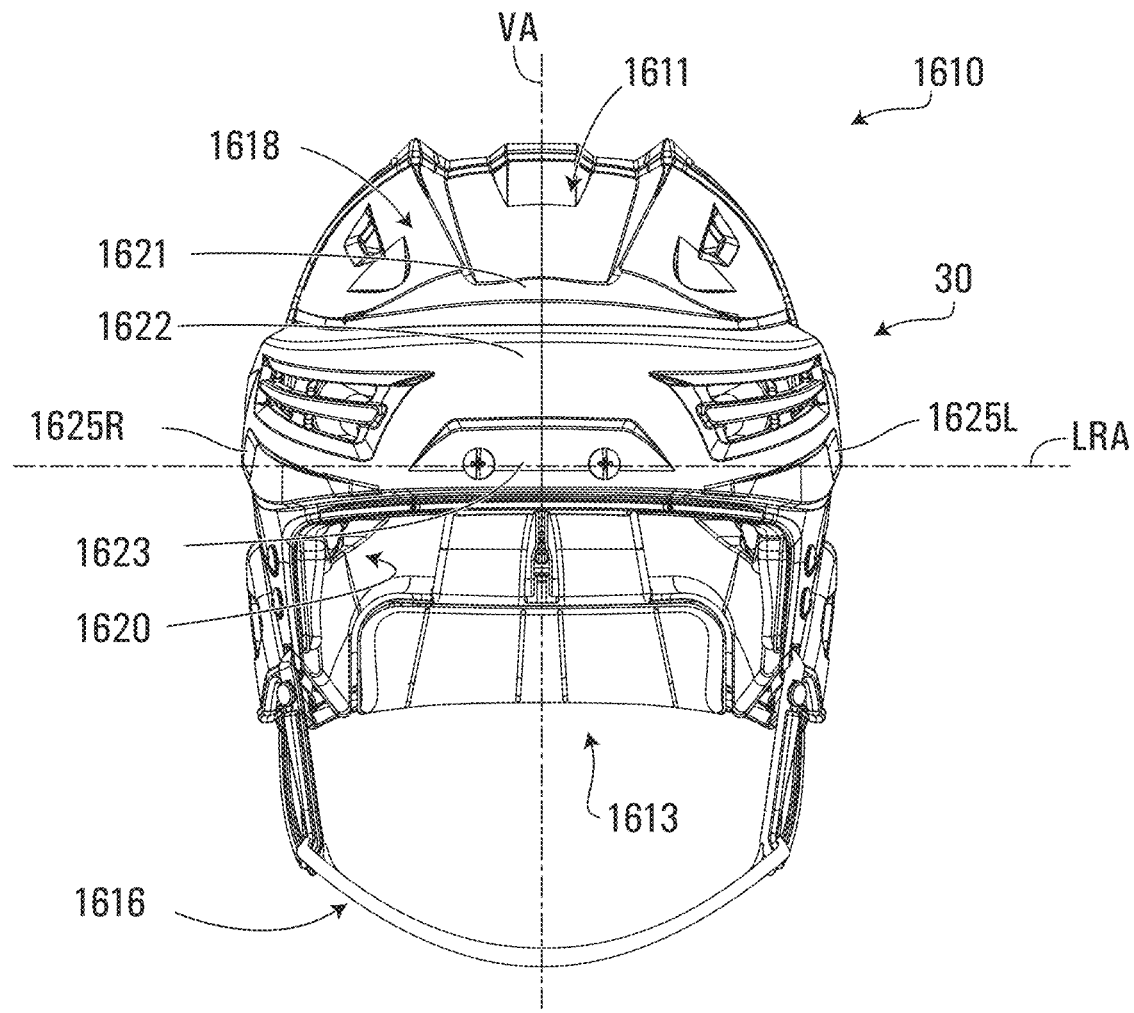
Figure 16C:
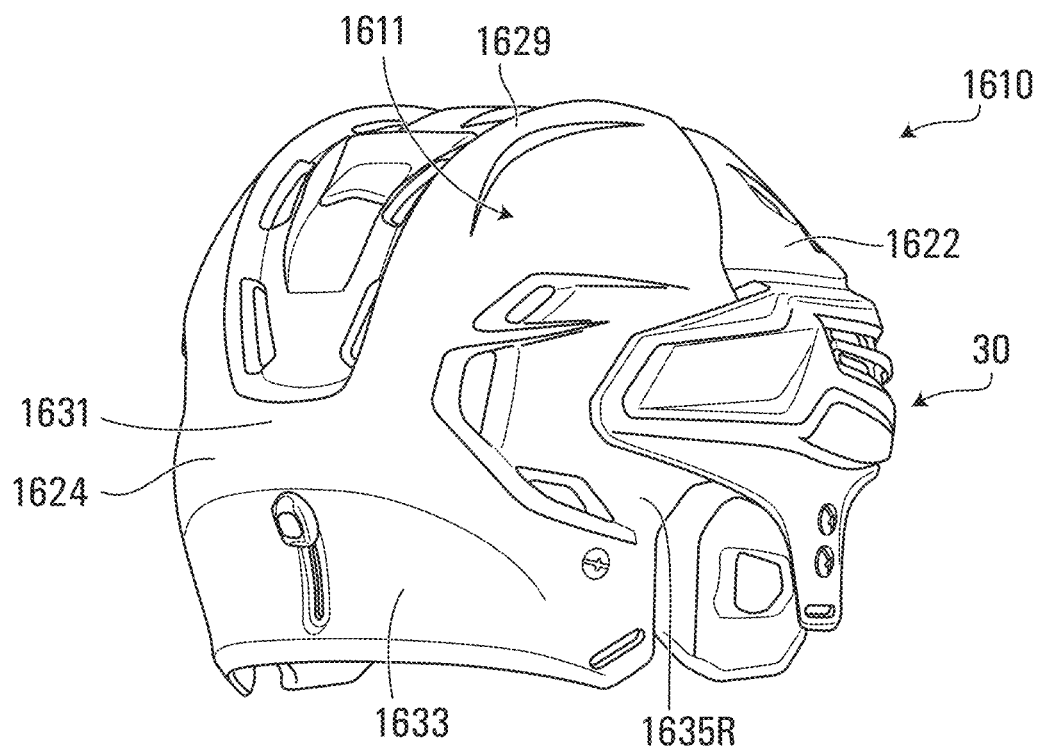
Figure 16D:
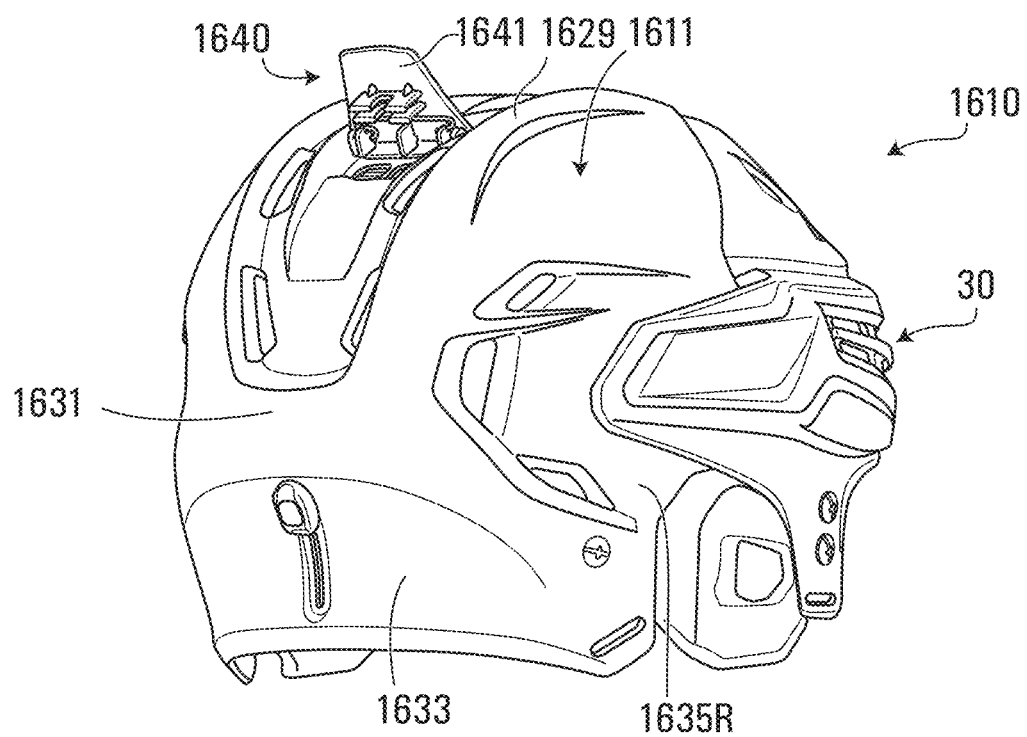
Figure 16E:
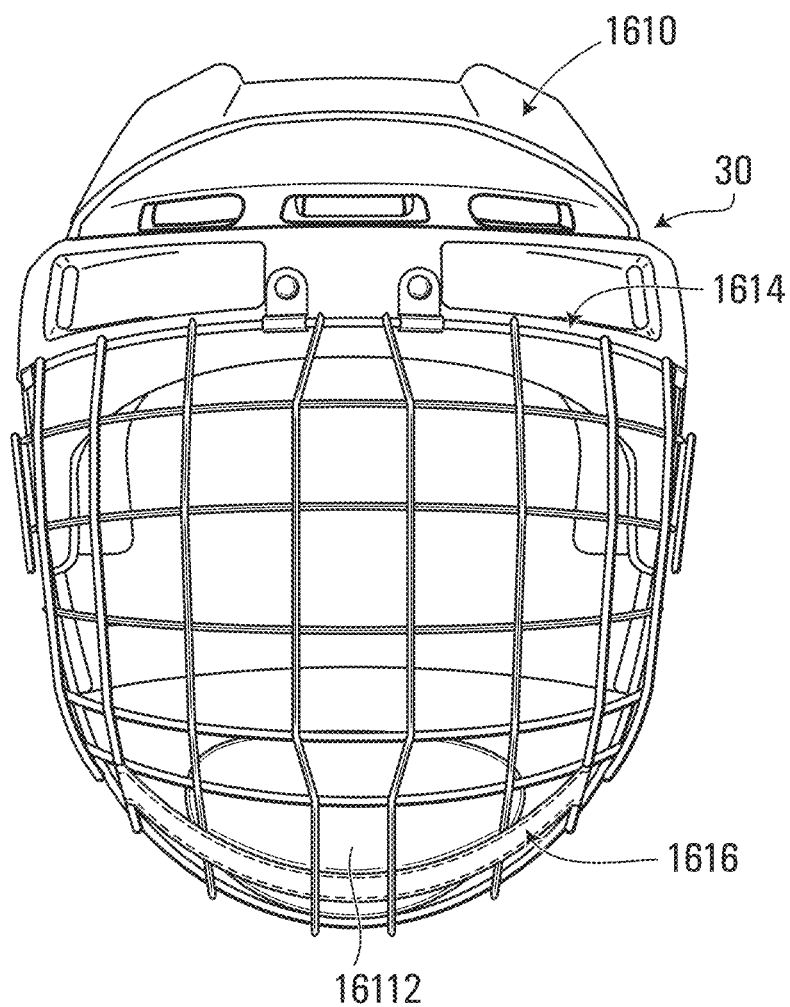
Figure 16F:
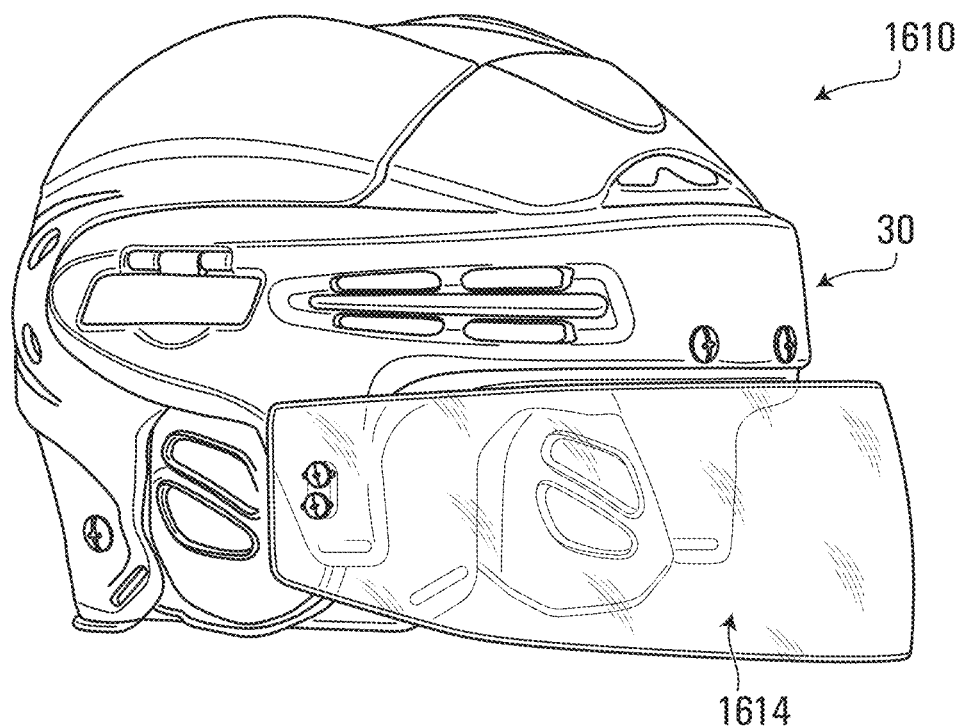
Figure 16G:
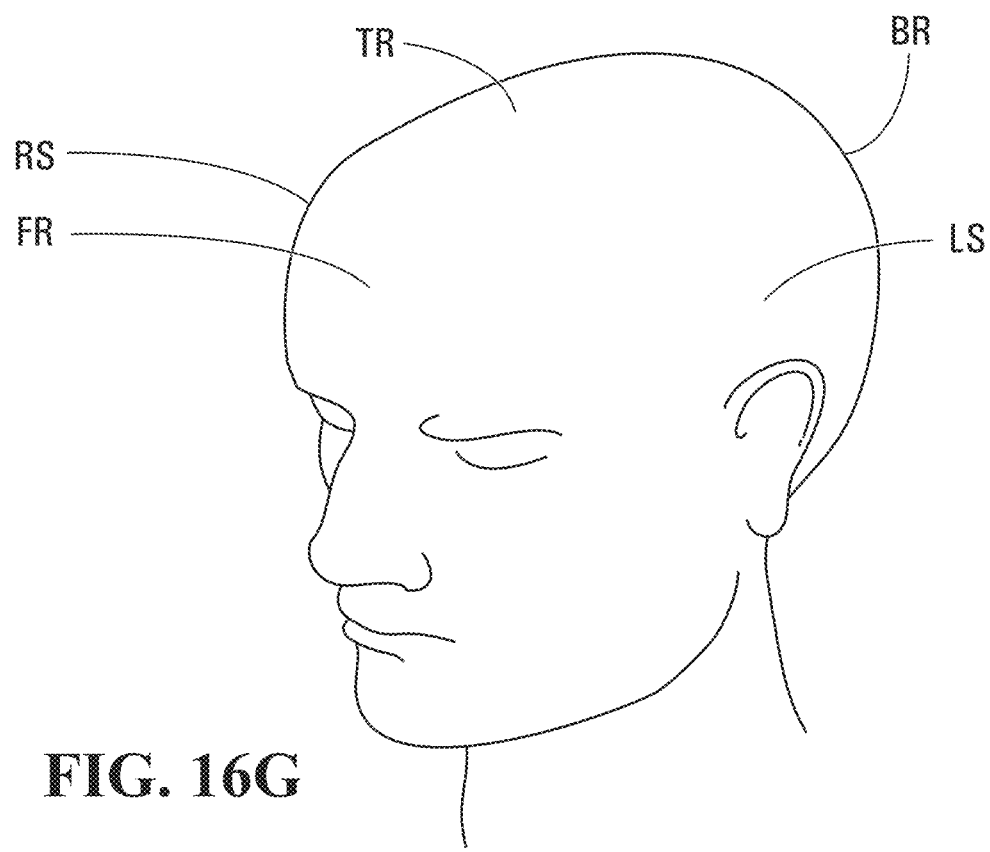
Figure 16H:
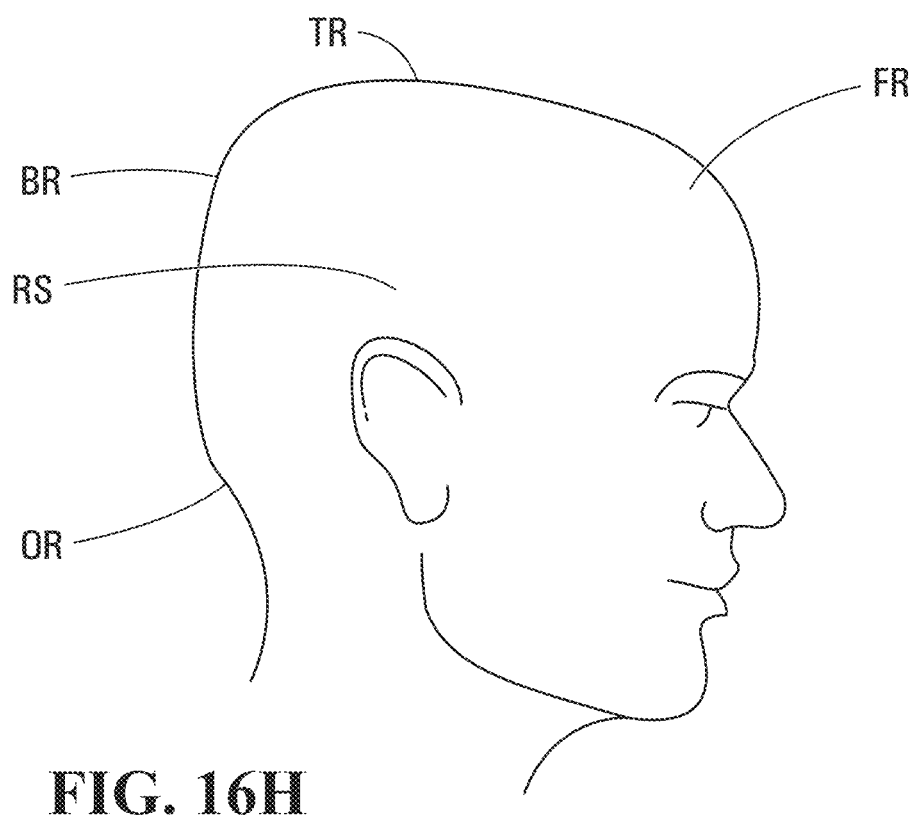
Figure 16I:
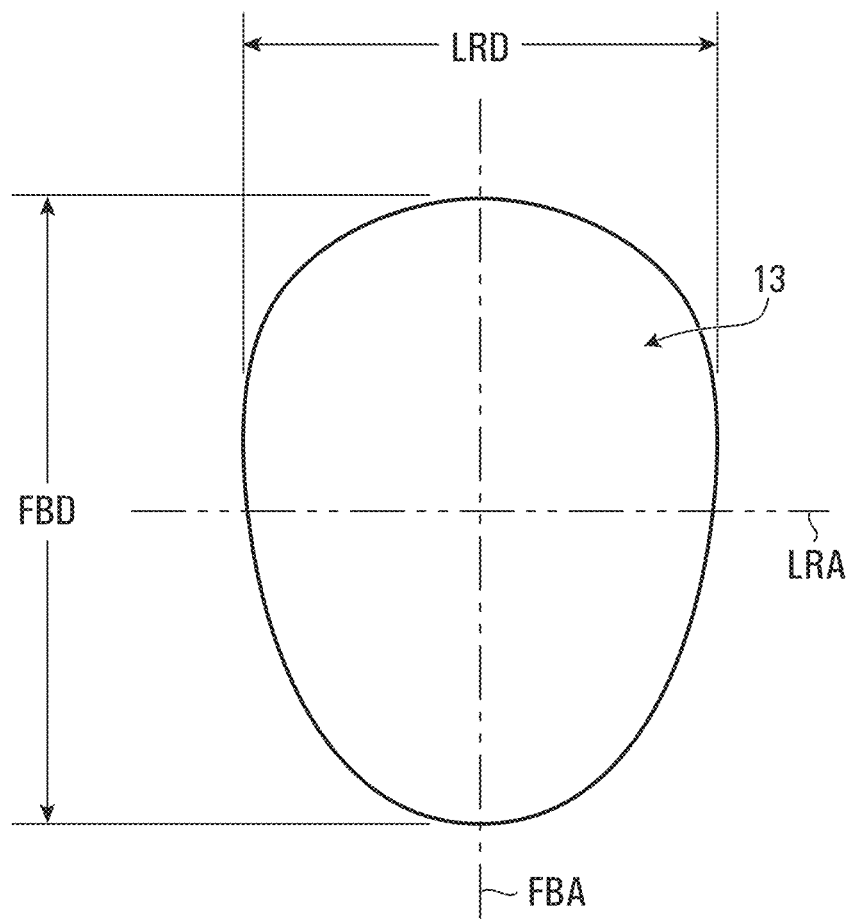

As such, FIGS. 15A and 15B can be said to illustrate a length-wise cross-section of the shaft 1230 of the hockey stick 1210, 2510, 2610, 2710 showing controllable movement of the mass 1510 along the longitudinal axis the shaft 1230 as a function of a signal (e.g., voltage) applied from the controller 20.

In other embodiments, the component 30 can cause a change to a functional or visual aspect of any element of a stick as described above.

Helmets

In yet another specific non-limiting example of implementation, the article of sports equipment 10 is a helmet, e.g., a hockey helmet. FIGS. 16A to 17B show embodiments of helmets to which specific non-limiting examples of implementation may be applied.

FIGS. 16A to 16H show embodiments of a helmet 1610 for protecting a user's head. In this embodiment, the helmet 10 is an athletic helmet for protecting the head of the user who is engaging in a sport or other athletic activity against impacts. More particularly, in this embodiment, the helmet 10 is a hockey helmet for protecting the head of the user, who is a hockey player, against impacts (e.g., from a puck or ball, a hockey stick, a board, ice or another playing surface, etc., with another player, etc.).

The helmet 1610 comprises an outer shell 1611 and a liner 1615 to protect the player's head. In this example, the helmet 1610 also comprises a chinstrap 1616 for securing the helmet 1610 to the player's head. The helmet 1610 may also comprise a faceguard 1614 to protect at least part of the player's face (e.g., a grid (sometimes referred to as a "cage") and a chin cup 16112 or a visor (sometimes referred to as a "shield")).

The helmet 1610 defines a cavity 1613 for receiving the player's head. In response to an impact, the helmet 1610 absorbs energy from the impact to protect the player's head. The helmet 1610 protects various regions of the player's head. The player's head comprises a front region FR, a top region TR, left and right side regions LS, RS, a back region BR, and an occipital region OR. The front region FR includes a forehead and a front top part of the player's head and generally corresponds to a frontal bone region of the player's head. The left and right side regions LS, RS are approximately located above the player's ears. The back region BR is opposite the front region FR and includes a rear upper part of the player's head. The occipital region OR substantially corresponds to a region around and under the head's occipital protuberance.

The helmet 1610 comprises an external surface 1618 and an internal surface 1620 that contacts the player's head when the helmet 1610 is worn. The helmet 1610 has a front-back axis FBA, a left-right axis LRA, and a vertical axis VA which are respectively generally parallel to a dorsoventral axis, a dextrosinistral axis, and a cephalocaudal axis of the player when the helmet 1610 is worn and which respectively define a front-back direction, a lateral direction, and a vertical direction of the helmet 1610. Since they are generally oriented longitudinally and transversally of the helmet 1610, the front-back axis FBA and the left-right axis LRA can also be referred to as a longitudinal axis and a transversal axis, respectively, while the front-back direction and the lateral direction can also be referred to a longitudinal direction and a transversal direction, respectfully.

The outer shell 1611 provides strength and rigidity to the helmet 1610. To that end, the outer shell 1611 typically comprises a rigid material 1627. For example, in various embodiments, the rigid material 27 of the outer shell 1611 may be a thermoplastic material such as polyethylene (PE), polyamide (nylon), or polycarbonate, a thermosetting resin, or any other suitable material. The outer shell 1611 includes an inner surface 1617 facing the inner liner 1615 and an outer surface 1619 opposite the inner surface 1617. The outer surface 1619 of the outer shell 1611 constitutes at least part of the external surface 1618 of the helmet 1610.

In this embodiment, the outer shell 1611 comprises shell members 1622, 1624 that are connected to one another. In this example, the shell member 1622 comprises a top portion 1621 for facing at least part of the top region TR of the player's head, a front portion 1623 for facing at least part of the front region FR of the player's head, and left and right lateral side portions 1625L, 1625R extending rearwardly from the front portion 1623 for facing at least part of the left and right side regions LS, RS of the player's head, respectively. The shell member 1624 comprises a top portion 1629 for facing at least part of the top region TR of the player's head, a back portion 1631 for facing at least part of the back region BR of the player's head, an occipital portion 1633 for facing at least part of the occipital region OR of the player's head, and left and right lateral side portions 1635L, 1635R extending forwardly from the back portion 1631 for facing at least part of the left and right side regions LS, RS of the player's head, respectively.

In this embodiment, the helmet 1610 is adjustable to adjust how it fits on the player's head. To that end, the helmet 1610 comprises an adjustment mechanism 1640 for adjusting a fit of the helmet 1610 on the player's head. The adjustment mechanism 1640 may allow the fit of the helmet 1610 to be adjusted by adjusting one or more internal dimensions of the cavity 1613 of the helmet 1610, such as a front-back internal dimension FBD of the cavity 1613 in the front-back direction of the helmet 1610 and/or a left-right internal dimension LRD of the cavity 1613 in the left-right direction of the helmet 1610.

More particularly, in this embodiment, the adjustment mechanism 1640 is configured such that the outer shell 1611 and the inner liner 1615 are adjustable to adjust the fit of the helmet 1610 on the player's head. To that end, in this embodiment, the shell members 1622, 1624 are movable relative to one another to adjust the fit of the helmet 1610 on the player's head. In this example, relative movement of the shell members 1622, 1624 for adjustment purposes is in the front-back direction of the helmet 1610 such that the front-back internal dimension FBD of the cavity 1613 of the helmet 1610 is adjusted. The shell member 1624 may be movable relative to the shell member 1622 from a first position, which corresponds to a minimum size of the helmet 1610, to a second position, which corresponds to an intermediate size of the helmet 1610, and to a third position, which corresponds to a maximum size of the helmet 1610.

In this example of implementation, the adjustment mechanism 1640 comprises an actuator 1641 that can be moved (in this case pivoted) by the player between a locked position, in which the actuator 1641 engages a locking part 1645 of the shell member 1622 and thereby locks the shell members 1622, 1624 relative to one another, and a release position, in which the actuator 1641 is disengaged from the locking part 1645 of the shell member 1622 and thereby permits the shell members 1622, 1624 to move relative to one another so as to adjust the size of the helmet 1610. The adjustment mechanism 1640 may be implemented in any other suitably way in other embodiments.

The liner 1615 is disposed between the outer shell 1611 and the player's head to absorb impact energy when the helmet 1610 is impacted. More particularly, the liner 1615 comprises an outer surface 1638 facing towards the outer shell 1611 and an inner surface 34 facing towards the player's head. For example, in some embodiments, the inner liner 1615 may comprise a shock-absorbing material. For instance, in some cases, the shock-absorbing material may include a polymeric foam (e.g., expanded polypropylene (EPP) foam, expanded polyethylene (EPE) foam, expanded polymeric microspheres (e.g., Expancel™ microspheres commercialized by Akzo Nobel), or any other suitable polymeric foam material). Any other material with suitable impact energy absorption may be used in other embodiments. Additionally or alternatively, in some embodiments, the inner liner 1615 may comprise an array of shock absorbers that are configured to deform when the helmet 1610 is impacted. For instance, in some cases, the array of shock absorbers may include an array of compressible cells that can compress when the helmet 1610 is impacted. Examples of this are described in U.S. Pat. No. 7,677,538 and U.S. Patent Application Publication 2010/0258988, which are incorporated by reference herein.

The liner 1615 may be connected to the outer shell 1611 in any suitable way. For example, in some embodiments, the inner liner 1615 may be fastened to the outer shell 1611 by one or more fasteners such as mechanical fasteners (e.g., tacks, staples, rivets, screws, stitches, etc.), an adhesive, or any other suitable fastener.

In this embodiment, the liner 1615 comprises a plurality of pads $1636_1$-$1636_A$, $1637_1$-$1637_C$ disposed between the outer shell 1611 and the player's head when the helmet 1610 is worn. In this example, respective ones of the pads $1636_1$-$1636_A$, $1637_1$-$1637_C$ are movable relative to one another and with the shell members 1622, 1624 to allow adjustment of the fit of the helmet 1610 using the adjustment mechanism 1640.

In this example, the pads $1636_1$-$1636_A$ are responsible for absorbing at least a bulk of the impact energy transmitted to the inner liner 1615 when the helmet 1610 is impacted and can therefore be referred to as "absorption" pads. In this embodiment, the pad $1636_1$ is for facing at least part of the front region FR and left side region LS of the player's head, the pad $1636_2$ is for facing at least part of the front region FR and right side region RS of the player's head, the pad $1636_3$ is for facing at least part of the back region BR and left side region LS of the player's head, the pad $1636_4$ is for facing at least part of the back region BR and right side region RS of the player's head. Another pad is for facing at least part of the top region TR and back region BR of the player's head. The shell member 1622 overlays the pads $1636_1$, $1636_2$ while the shell member 1624 overlays the pads $1636_3$, $1636_4$.

In this embodiment, the pads $1637_1$-$1637_C$ are responsible to provide comfort to the player's head and can therefore be referred to as "comfort" pads. The comfort pads $1637_1$-$1637_C$ may comprise any suitable soft material providing comfort to the player. For example, in some embodiments, the comfort pads $1637_1$-$1637_C$ may comprise polymeric foam such as polyvinyl chloride (PVC) foam, polyurethane foam (e.g., PORON XRD™ foam commercialized by Rogers Corporation), vinyl nitrile foam or any other suitable polymeric foam material. In some embodiments, given ones of the comfort pads $1637_1$-$1637_C$ may be secured (e.g., adhered, fastened, etc.) to respective ones of the absorption pads $1636_1$-$1636_A$. In other embodiments, given ones of the comfort pads $1637_1$-$1637_C$ may be mounted such that they are movable relative to the absorption pads $1636_1$-$1636_A$. For example, in some embodiments, one or more of the comfort pads $1637_1$-$1637_C$ may be part of a floating liner as described in U.S. Patent Application Publication 2013/0025032, which, for instance, may be implemented as the SUSPEND-TECH™ liner member found in the BAUER™ RE-AKT™ and RE-AKT 100™ helmets made available by Bauer Hockey, Inc. The comfort pads $1637_1$-$1637_C$ may assist in absorption of energy from impacts, in particular, low-energy impacts.

Although in embodiments considered above the article 10 that is a helmet is a hockey player, in other embodiments, the article 10 may be any other helmet usable by a player playing another type of contact sport (e.g., a "full-contact" sport) in which there are significant impact forces on the player due to player-to-player and/or player-to-object contact or any other type of sports, including athletic activities other than contact sports.

For example, in other embodiments, the article 10 may be a hockey goalkeeper helmet.

Figure 17A:
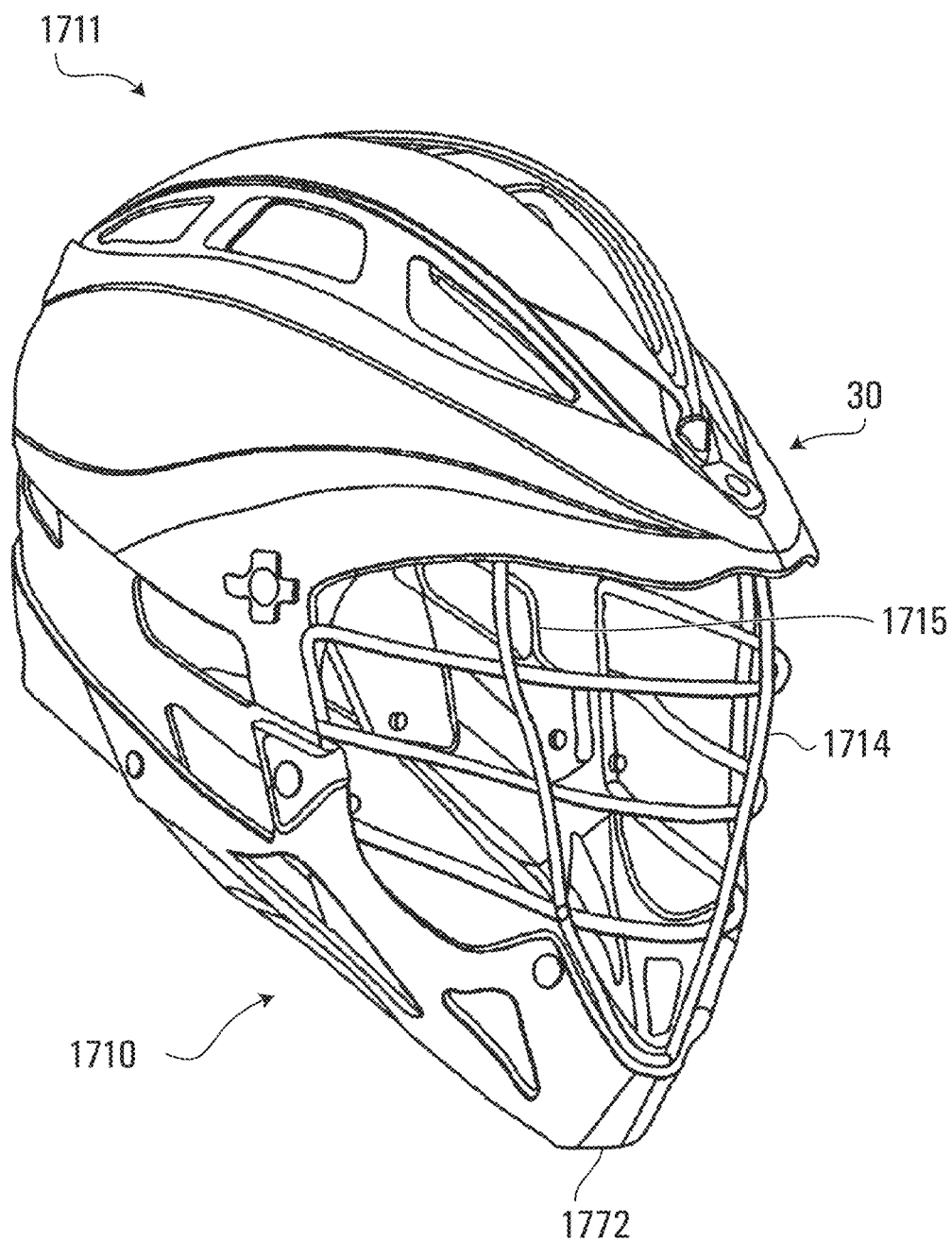
Figure 17B:
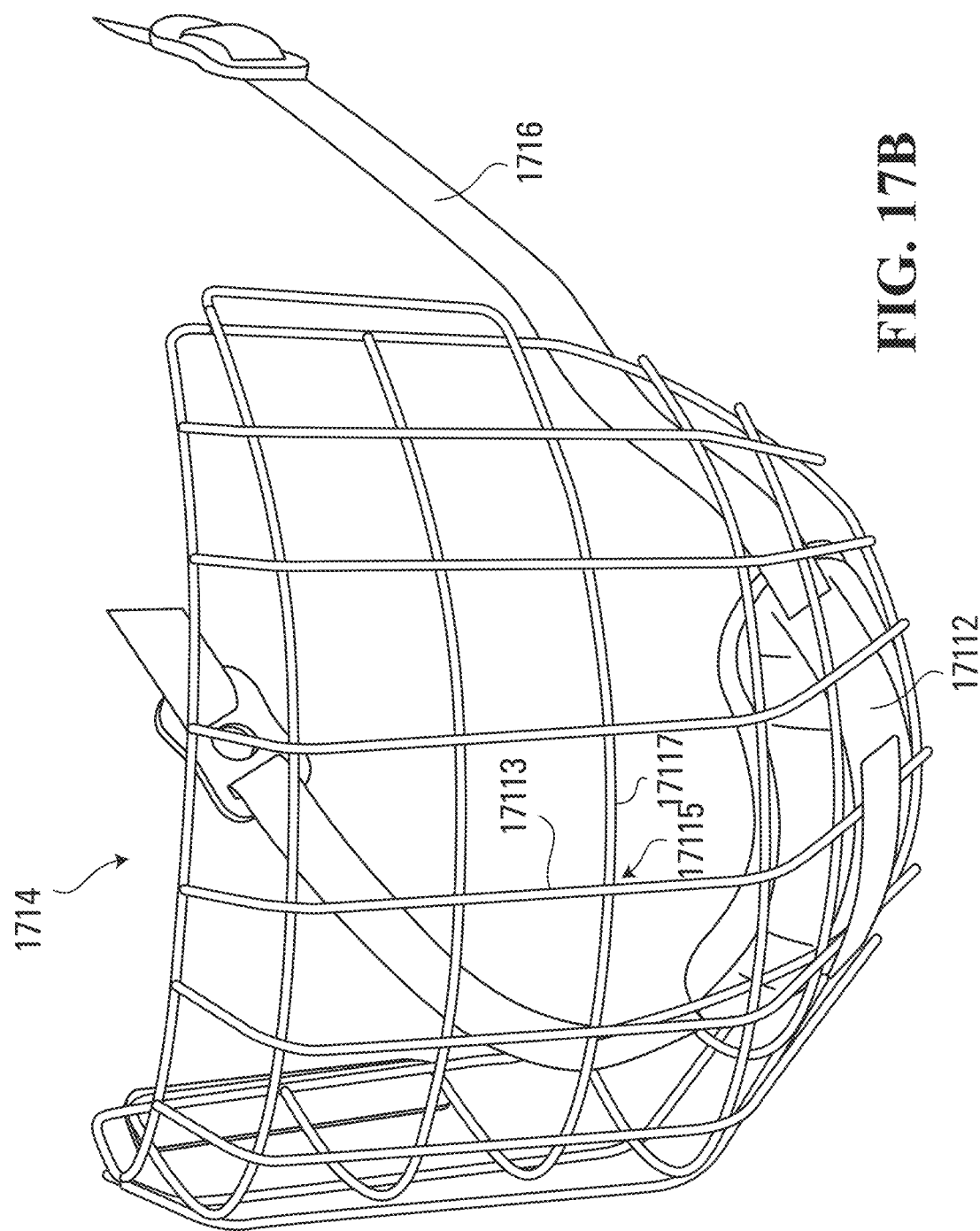

As another example, as shown in FIGS. 17A and 17B, in other embodiments, the article 10 may be a lacrosse helmet 1710. The lacrosse helmet 1710 comprises a chin piece 1772 extending from the left lateral side portion 1725L to the right lateral side portion 1725R of the helmet 1710 and configured to extend in front of a chin area of the user. The lacrosse helmet 10 also comprises the faceguard 1714 which is connected to the shell 1711 and the chin piece 1772.

In other embodiments, the article 10 may be a baseball/softball helmet or any other type of helmet.

The helmet 1610, 1710, including its components, may be implemented in any other suitable manner in other embodiments.

In this non-limiting example of implantation, the helmet 1610, 1710 comprises the component 30. Non-limiting variants of the helmet 1610, 1710 implementing the component 30 are further described below.

In a first helmet variant, the helmet 1610, 1710 has padding. The component 30 is configured to cause a change in a stiffness of the padding of the helmet 1610, 1710 based on a received control signal CTRL_SIG. The processing entity 204 receives the sensor signal SENS_SIG, processes it, and sends a control signal CTRL_SIG to cause a change in the stiffness of the padding of the helmet.

In a second helmet variant, the helmet 1610, 1710 has a chin strap. The component 30 is configured to cause a change in tightness stiffness of the chin strap of the helmet 1610, 1710 based on a received control signal CTRL_SIG. The processing entity 204 receives the sensor signal SENS_SIG, processes it, and sends a control signal CTRL_SIG to cause a change in the tightness of the chin strap of the helmet.

In a third helmet variant, the helmet 1610, 1710 has padding. The component 30 is configured to cause a change in physical appearance of the helmet 1610, 1710 after the helmet 1610, 1710 is subject to an acceleration and/or a pressure above a threshold.

Figure 31A:
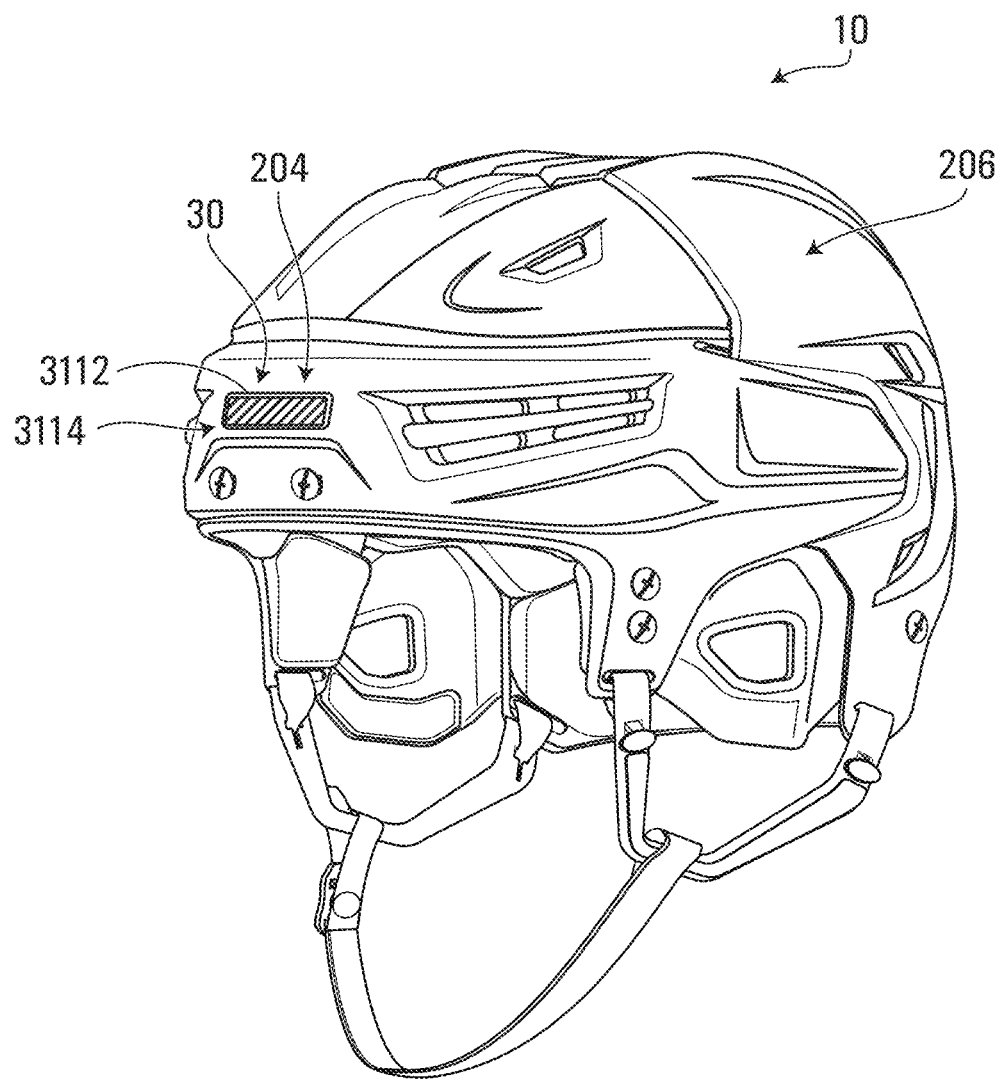
FIGS. 31A to 31C shows a variant of the component comprising an indicator and an ink capsule.
Figure 31B:
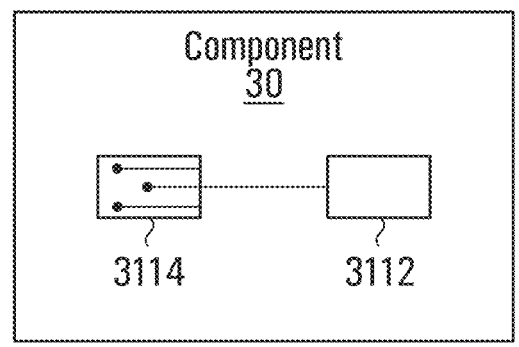
Figure 31C:
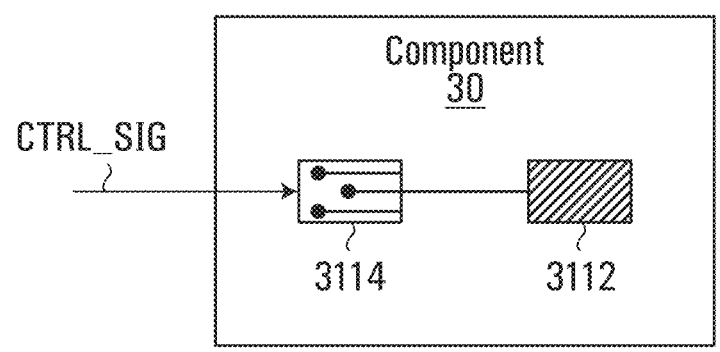

In particular, as shown in FIG. 31, the helmet 1610, 1710 may comprise the sensors 206 which, in this embodiment, comprise accelerometers and pressure sensors disposed in or adjacent to the padding. The component 30 of the helmet 1610, 1710 may comprise an indicator 3112 and a capsule 3114 containing ink. The processing entity 204 receives the sensor signal SENS_SIG, processes it, and if the sensor signal SENS_SIG is indicative of an acceleration and/or a pressure above a pre-determined threshold, the processing entity may send a control signal CTRL_SIG to cause release of the ink from the capsule 3114 into the indicator 3112, which may indicate to an observer that the helmet 10 has been subject to an acceleration and/or a pressure above a threshold.

In other embodiments, the component 30 can cause a change to a functional or visual aspect of any element of a helmet as described above.

Protective

Figure 8A:
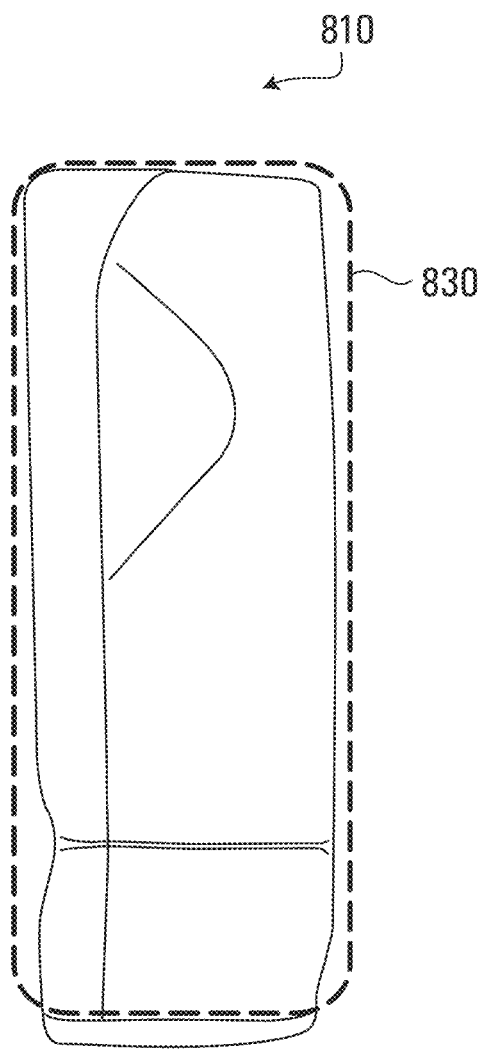
FIGS. 8A and 8B illustrate a hockey leg pad with a screen whose output changes dynamically.
Figure 8B:
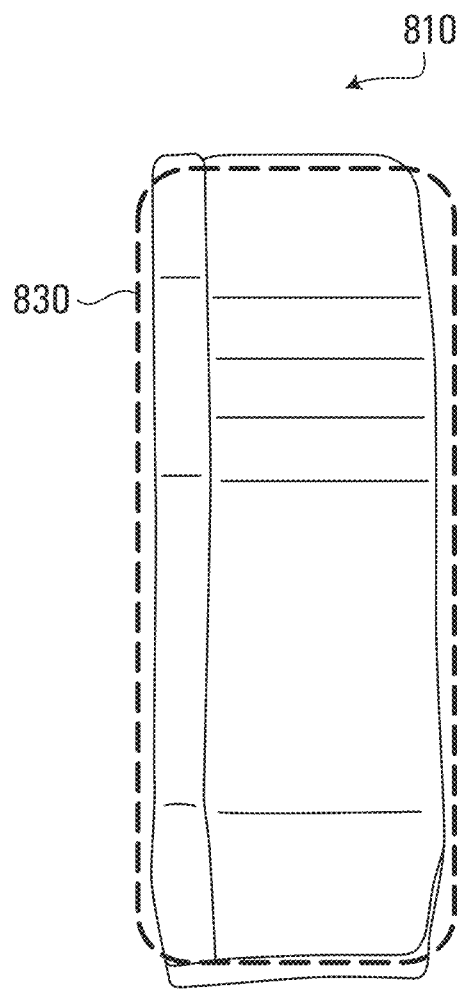
Figure 18:
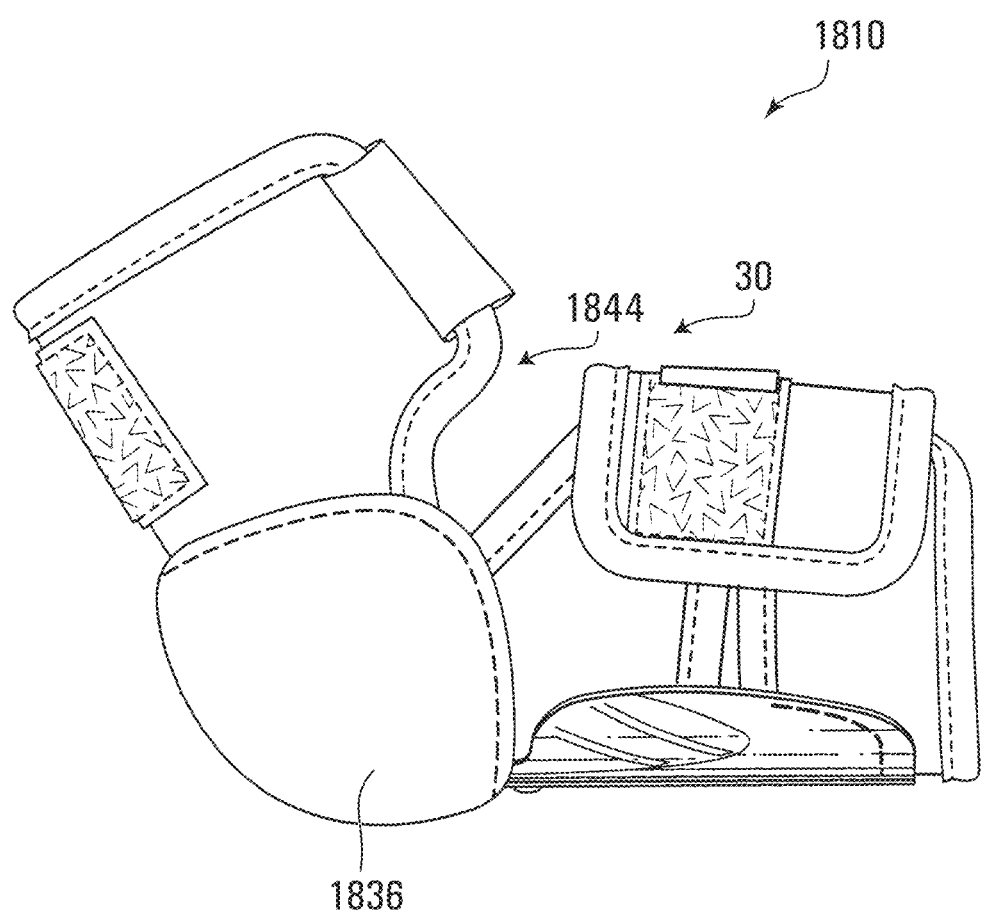
Figure 19:
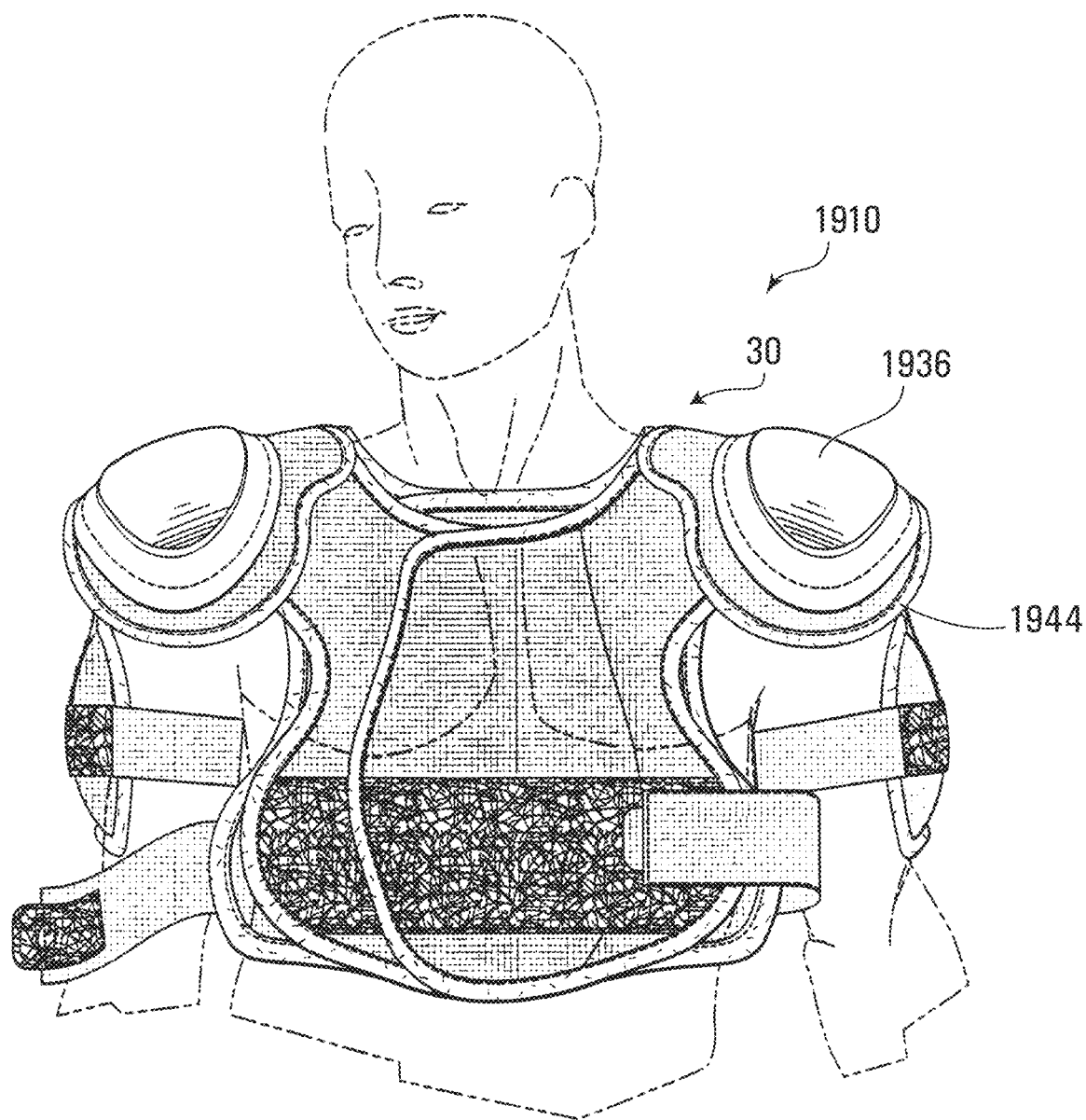
Figure 20:
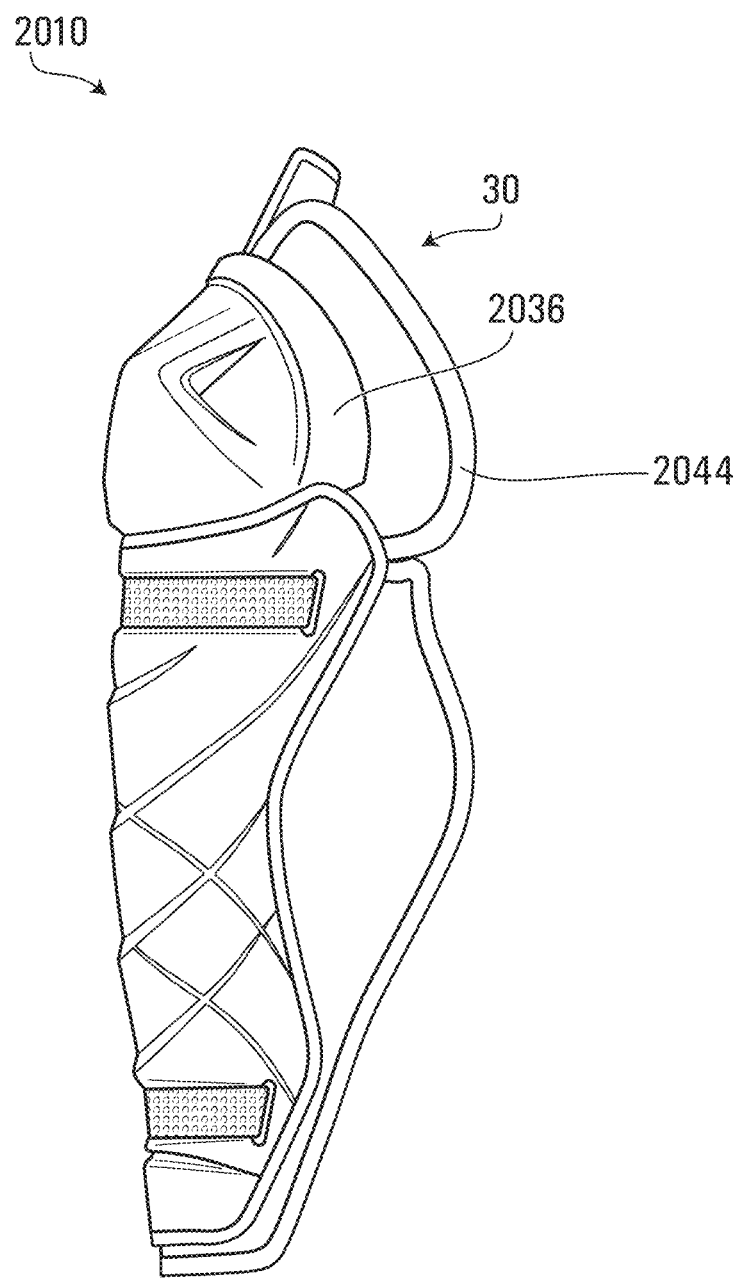
Figure 21:
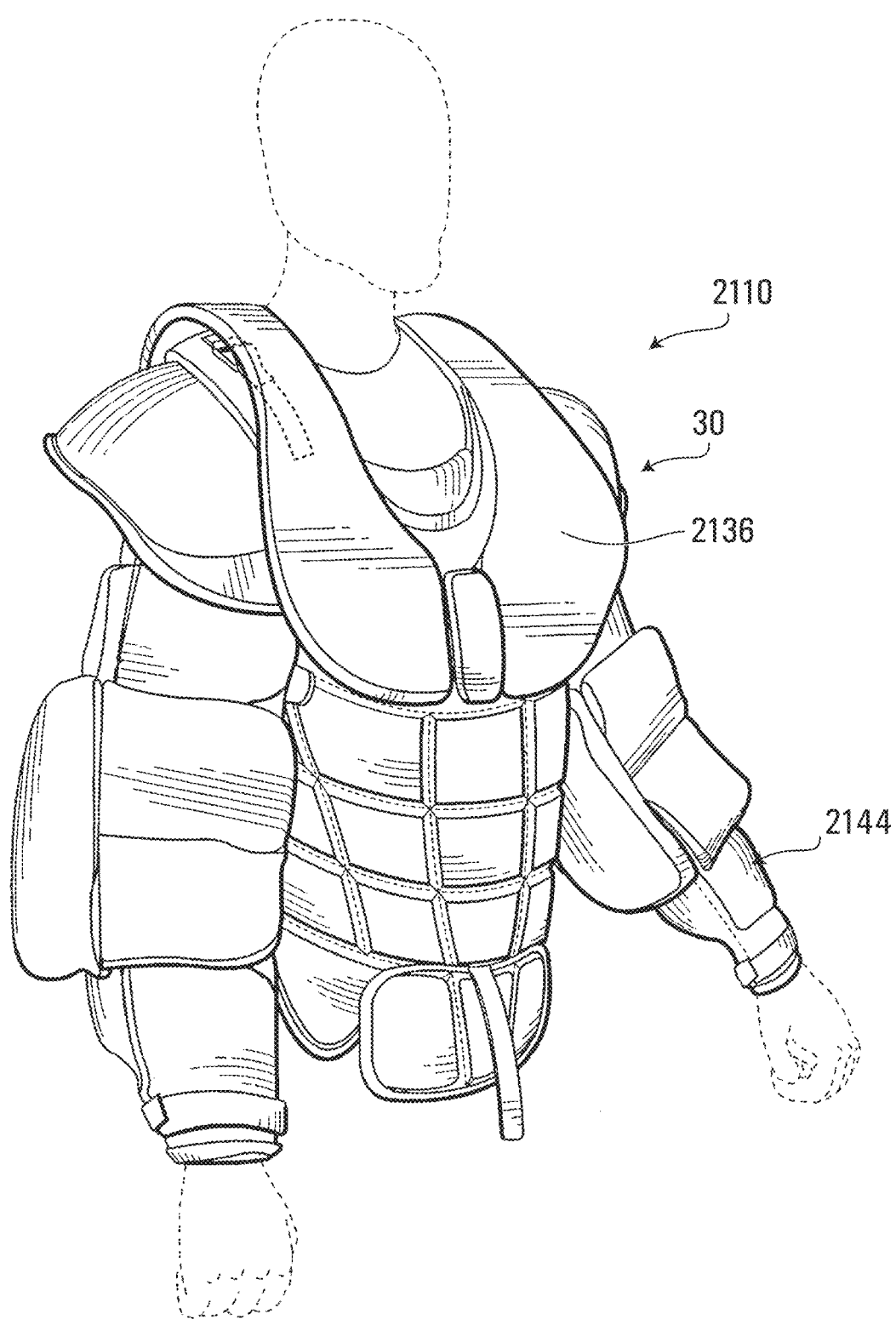
Figure 22:
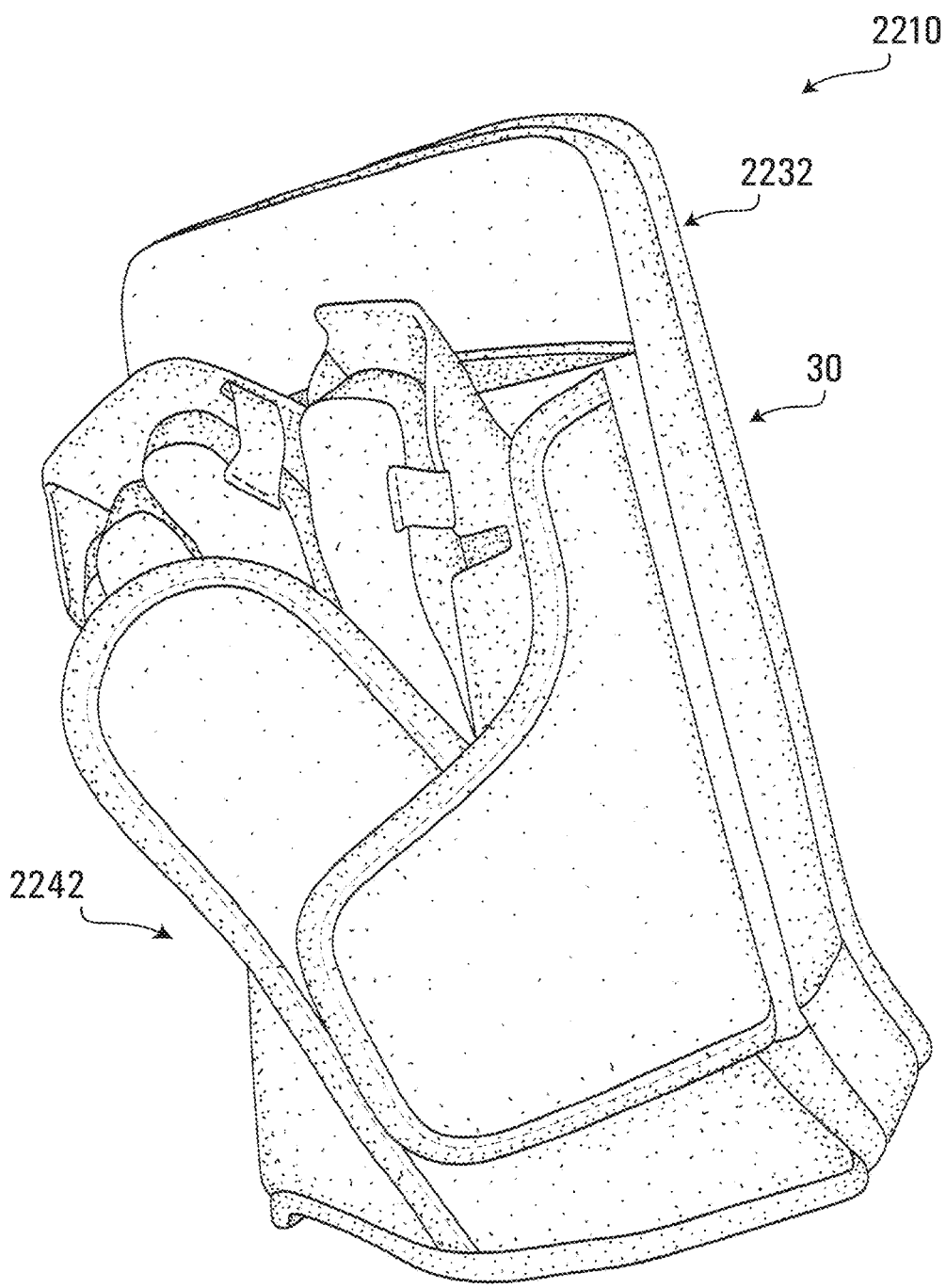
Figure 23A:
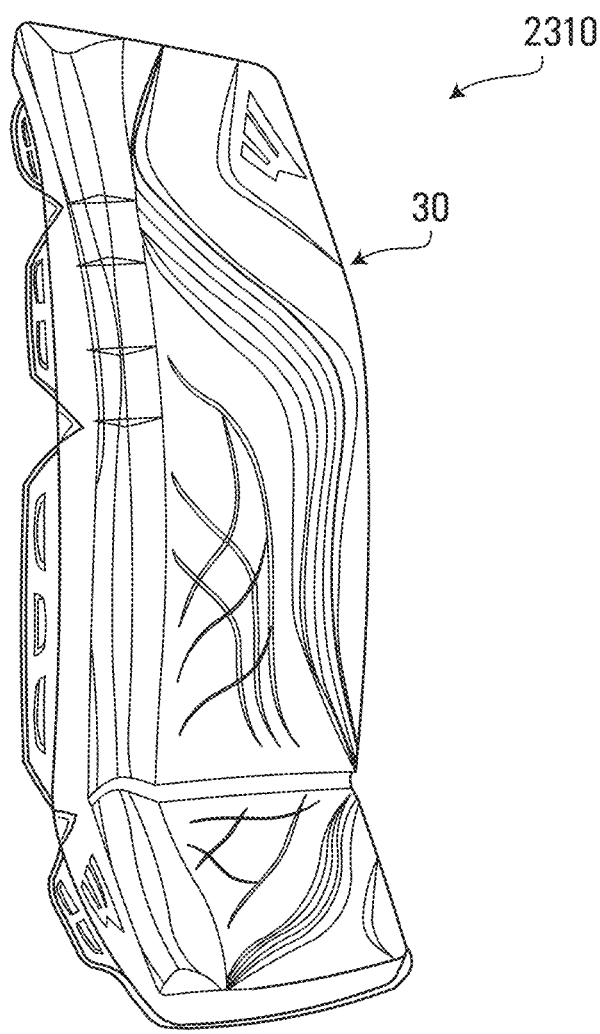
Figure 23B:
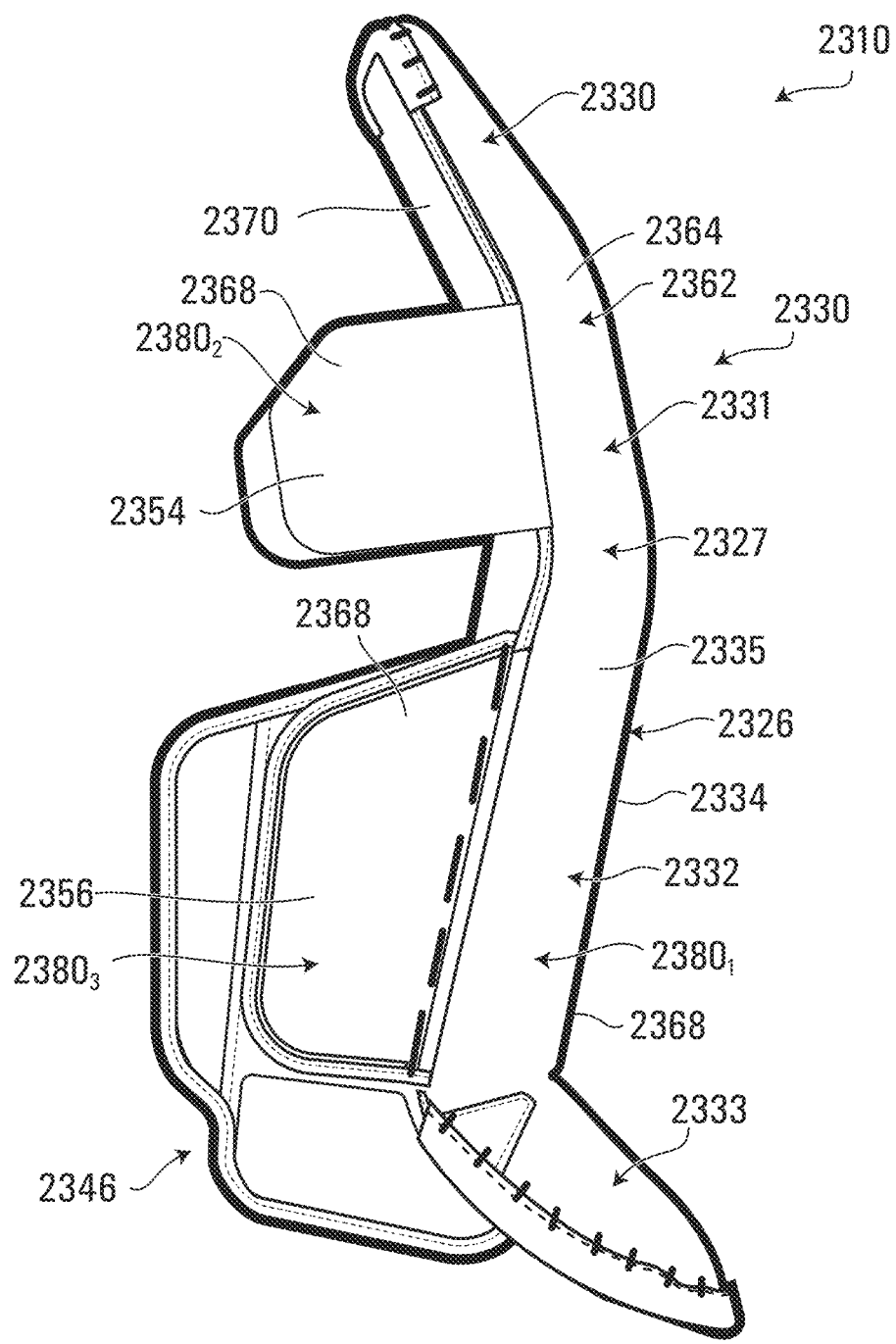
Figure 23C:
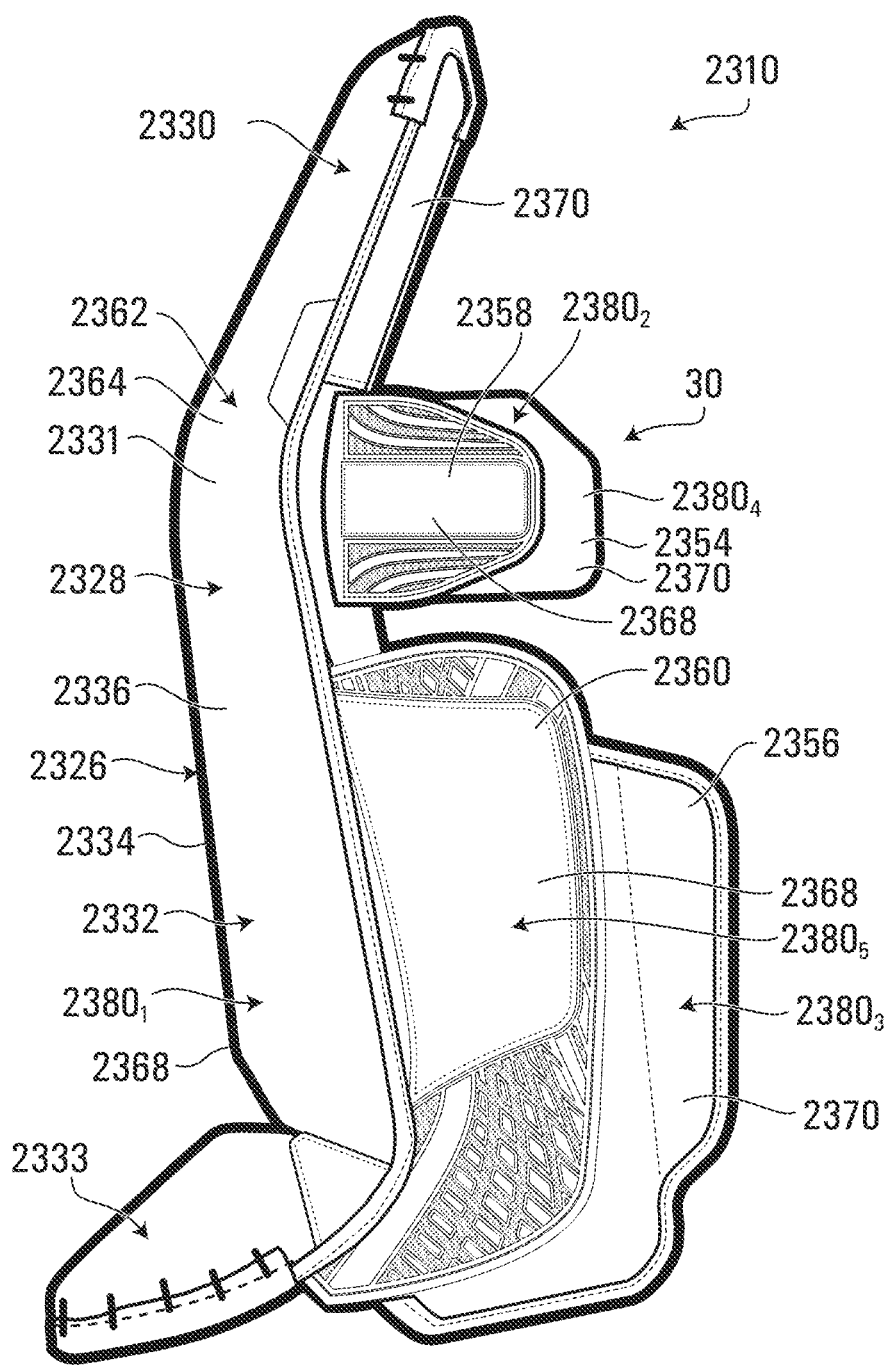
Figure 23D:
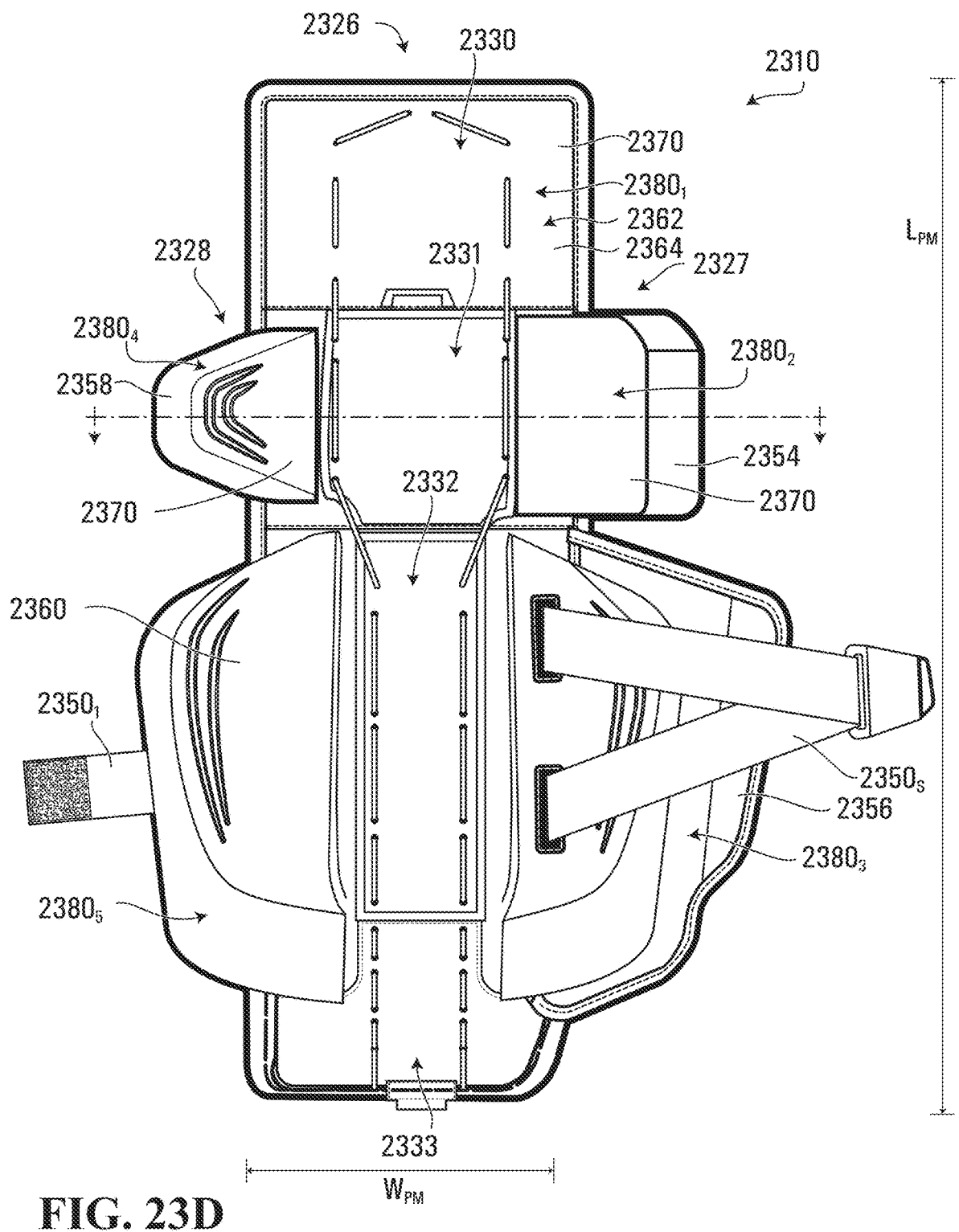
Figure 23E:
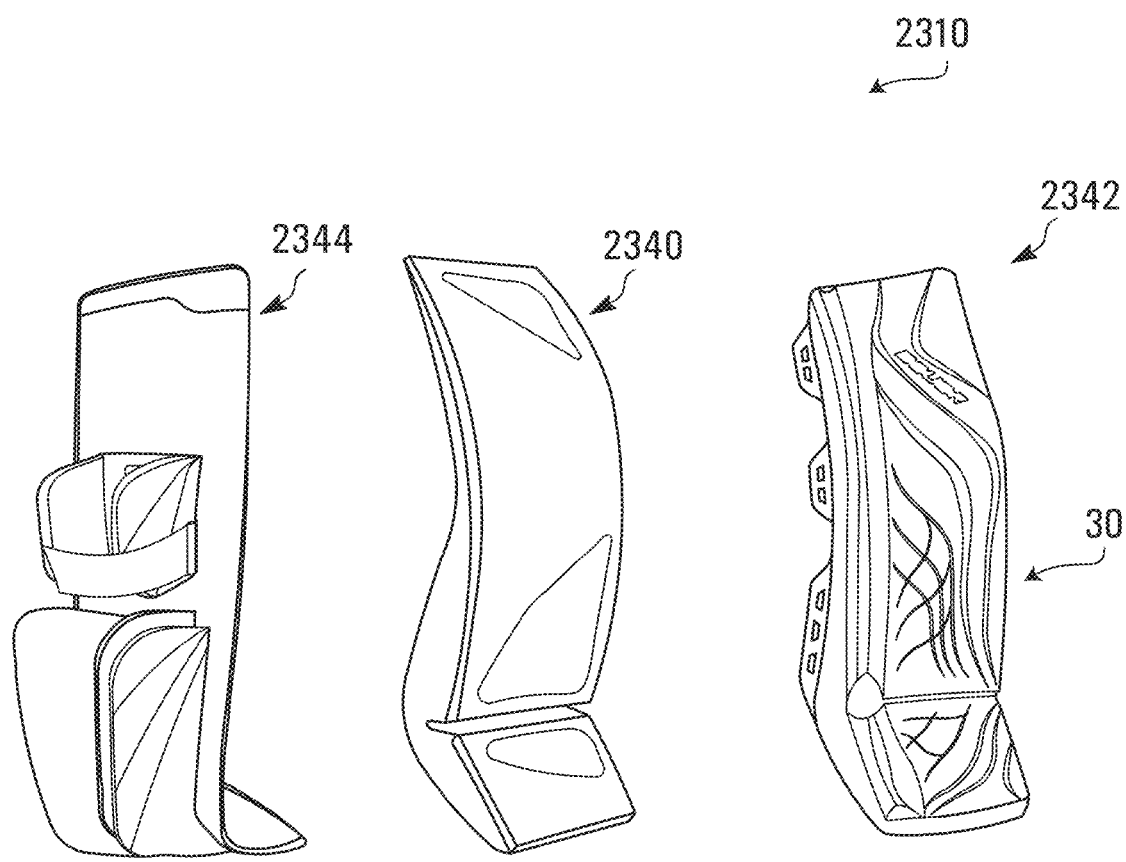
Figure 23F:
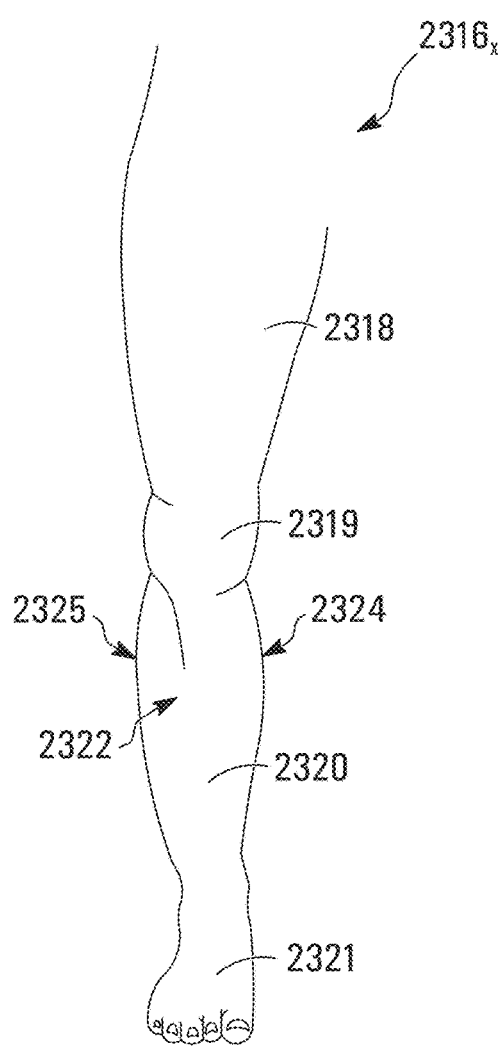
Figure 23G:
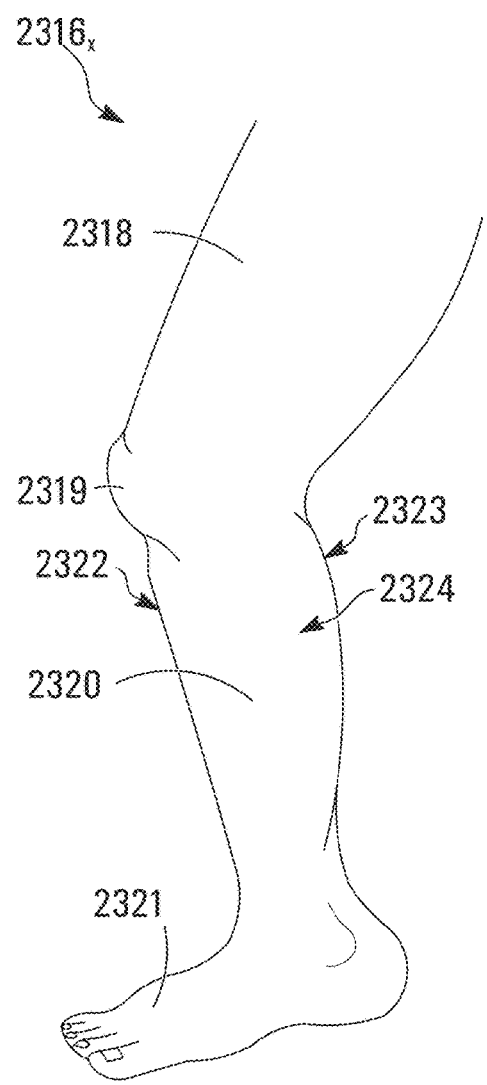

In yet another specific non-limiting example of implementation, the article of sports equipment 10 is an article of protective athletic gear 10. FIG. 18 shows an embodiment of an elbow pad to which specific non-limiting examples of implementation may be applied. FIGS. 19 and 21 show embodiments of shoulder pads 1910, 2110, to which specific non-limiting examples of implementation may be applied. FIG. 20 shows an embodiment of a hockey player leg pad 2010 to which specific non-limiting examples of implementation may be applied. FIG. 22 shows an embodiment of a goalie blocker 2210 to which specific non-limiting examples of implementation may be applied. FIGS. 8A, 8B and 23 show embodiments of a hockey goaltender pad 810, 2310 to which specific non-limiting examples of implementation may be applied.

In this embodiment, as shown in FIGS. 23A to 23G the article 10 is a hockey goalkeeper leg pad 2310. The hockey goalkeeper leg pads 2310 wearable on a hockey goalkeeper's legs $2316_1$, $2316_2$ while playing hockey to protect the legs $2316_1$, $2316_2$ against an impact from a puck, ball, hockey stick or other object and/or to protect the legs $2316_1$, $2316_2$ when moving (e.g., dropping) them onto a playing surface. The hockey goalkeeper may be referred to as a "goalie" and thus the hockey goalkeeper leg pads 2310 may be referred to as "goalie leg pads", "goalie pads", or just "leg pads" of the goalie. In this embodiment, a type of hockey played is ice hockey such that the goalie pads 2310 are ice hockey goalie pads, the goalie is an ice hockey goalie, and the playing surface is ice.

As further discussed later, in this embodiment, protective parts (e.g., pad members) of the goalie pads 2310 are adjustable to adjust how the goalie pads 2310 fit on the goalie's legs $2316_1$, $2316_2$, and their adjustability is provided in a way that is relatively light, easy to use, and simple to manufacture.

The goalie pads 2310 protect various regions of the goalie's legs $2316_1$, $2316_2$. Each leg $2316_x$ of the goalie comprises an upper leg region 2318, a knee 2319, a lower leg region 2320, and a foot 2321. The upper leg region 2318 is above the knee 2319, while the lower leg region 2320 is below the knee 2319 and above the foot 2321. The leg $2316_x$ of the goalie has a front 2322, a back 2323, a medial side 2324 (sometimes referred to as an "inner side"), and a lateral side 2325 (sometimes referred to as an "outer side").

Each goalie pad 2310 comprises an upper leg portion 2330, a knee portion 2331, a lower leg portion 2332, and a foot portion 2333 respectively configured to be positioned adjacent to the upper leg region 2318, the knee 2319, the lower leg region 2320, and the foot 2321 of the goalie's leg $2316_x$ when the goalie pad 2310 is worn on the leg $2316_x$. The upper leg portion 2330 is above the knee portion 2331, while the lower leg portion 2332 is below the knee portion 2331 and above the foot portion 2333. Respective ones of these portions of the goalie pad 2310 comprise frontal, medial, and lateral parts such that the goalie pad 2310 comprises a frontal portion 2326, a medial portion 2327, and a lateral portion 2328 respectively configured to be positioned adjacent to the front 2322, the medial side 2324, and the lateral side 2325 of the goalie's leg $2316_x$ when the goalie pad 2310 is worn on the leg $2316_x$. The frontal portion 2326 comprises a front of the goalie pad 2310, the medial portion 2327 comprises a medial side of the goalie pad 2310, and the lateral portion 2328 comprises a lateral side of the goalie pad 2310. A longitudinal direction of the goalie pad 2310 is substantially parallel to a longitudinal axis of the goalie's leg $16_x$, a lateral (i.e., widthwise) direction of the goalie pad 2310 is perpendicular to its longitudinal direction and substantially parallel to a dextrosinistral axis of the goalie's leg $1236_x$, and a front-back direction of the goalie pad 2310 is perpendicular to its longitudinal direction and substantially parallel to a dorsoventral axis of the goalie's leg $2316_x$.

In this embodiment, the knee portion 2331 comprises a medial part 4231 including a medial knee wing 2337 and a lateral part 2347 including a lateral knee wing 2339 that project rearwardly and define a knee cradle to receive the goalie's knee 2319. The medial part 2341 of the knee portion 2331 also comprises a knee landing 2343 projecting rearwardly and configured to engage the goalie's knee 2319 when dropping to the ice (e.g., in a butterfly position). Similarly, in this embodiment, the lower leg portion 2332 comprises a medial part 2346 including a medial calf wing 2349 and a lateral part 2348 including a lateral calf wing 2361 that project rearwardly to receive the goalie's lower leg 2320. The medial part 2346 of the lower leg portion 2332 also comprises a calf landing 2363 to engage the goalie's lower leg 2320 when dropping to the ice.

The goalie pad 2310 can be secured to the goalie's leg $2316_x$ in any suitable way. In this embodiment, the goalie pad 2310 comprises straps to secure it to the goalie's leg $2316_x$.

In this embodiment, the leg pad 2310 comprises an outer shell 2342, an inner liner 2344, and protective padding 2340 disposed between the outer shell 2342 and the inner liner 2344.

The outer shell 2342 comprises an outer surface 2351 of the leg pad 2310 that faces away from the goalkeeper's leg $2316_x$. In this embodiment, the outer shell 2342 comprises an upper leg portion 2352, a knee portion 2353, a lower leg portion 2354, and a foot portion 2355 which constitute respective parts of the upper leg portion 2330, the knee portion 2331, the lower leg portion 2332, and the foot portion 2333 of the leg pad 2310. Each of these portions of the outer shell 2342 comprises a frontal part, a medial part, and a lateral part such that the outer shell 2342 comprises a frontal portion 2356, a medial portion 2357, and a lateral portion 2358 which constitute respective parts of the frontal portion 2326, the medial portion 2327, and the lateral portion 2328 of the leg pad 2310.

The protective padding 2340 provides padded protection to the goalkeeper's leg $2316_x$. In this embodiment, the protective padding 2340 comprises an upper leg padding portion $2348_1$, a knee padding portion $2348_2$, a lower leg padding portion 23483 and a foot padding portion $2348_4$ constituting respective parts of the upper leg portion 2330, the knee portion 2331, the lower leg portion 2332, and the foot portion 2333 of the leg pad 2310. In this example, respective ones of the padding portions $2348_1$-$2348_P$ are part of a common continuous pad that extends from the upper leg portion 2330 to the foot portion 2333 of the leg pad 2310.

The inner liner 2344 of the pad 2310 is configured to face the goalie's leg $2316_x$. A material 2376 of the inner layer 2344 may be of any suitable kind. For example, in some embodiments, the material 2376 may be fabric such as a woven fabric, a nonwoven fabric, synthetic microfibers, a synthetic woven knit, a polyurethane laminate, a mesh, or any other suitable fabric. The inner liner 2344 may be implemented in various other ways in other embodiments.

The outer cover 2342, the inner liner 2344, and the protective padding 2340 of the pad 2310 may be connected together in any suitable way. For example, in some embodiments, two or more of the outer cover 2342, the inner liner 2344, and the protective padding 2340 may be fastened by one or more fasteners, such as a stitching (i.e., a series of stitches), an adhesive, a series of staples, one or more laces, etc.

Although in embodiments considered above the article 10 is an article of protective athletic gear and is more specifically a hockey goalkeeper leg pad, in other embodiments, the article of 10 may be any other protective athletic gear usable by a hockey goalie.

For example, the article 10 may be a chest protector for a goalie for protecting the goalie's torso and arms. The chest protector comprises pads and a liner constructed using principles described herein in. The pads may constitute any portion of the chest protector 10 (e.g., a chest portion, an upper arm portion, a lower arm portion, an abdominal portion, etc.). For instance, the chest protector may implement the component 30.

As another example, as shown in FIG. 22, the article 10 may be a blocker glove 2210 for a goalie for protecting the goalie's hand and deflecting a puck or ball. In this example, the blocker glove 2210 comprises a board portion 2232 which the goalie uses to deflect pucks or balls and a glove portion 2242. The board portion 2232 may comprise padding. For instance, the blocker glove 2210 may implement the component 30.

Although in embodiments considered above the article of protective athletic gear 10 is a hockey goalie protective athletic gear 10, in other embodiments, the article of protective athletic gear 10 may be any other protective athletic gear usable by a player playing another type of contact sport (e.g., a "full-contact" sport) in which there are significant impact forces on the player due to player-to-player and/or player-to-object contact or any other type of sports, including athletic activities other than contact sports.

For example, in some embodiments, as shown in FIG. 18, the article 10 may be an arm guard 1810 (e.g., an elbow guard) for protecting an arm (e.g., an elbow) of a user, in which the arm guard 1810 comprises a pad 1836 and an inner liner 1844. For instance, the arm guard 1810 may implement the component 30.

As another example, in some embodiments, as shown in FIGS. 19 and 21, the article 10 may be shoulder pads 1910, 2110 for protecting an upper torso (e.g., shoulders and a chest) of a user (e.g., a hockey player, a baseball catcher), in which the shoulder pads 1910, 2110 comprise pads 1936, 2136 and an inner liner 1944, 2144. For instance, the shoulder pads 1910, 2110 may implement the component 30.

As another example, in some embodiments, as shown in FIG. 20, the article 10 may be a leg guard 2010 (e.g., a hockey player leg pad (also referred-to as a shin guard)) for protecting a leg (e.g., a shin) of a user, in which the leg guard 10 comprises pads 2036 and an inner liner 2044. For instance, the leg guard 2030 may implement the component 30.

The article of protective athletic gear 10, including its components, may be implemented in any other suitable manner in other embodiments.

In this non-limiting example of implantation, the article 10 comprises the component 30. Non-limiting variants of the article of protective athletic gear 10 implementing the component 30 are further described below.

In a first hockey goalkeeper leg pad variant, the component 30 is configured to cause a change in a rebound deflection property of the leg pad based on a received control signal CTRL_SIG. The processing entity 204 receives the sensor signal SENS_SIG, processes it, and sends a control signal CTRL_SIG to cause a change in the rebound deflection property of the leg pad.

In a second hockey goalkeeper leg pad variant, the component 30 is configured to cause a change in a slidability of the hockey goalkeeper leg pad 810, 2310 based on a received control signal CTRL_SIG. The processing entity 204 receives the sensor signal SENS_SIG, processes it, and sends a control signal CTRL_SIG to cause a change in the slidability of the hockey goalkeeper leg pad 810, 2310. For example, the processing entity 204 may be configured to process the sensor signal SENS_SIG to determine ice conditions and to cause a coefficient of friction of the hockey goalkeeper leg pad 810, 2310 to change based on the determined ice conditions. Alternatively, the processing entity 204 may be configured to process the sensor signal SENS_SIG to determine a position of the article of sports equipment 10 relative to a pre-determined position in space and to cause a coefficient of friction of the hockey goalkeeper leg pad 810, 2310 to change based on the determined position.

In other embodiments, the component 30 can cause a change to a functional or visual aspect of any element of a goalie pad or leg pad or chest protector or other protective equipment as described above.

Screen

In another specific non-limiting example, the controller 20 is a processing entity as described above, and the component 30 comprises a media device such as a screen or loudspeaker. Different control signals cause the media device to output different images, characters, sounds, etc., thus allowing a characteristic of the component 30 (i.e., the output of the media device) to be altered under control of the controller 20.

Figure 4:
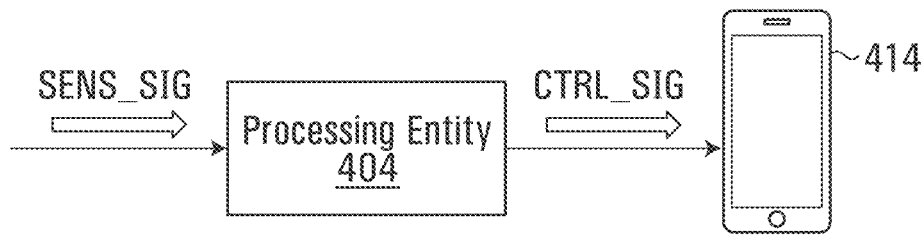
FIG. 4 is a block diagram showing the controller in the form of a processing entity and the component in the form of a screen.

In this regard, reference is made to FIG. 4, which shows a processing entity 404 and a screen 414. The processing entity 404 is configured to collect, aggregate and process one or more sensor signals SENS_SIG in accordance with program logic to determine information to be displayed on the screen 414 and to send a control signal CTRL_SIG to the screen 414 to control what is displayed thereon.

Figure 5:
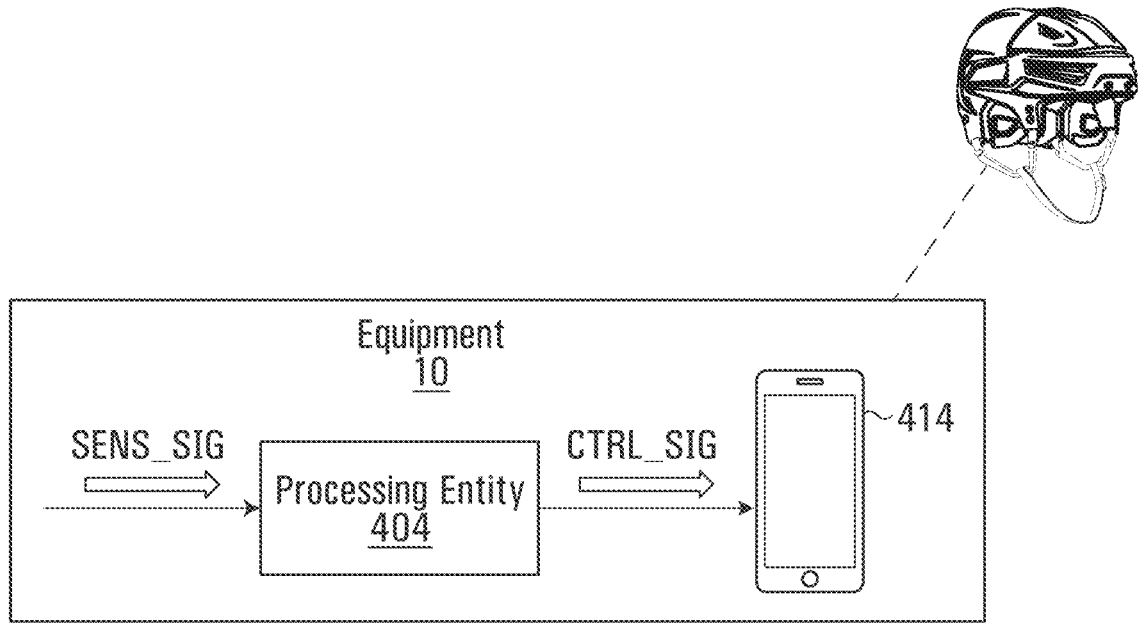
FIG. 5 shows the controller and component incorporated into a helmet.

In a specific non-limiting embodiment, with reference to FIG. 5, consider a hockey scenario where the article of sports equipment is a helmet 510 and where the screen 414 is built into a visor of the helmet. It is assumed that the user 12 has possession of the puck. The processing entity 404 determines, from the sensor signal(s) SENS_SIG, the locations of the user's teammates, the locations of opposing team players, and the limits of the playing surface. The processing entity 404 then selects one of the user's teammates to whom to pass the puck. This selection can be made by an optimization algorithm fed by statistical data. Finally, the processing entity 404 instructs the display screen to show the direction in which the selected player is located. This can be done, for example, by displaying a flashing light on a specific area of the screen 414, so that the user 12 is provided with a suggestion of where it may make sense to release the puck.

(1.2) Autonomous Altering of Characteristic without Controller

Figure 6:
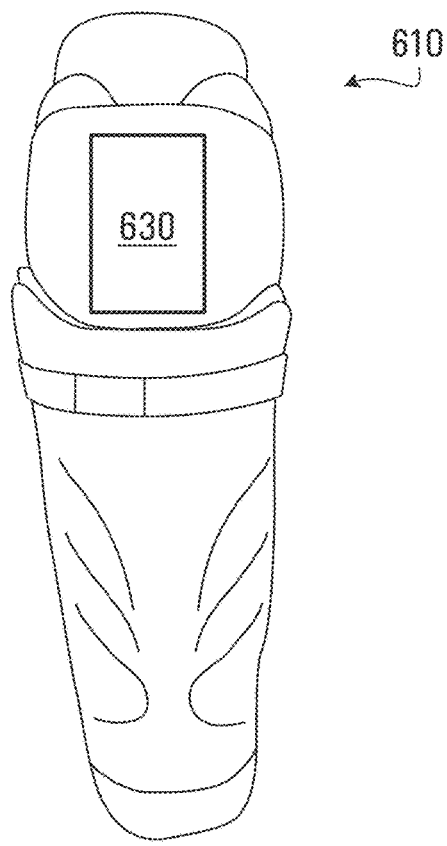
FIG. 6 illustrates an article of sports equipment in the form of a leg pad having a component with an alterable characteristic.

A second class of embodiments in which a characteristic is autonomously alterable is now described. Reference is now made to FIG. 6, which shows an article of sports equipment 610 that is worn or manipulated by a user 612. According to this second class of embodiments, no controller is required. The article of sports equipment 610 comprises a component 630 with a characteristic that is autonomously alterable during use of the article of sports equipment 610 without requiring a controller. One example of such a characteristic is external appearance, e.g., color. In particular, the component 630 is configured to autonomously react to an external stimulus to alter its external appearance during use of the article of sports equipment 610, without requiring a controller.

For instance, the component 630 may be configured to alter its external appearance based on impact from a game projectile (such as a puck or ball). For example, at least part of the component 630 may temporarily change from a first color to a second color in response to impact of the game projectile with the component 630. The component 630 may be configured in such a way that at least part of the component 630 returns to the first color after a certain amount of time has elapsed subsequent to the impact of the game projectile with the component 630. In other cases, the component 630 may be configured to alter its external appearance in dependence upon a magnitude of a force of impact of the game projectile with the component 630.

In still other cases, the component 630 may be configured to alter its external appearance based on an environmental factor (e.g., temperature, level of light, etc.). Changes in the external appearance of the component 630 may be manifested as changes in color, for example, so that the color of the component 630 may differ with changes in the temperature of the environment, level of light, etc.

By way of non-limiting example, the component 630 whose external appearance is modified may include a patch of "smart paint". In a hockey context, a goalie leg pad or a hockey stick blade coated with a patch of smart paint might show places of impact with a puck. In another embodiment, a skate coated with a patch of smart paint might be temperature-sensitive and thus for example might change colors as a player gets on the ice (i.e., temperature is below a certain threshold) and then may change again when the player gets back on the bench (i.e., temperature is no longer below the certain threshold). Depending on the response curve of the material from which it is made, the smart paint may further provide an indicator of how long the player has been on his or her shift.

Figure 32:
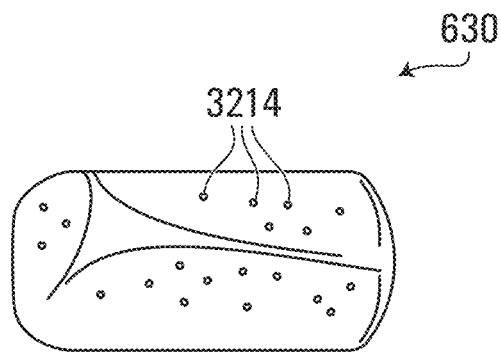
FIG. 32 shows a variant of the component wherein the component is a pad comprising ink capsules.
Figure 33:
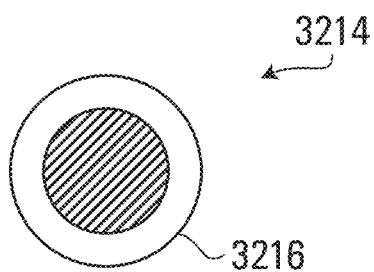
FIG. 33 shows a given one of the ink capsules of FIG. 32.

As another example, as shown in FIGS. 32 and 33, the component 630 of the helmet 10 may comprise padding. The component 630 may be configured to cause a change in physical appearance of the helmet 10 after the helmet 10 is subject to an acceleration and/or a pressure above a threshold. In particular, the padding of the component 630 may comprise one or more capsules 3214 comprising an envelope 3216 and containing ink. In particular, the envelope 3216 may be configured to withstand a pre-determined external pressure, a predetermined impact and/or a predetermined acceleration. This may be achieved by constructing the envelope 3216 in a selected polymeric material of a predetermined thickness. During use, if the component 630 of the padding is subject to an impact resulting in that the envelope 3216 is subject to an external pressure, impact and/or predetermined acceleration above the respective thresholds of the envelope 3216, the envelope 3216 may get crushed, releasing the ink in the padding of the helmet and changing a color of the padding of the helmet 10, which may indicate to an observer that the helmet 10 has been subject to an acceleration and/or a pressure above a threshold.

(2) Command-Driven Altering of Characteristic

Figure 7:
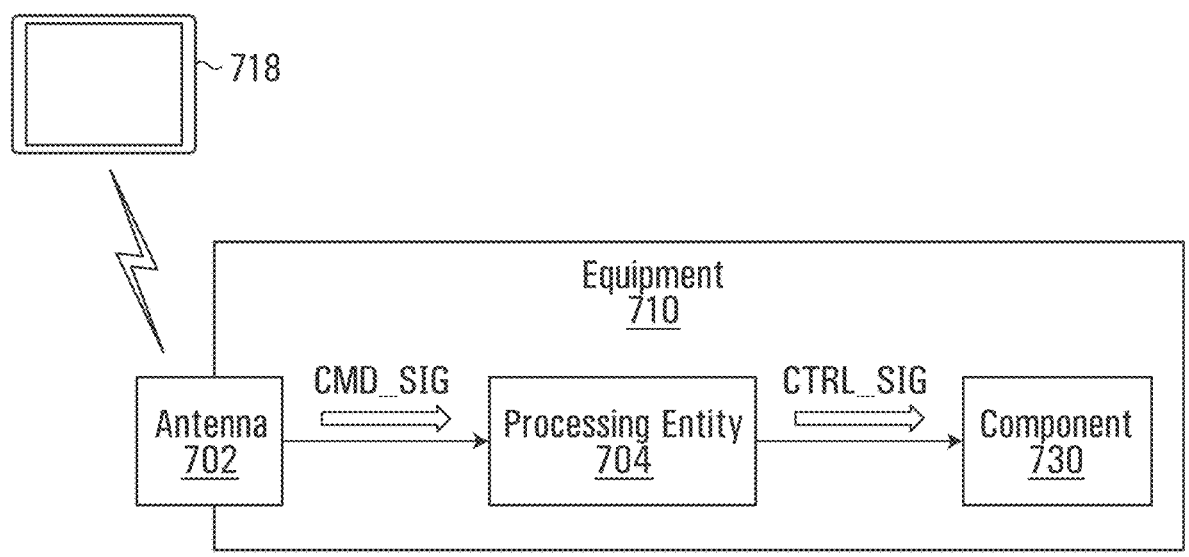
FIG. 7 is a block diagram showing the controller in the form of a processing entity coupled to the component, and an antenna for receiving a command from an external entity.

Reference is now made to FIG. 7, which shows an article of sports equipment 710 that includes a processing entity 704 for receiving an external command signal CMD_SIG from an external entity 718. A receiver (such as an antenna 712) may be provided for this purpose. The external entity 718 can be a smartphone or tablet, for example, which is held by a user 712. The processing entity 704 causes a change to at least one characteristic of the article of sports equipment 710 as a function of the external command signal CMD_SIG. The change in characteristic may be carried out by a component 730 operatively coupled to processing entity 704. The component 730 may be a screen or it may be a material with controllable properties. Although not illustrated, the processing entity 704 may receive sensor signals from one or more sensors 206, 306A, 306B, 306C as was described above, in addition to receiving the external command signal CMD_SIG from the external entity 718.

In this embodiment, rather than the processing entity 704 making decisions autonomously to change a characteristic of the component 730, the processing entity 704 may simply carry out the instructions of the external entity 718, which are conveyed by the command signal CMD_SIG. The aforementioned behaviors (including changing physical properties of the material and/or screen display output) can therefore be directly controlled by the user 712, which can but need not be the user of the article of sports equipment 710 itself, via the external entity 718.

In a specific non-limiting embodiment, with reference to FIGS. 8A and 8B, consider a hockey scenario where the article of sports equipment is a leg pad 810 with a flexible and highly resistant screen 830 covering a significant part of the outer surface of the leg pad 810. Consider that the processing entity 704 in the leg pad 810 wirelessly receives a command signal CMD_SIG from the external entity 718, and that the command signal CMD_SIG indicates whether the team to which the wearer of the leg pad 810 belongs is the home team or the away team. In this case, depending on the value of the command signal CMD_SIG, the processing entity 714 in the leg pad 810 will send a signal to the screen 830, causing the screen 830 to display one of two team color schemes, namely one for home play, one for away play.

Figure 9:
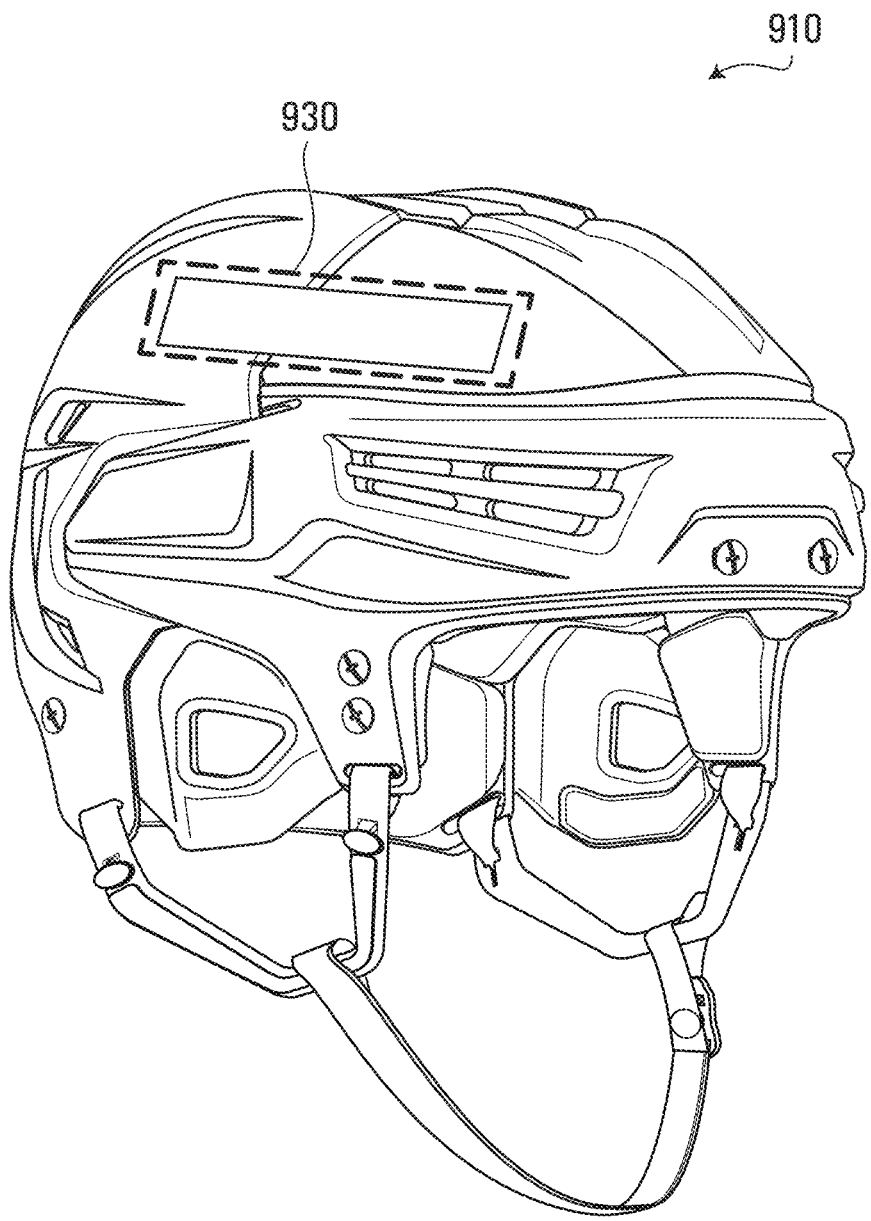
FIG. 9 shows a hockey helmet into which a screen has been embedded and conveys an advertisement.

In another specific non-limiting embodiment, with reference to FIG. 9, consider a hockey scenario where the article of sports equipment is a helmet 910 with a screen 930 covering a significant part of the outer surface of the helmet 910. Consider that the processing entity 704 in the helmet 910 wirelessly receives a command signal CMD_SIG from the external entity 718, and that the command signal CMD_SIG contains or encodes an advertisement. In this case, the processing entity 714 in the helmet 910 is configured to send a signal to the screen 930, causing the screen 930 to display the advertisement in question.

In other specific non-limiting embodiments, the external entity 718 is configured to be worn by the user of the article of sports equipment 10, 610, 710.

Figure 34:
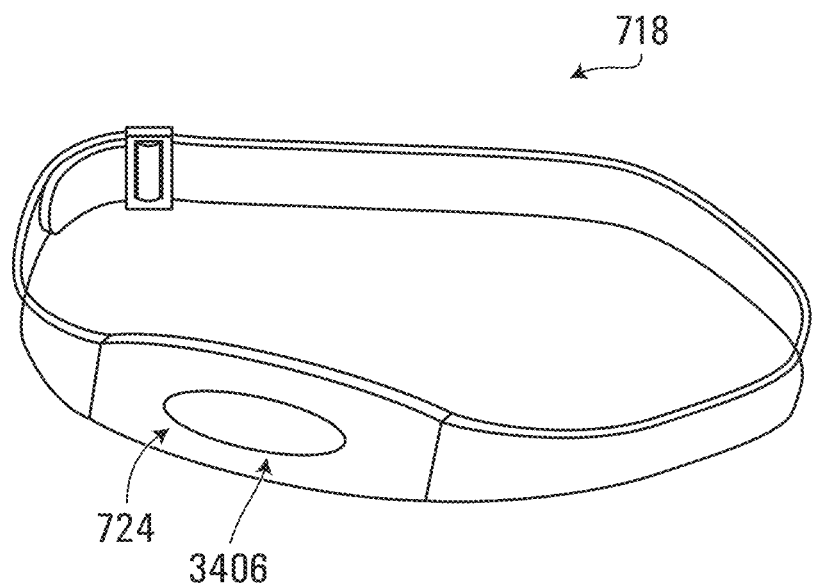
FIGS. 34 and 35 show examples of external entities according to other embodiments.

For example, as shown in FIG. 34, the external entity 718 may be a monitor mountable on a chest strap and/or on protective athletic equipment. The monitor of the external entity may monitor biological characteristics of the wearer such as heartbeat, arterial pressure, etc. and may comprise sensors 3406 for sensing the biological characteristics of the wearer and generating the sensor signal SENS_SIG. The external entity may comprise an external processing entity 724 which processes the sensor signal SENS_SIG and generates the external command signal CMD_SIG. The article of sports equipment 710 may be a wearable article (e.g., helmet, jersey, skate, etc.) and the component 730 may be a screen of the article of sports equipment 710 and may display information depending on instructions conveyed by the external command signal CMD_SIG. For example, the screen 730 may display a heartbeat of the user of the article of sports equipment 10, 610, 710. The external processing entity 724 may compare the sensor signal SENS_SIG to reference data and determine of the biological characteristics of the wearer are problematic. If the external processing entity 724 of the external entity 718 determines that one of the biological characteristics of the wearer is problematic, the screen 730 may display an alert. Furthermore, in some examples, the monitor may also comprise accelerometers generating the sensor signal SENS_SIG. The external processing entity 724 may compare the sensor signal SENS_SIG to reference data and determine if the acceleration and/or speed of the user is above a predetermined threshold. If the predetermined threshold is exceeded, the external processing entity 724 may generate an external command signal CMD_SIG and the screen 730 may change color and/or display a related information.

Figure 35:
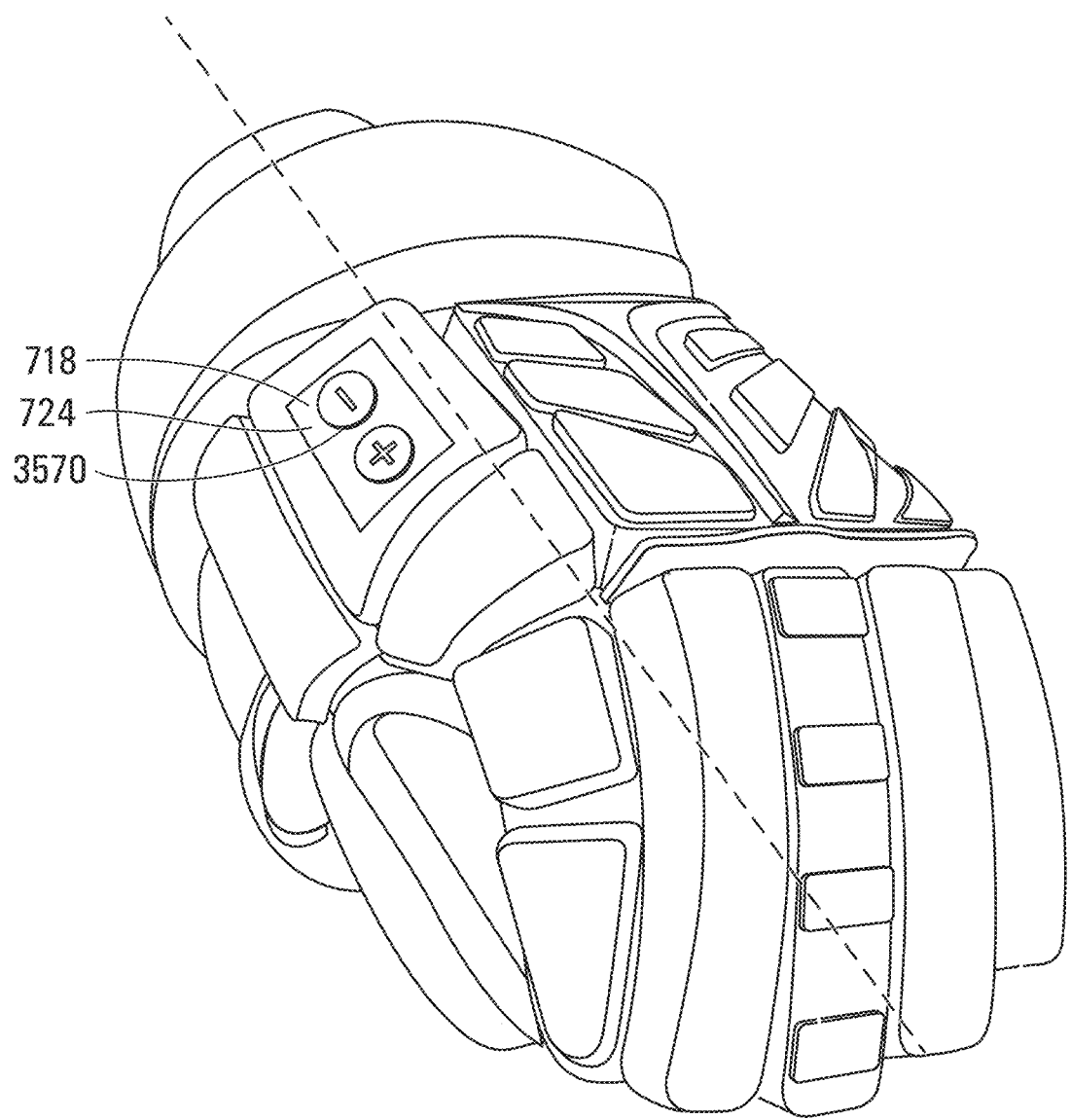

In another example, as shown in FIG. 35, the external entity 718 may be mountable in a glove and may comprise a user interface 3570 to allow the user to alter characteristics of the component 730. In response to user inputs, the external processing entity 724 may generate the external command signal CMD_SIG. In this example, the article of sports equipment 710 may be any one of the articles of sports equipment discussed earlier, and the component 730 may be any one of the components 730 discussed earlier. For instance, in some cases, the external entity 718 may allow the user to alter characteristics of its hockey stick (e.g., stiffness, weight distribution, etc.) and/or skates (e.g., skate boot stiffness, pitch, etc.) by interacting with the user interface 3570 of the external entity 718, which generates the external command signal CMD_SIG directed to the processing entity 704 of the hockey stick and/or skates.

The article of sports equipment 10, 610, 710, may also include a power supply 40 (e.g., a battery pack) for powering the controller 20 and/or the sensor(s) 206. The power supply 40 may be rechargeable. To this end, a recharging system 50 may be provided, such recharging system 50 being configured to recharge the power supply 40. The recharging system 50 may be of a regenerative type, based on kinetic motion of the article of sports equipment 10, 610, 710. Alternatively, the recharging system 50 may be of the inductive type and may even comprise a thermocouple.

Figure 10:
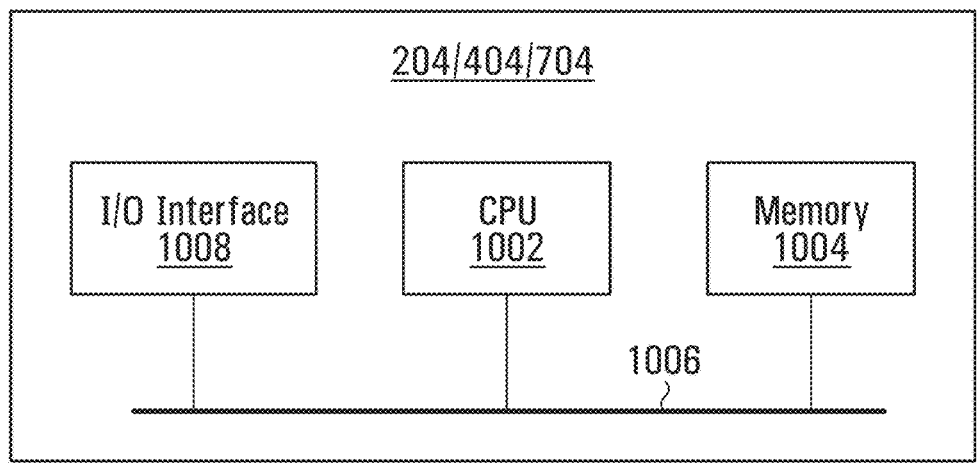
FIG. 10 is a block diagram of a processing entity.

FIG. 10 shows a possible internal structural configuration of the processing entity 204, 404, 704. The processing entity includes a CPU 1002 connected to a memory 1004 over a communication bus 1006. Examples of the CPU 1002 may include electronic components such as a computer processor comprising a microchip or application-specific integrated circuitry, or a quantum computer. The memory 1004 may be implemented in a variety of ways, such as a magnetic disk or solid state memory, and may include flash memory, SRAM, DRAM, phase-change memory and the like. The memory 1004 stores computer-readable instructions, respective subsets of which may encode an operating system and a set of processes. The CPU 1002 is configured to execute the computer-readable instructions in the memory 1004. In doing so, the CPU 1002 causes the processing unit to implement the aforementioned operating system and set of processes. An input/output interface 1008 is connected to the CPU 1002 over the communication bus 1006 and enables the CPU 1002 to communicate externally as needed (e.g., using an antenna or over a wired connection, depending on the embodiment).

Although the articles of sports equipment illustrated in FIGS. 1 to 20 and 22 to 26 are articles of sports equipment for playing hockey, articles of sports equipment for playing different sports may implement improvements based on principles disclosed herein.

For example, as shown in FIG. 21, the article of sports equipment may be for playing baseball. In this embodiment, the article of sports equipment is a chest pad 10 comprising padding elements 720 and implementing the alterable component 30, 630, 730.

As another example, as shown in FIG. 27, the article of sports equipment may be for playing lacrosse. In this embodiment, the article of sports equipment is a lacrosse stick 10 comprising a handle 650, a first end 652 and a head 654 and implementing the alterable component 30, 630, 730.

Figure 43:
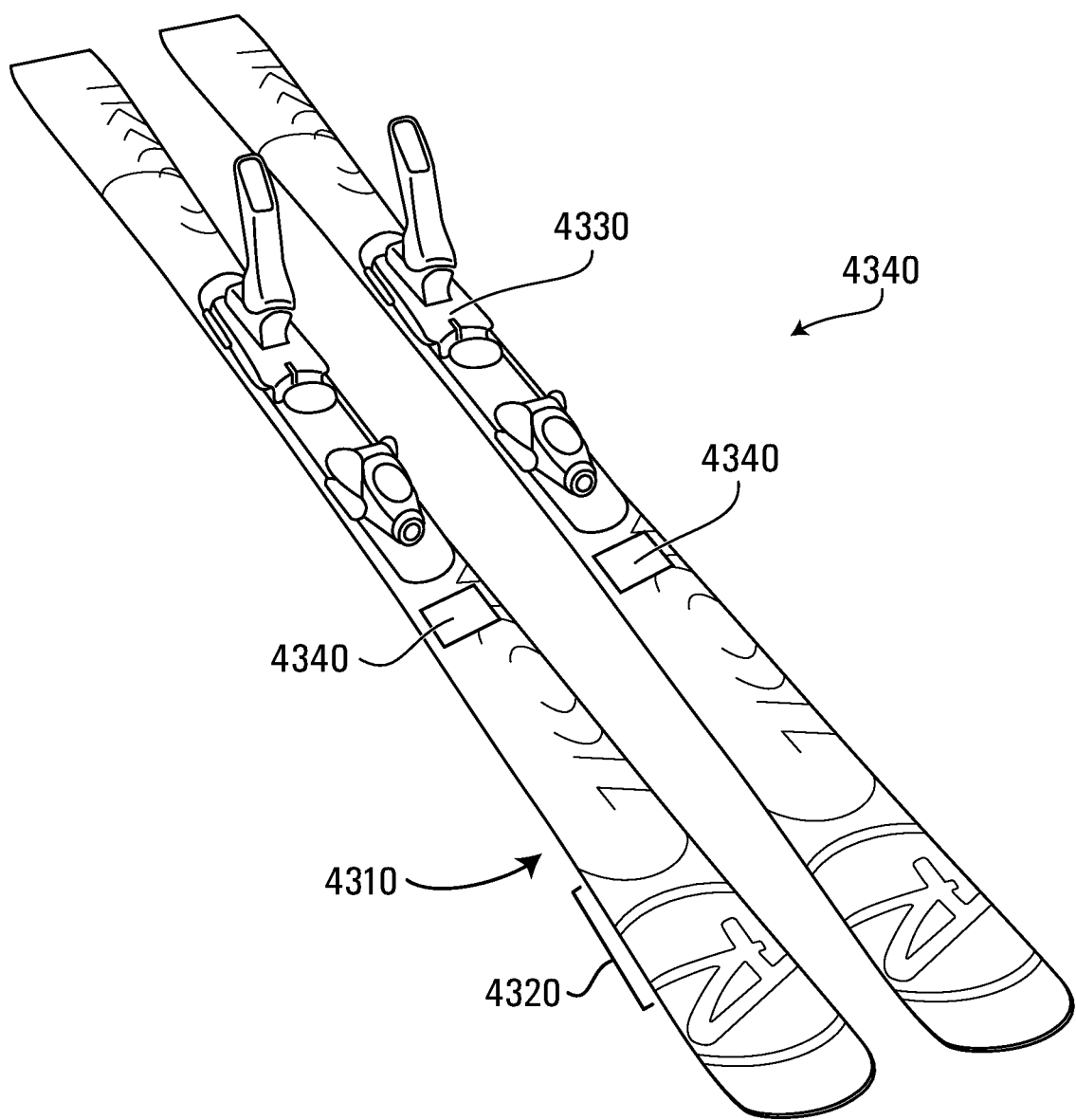
FIG. 43 illustrates skis equipped with a component that is configured to alter a functional or visual characteristic of the ski.

As another example, and as shown in FIG. 43, the article of sports equipment may be a ski 4300, the ski having a base. The base 4310 is the area on the bottom of the ski 4300 that comes into contact with the snow. The ski 4300 may also have edges 4320, which are typically metal strips that run down the sides of the ski. The ski may comprise a ski binding 4330, which is a device that connects a ski boot (not shown) to the ski 4300. Furthermore, the ski may have a component 4340 that is configured to alter a visual or functional characteristic of the ski while the ski is in use by a skier. In some embodiments, the component may be controlled by a controller (not shown). The controller is configured to autonomously alter a characteristic of the component, which alters a a visual or functional characteristic of the ski.

For example, the profile of the base 4310 may be altered by action of the component 4340. This may occur in response to detection of a condition, such as a detected movement pattern. For example, the base 4310 may be kept in its unadulterated state when the skier is skiing (e.g., detected as gliding) but when the skier initiates a turning motion, the signal from a sensor (e.g., gyro or pressure) is processed with an algorithm to detect that the skier is about to turn, and an actuator is caused to slightly deform the base to create a parabolic shape and facilitate that turn.

Alternately or in addition, the angle of the ski boot may be changed by shifting of the binding 4330 through action of the component 4340. This shift in the binding could be angled more forward under a first set of conditions and less forward under a second set of conditions. The sets of conditions may be based on speed, acceleration, temperature, or any other sensed parameter. A command may also be provided externally to make these changes from outside the ski 4300.

In another embodiment, the component 30 is embedded in the base 4310 and the controller measures a condition such as speed (as measured by a speed sensor and received/encoded in the sensor signal SENS_SIG) and/or temperature (as measured by a thermometer and received/encoded in the sensor signal SENS_SIG) and/or ambient light (as measured by an ambient light sensor) and controls the component so that a speed- and/or temperature- and/or ambient-light dependent effect color is induced by the component.

This could produce a visual effect such as lighting during darkness hours (e.g., the processing entity determines that the ambient light is below a level and turns on a lighting unit that is part of the component 30). The lighting unit may therefore cause the skis to give off an effect of nighttime illumination, or illuminated-in-the-dark skis. The power source for such a lighting unit may be a battery or may be regenerated through, e.g, kinematic recharging as a result of motion of the skier. Other visual effects are possible, such as a change in emitted light pattern as a result of temperature, or other combinations of effects.

In another embodiment, the component 30 is a film that covers part of a top surface of the ski and the controller measures a condition such as speed (as measured by a speed sensor and received/encoded in the sensor signal SENS_SIG) and controls the component so that a speed-dependent color is emitted (or reflects) by the component. This gives the impression of the ski 4300 having a different colors at different speeds. As such, there will be provided a ski that emits (or reflects) a speed-dependent color. For example, the color may be made lighter with increasing speed, or darker with increasing speed, or may change hues entirely (e.g., from blue (slow) to red (fast)). Also, there may be a change in color when the ski reaches a threshold speed, as measured by the processing entity 204.

As such, the ski may have a controller mounted to the base and a color-changing component that covers at least part of an exterior surface of the base, the controller being configured to determine a speed of the ski and configured to cause the color-changing component to emit a first color in case the speed meets a first condition and a second color in case the speed meets a second condition. The speed of the ski may be determined by the controller, by a sensor on the ski connected to the controller, or by an external sensor worn by the skier and whose output is sent to the controller via wireless or wired transmission. Such an external sensor may be a GPS on a mobile phone or a smartwatch, for example. As such, the GPS sends position and/or speed data to the controller, which processes the position and/or speed data and causes a change to the color emitted by the color-changing component.

Various products may be used to change the color of a part of the ski (e.g., the top surface of the ski), in an electronic, chemical or other manner. For example, in response to a small electrical voltage (typically around 1 volt), electrochromic materials will change, evoke or bleach their color. The electricity induces in the material a process of either reduction (gain of electrons) or oxidation (loss of electrons). A chemical has a characteristic range of energies over which it will interact with wavelengths in the electromagnetic spectrum, but these reduction or oxidation processes (collectively called redox reactions) alter the energy bands the chemical will absorb. In electrochromic materials, the change corresponds to the visible region of the electromagnetic spectrum. Suitable materials and devices include Metal Oxides, Viologens, Conjugated Conducting Polymers, Metal Coordination Complexes and Prussian Blue, Electrochromic Devices The same concept can be applied to a skate, including speed skating skates. The frequency with which the color can be modulated or modified can range from many times per second to once or per second or once every few seconds.

The notion of changing the color of a ski or skate (or other article of sports equipment) as a function of speed may be useful or interesting for spectators, including on TV, to assess the speed of a skier coming down the slopes, as often there are few points of reference for TV spectators to rely on. Further, the color emitted may be dependent on time of day or degree of ambient light, so that a daytime effect may differ from a nighttime effect.

Certain of the aforementioned effects (e.g., conditions determined by the processing entity) may be controlled by the skier through a smartphone or other mobile device. This could allow selection of the color to be emitted, selection of the light pattern to be emitted, selection of a threshold temperature, speed or ambient light level for the determining of the condition.

As such, a method will have been provided, wherein the method comprises receiving a signal from a sensor; processing the received signal to determine a control signal; and sending the control signal to a component of an article of sports equipment to alter a characteristic of the article of sports equipment during use thereof. Processing the received signal to determine a control signal may comprise determining, from the received signal, parameters associated with a detected movement pattern, and consulting a memory to determine the control signal associated with the parameters associated with the detected movement pattern.

In some embodiments, any feature of any embodiment described herein may be used in combination with any feature of any other embodiment described herein.

Certain additional elements that may be needed for operation of certain embodiments have not been described or illustrated as they are assumed to be within the purview of those of ordinary skill in the art. Moreover, certain embodiments may be free of, may lack and/or may function without any element that is not specifically disclosed herein.

In describing the embodiments, specific terminology has been resorted to for the sake of description but this is not intended to be limited to the specific terms so selected, and it is understood that each specific term comprises all equivalents.

In case of any discrepancy, inconsistency, or other difference between terms used herein and terms used in any document incorporated by reference herein, meanings of the terms used herein are to prevail and be used.

Although various embodiments have been illustrated, this was purposes of describing, but should not be limiting. Various modifications will become apparent to those skilled in the art.

What is claimed is:

1. An article of sports equipment configured to autonomously alter a characteristic of the article of sports equipment during use thereof based on a movement pattern of the article of sports equipment, wherein the characteristic of the article of sports equipment is configured to be altered by application of a control signal in accordance with an application curve obtained from a memory on the basis of the movement pattern, wherein the memory maps each of a plurality of application curves to a respective one of a plurality of movement patterns of the article of sports equipment.

2. The article of sports equipment defined in claim 1, further comprising a controller and a component operatively coupled to the controller, wherein to autonomously alter the characteristic of the article of sports equipment, the controller is configured to autonomously alter a characteristic of the component.

3. The article of sports equipment defined in claim 2, wherein the controller comprises a processing entity operatively coupled to the component and configured to send the control signal to the component to cause the characteristic of the component to be altered.

4. The article of sports equipment defined in claim 3, wherein the processing entity is configured to determine whether a condition is met and to send the control signal to the component in response to the condition being met.

5. The article of sports equipment defined in claim 4, further comprising at least one sensor operatively coupled to the processor, wherein to determine whether the condition is met, the processing entity is configured to process a signal received from the at least one sensor.

6. The article of sports equipment defined in claim 5, wherein the at least one sensor comprises at least one of a gyroscope, an accelerometer and a magnetometer.

7. The article of sports equipment defined in claim 1, further comprising a component with an alterable external appearance, wherein to autonomously alter a characteristic of the article of sports equipment during use thereof, the component is configured to autonomously alter its external appearance.

8. The article of sports equipment defined in claim 7, wherein external appearance is altered based on interaction with a game projectile.

9. The article of sports equipment defined in claim 7, wherein at least part of the component temporarily changes from a first color to a second color in response to impact of the game projectile with the component.

10. The article of sports equipment defined in claim 9, wherein the at least part of the component returns to the first color after a certain amount of time has elapsed subsequent to the impact of the game projectile with the component.

11. The article of sports equipment defined in claim 10, wherein the article of sports equipment is a goalie leg pad.

12. The article of sports equipment defined in claim 10, wherein the article of sports equipment is a blade of a hockey stick.

13. The article of sports equipment defined in claim 12, wherein the component is configured to alter its external appearance in dependence upon a magnitude of a force of impact of the game projectile with the component.

14. The article of sports equipment defined in claim 13, wherein the external appearance of the component that is altered comprises a color of the component.

15. The article of sports equipment defined in claim 14, wherein the article of sports equipment is a goalie leg pad.

16. The article of sports equipment defined in claim 14, wherein the article of sports equipment is a blade of a hockey stick.

17. The article of sports equipment defined in claim 7, wherein external appearance is altered based on an environment (e.g., temperature, level of light, etc.) of the article of sports equipment.

18. An article of sports equipment comprising a processing entity configured to cause a change in the article of sports equipment based on a movement pattern of the article of sports equipment, wherein the change in the article of sports equipment is configured to be caused by application of a control signal in accordance with an application curve obtained from a memory on the basis of the movement pattern, wherein the memory maps each of a plurality of application curves to a respective one of a plurality of movement patterns of the article sports equipment.

19. The article of sports equipment defined in claim 18, wherein the control signal comprises an output of at least one sensor.

20. The article of sports equipment defined in claim 19, wherein the at least one sensor is integrated with the article of sports equipment and wherein the processing entity is configured to process the output of the at least one sensor to detect the movement pattern exhibited by the article of sports equipment.

21. The article of sports equipment defined in claim 20, wherein the article of sports equipment is a striking implement and wherein the detected movement pattern includes at least one of a movement pattern indicative of a shot and a movement pattern indicative of game projectile handling.

22. The article of sports equipment defined in claim 21, wherein the processing entity is configured to cause a first change in the article of sports equipment in case the detected movement pattern is indicative of a shot and a second change in the article of sports equipment in case the detected movement pattern is indicative of projectile handling.

23. The article of sports equipment defined in claim 19, wherein the processing entity is configured to process the output of the at least one sensor to determine whether movement of a user of the article of sports equipment matches one of a plurality of predetermined movement patterns.

24. The article of sports equipment defined in claim 23, wherein the plurality of predetermined movement patterns includes a diving movement and a sprinting movement.

25. The article of sports equipment defined in claim 18, wherein the article of sports equipment is a skate.

26. The article of sports equipment defined in claim 25, wherein the processing entity is configured to cause a change in a suspension of the skate to change based on processing of the control signal.

27. The article of sports equipment defined in claim 25, wherein the skate comprises at least one of a tongue and a tendon guard and wherein the processing entity is configured to cause a change in a flexibility of the tongue or tendon guard based on processing of the control signal.

28. The article of sports equipment defined in claim 25, wherein the processing entity is configured to cause a change in a pitch of the skate based on processing of the control signal.

29. The article of sports equipment defined in claim 25, wherein the skate comprises a runner, and wherein the processing entity is configured to cause a change in a profile of the runner based on processing of the control signal.

30. The article of sports equipment defined in claim 25, wherein the skate comprises a runner, and wherein the processing entity is configured to cause a profile of the runner to change from a first profile to a second profile in response to the control signal being associated with a movement indicating that the skate is turning or that a user of the skate is turning.

31. The article of sports equipment defined in claim 25, wherein the skate comprises a runner, and wherein the processing entity is configured to cause a profile of the runner to return to the first profile in response to the control signal being associated with a movement indicating that the skate is no longer turning or that a user of the skate is no longer turning.

32. The article of sports equipment defined in claim 30, wherein the second profile is more curved than the first profile.

33. The article of sports equipment defined in claim 30, wherein the second profile is more parabolic than the first profile.

34. The article of sports equipment defined in claim 18, wherein the article of sports equipment is a stick.

35. The article of sports equipment defined in claim 34, wherein the processing entity is configured to cause a change in a curvature of the stick based on processing of the control signal.

36. The article of sports equipment defined in claim 34, wherein the processing entity is configured to cause a change in a stiffness of at least part of a shaft of the stick based on processing of the control signal.

37. The article of sports equipment defined in claim 34, wherein the processing entity is configured to cause a change in a weight distribution along at least part of a shaft of the stick based on processing of the control signal.

38. The article of sports equipment defined in claim 34, wherein the processing entity is configured to cause a change a vibration dampening of the stick based on processing of the control signal.

39. A method, comprising:
receiving a signal from a sensor;
determining a movement pattern of an article of sports equipment based on the received signal;
determining an application curve of a control signal based on a relationship that maps each of a plurality of application curves to a respective one of a plurality of movement patterns of the article of sports equipment;
sending the control signal to a component of the article of sports equipment to alter a characteristic of the article of sports equipment during use thereof based on the application curve.

40. The method defined in claim 39, wherein determining an application curve of a control signal comprises determining, from the received signal, parameters associated with a detected movement pattern, and consulting a memory to determine the application curve of the control signal associated with the parameters associated with the detected movement pattern.

* * * * *